US010556757B2

(12) United States Patent
Sturges et al.

(10) Patent No.: US 10,556,757 B2
(45) Date of Patent: Feb. 11, 2020

(54) NEST DEVICE FOR POSITIONING A PART DURING TESTING OR ASSEMBLY

(71) Applicant: DWFritz Automation, Inc., Wilsonville, OR (US)

(72) Inventors: Daniel Sturges, Wilsonville, OR (US); Garrett L. Headrick, Wilsonville, OR (US); Jacob M. Fricke, Wilsonville, OR (US)

(73) Assignee: DWFritz Automation, Inc., Wilsonville, OR (US)

( * ) Notice: Subject to any disclaimer, the term of this patent is extended or adjusted under 35 U.S.C. 154(b) by 252 days.

(21) Appl. No.: 15/718,389

(22) Filed: Sep. 28, 2017

(65) Prior Publication Data
US 2019/0092581 A1    Mar. 28, 2019

(51) Int. Cl.
| B65G 51/03 | (2006.01) |
| B25B 11/02 | (2006.01) |
| B25B 5/08 | (2006.01) |
| B25B 11/00 | (2006.01) |
| B25B 5/06 | (2006.01) |
| B25B 5/10 | (2006.01) |

(52) U.S. Cl.
CPC ............... B65G 51/03 (2013.01); B25B 5/08 (2013.01); B25B 5/106 (2013.01); B25B 11/005 (2013.01); B25B 11/02 (2013.01)

(58) Field of Classification Search
CPC ........ B25B 11/00; B25B 11/02; B25B 11/005
USPC ....................................................... 269/287
See application file for complete search history.

(56) References Cited

U.S. PATENT DOCUMENTS

| 4,784,377 | A | * | 11/1988 | Woodward | ............ | B25B 11/005 269/21 |
| 4,880,349 | A | * | 11/1989 | Woodward | ............ | B25B 11/005 29/743 |
| 4,924,258 | A | * | 5/1990 | Tsutsui | .................. | G03F 7/2002 269/21 |
| 4,928,936 | A | * | 5/1990 | Ohkubo | ................. | B23Q 1/267 269/21 |
| 5,915,679 | A | * | 6/1999 | Kohlert | ................. | B25B 1/2421 269/309 |
| 6,012,711 | A | * | 1/2000 | Cipolla | .................. | B23Q 3/186 269/20 |
| 6,553,644 | B2 | * | 4/2003 | Karmaniolas | ........... | B25B 5/003 269/287 |

(Continued)

*Primary Examiner* — Tyrone V Hall, Jr.
(74) *Attorney, Agent, or Firm* — Schwabe, Williamson & Wyatt, P.C.

(57) ABSTRACT

Apparatuses, systems and methods associated with a nest device design are disclosed herein. In embodiments, a nest device may include a main body and one or more air bearings that extend from the main body. A placement mechanism may be positioned on ends of the one or more air bearings, wherein the placement mechanism includes the part. The one or more air bearings may blow air out of the ends of the air bearings against the placement mechanism when the air bearings are in a first state, and draw air in through the ends when the air bearings are in a second state. The nest device may further include one or more air jets that extend from the main body and are directed toward the placement mechanism, air blown by the one or more air jets causes the placement mechanism to be translated. Other embodiments may be described and/or claimed.

10 Claims, 25 Drawing Sheets

(56) References Cited

U.S. PATENT DOCUMENTS

| | | | |
|---|---|---|---|
| 7,104,535 B2* | 9/2006 | Kurita | G03F 7/70666 269/303 |
| 2002/0066170 A1* | 6/2002 | Mei | B25B 5/06 29/281.5 |
| 2004/0238522 A1* | 12/2004 | Edwards | B25B 11/005 219/444.1 |
| 2010/0194009 A1* | 8/2010 | Fullwood | B25B 11/005 269/9 |

* cited by examiner

NEST DEVICE FOR POSITIONING A PART DURING TESTING OR ASSEMBLY

TECHNICAL FIELD

The present disclosure relates to the field of nest devices. More particularly, the present disclosure relates to a nest device to position a part and retain the position of the part while the nest device is moved for testing or assembly.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Nest devices may be utilized for positioning and maintaining a position of a part during testing of the part and/or assembly of a device that includes the part. In some instances, the nest devices may be utilized for parts that may be relatively small, susceptible to damage due to forces applied to the part, susceptible to warpage due to forces applied to the part, or some combination thereof.

Legacy nest devices involved physical contact with the part to position the part relative to the nest device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 4B illustrates a bottom, perspective view of the example carrier of FIG. 4a.

DETAILED DESCRIPTION

Figure 1:
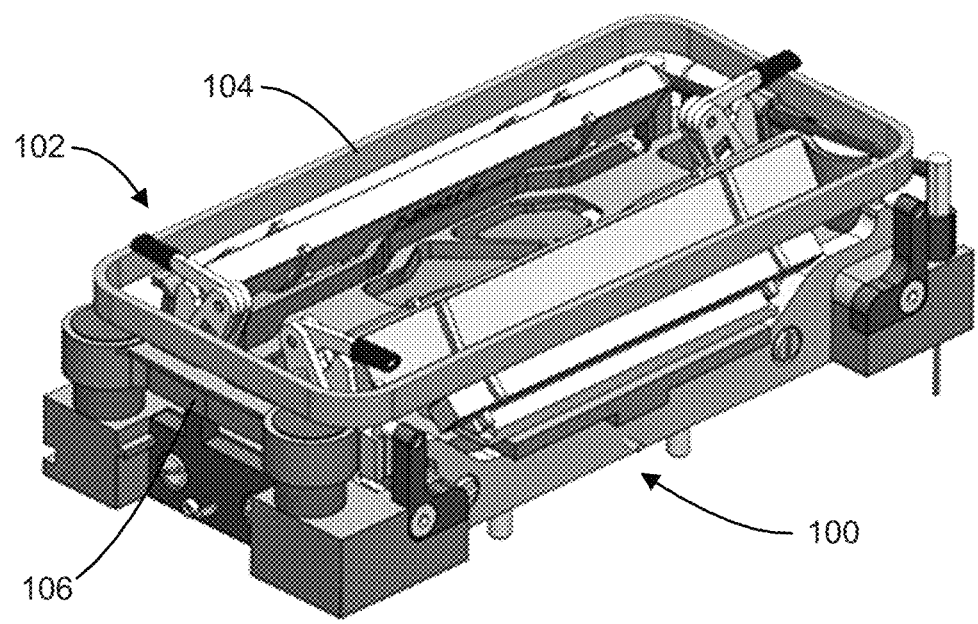
FIG. 1 illustrates an example nest device with placement mechanism, according to various embodiments.

Apparatuses, methods and storage medium associated with nest device design are disclosed herein. In some embodiments, the apparatuses, methods, and storage medium described herein may include and/or be related to a nest device for positioning a part. The nest device may include a main body and one or more air bearings that extend from a side of the main body. A placement mechanism may be positioned on ends of the one or more air bearings, the ends of the one or more air bearings opposite to the main body, wherein the placement mechanism includes the part. The one or more air bearings may be to blow air out of the ends of the one or more air bearings against the placement mechanism when the air bearings are in a first state, wherein the air blown by the air bearings causes placement mechanism to hover off of the air bearings; and draw air in through the ends of the one or more air bearings when the air bearings are in a second state, wherein the air drawn in generates suction with the placement mechanism to maintain a position of the placement mechanism. The nest device may further include one or more air jets that extend from the side of the main body and are directed toward the placement mechanism, wherein the one or more air jets are to blow air against the placement mechanism, and wherein the air blown by the one or more air jets causes the placement mechanism to be translated relative to the main body.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The description may refer to air being blown or drawn in by features (such as air bearings and/or air jets) described throughout this disclosure. It is to be understood that air may be utilized in some embodiments, although other gases may be utilized in other embodiments (i.e. other gases may be blown or drawn in by the features).

The description may refer to an x-axis, a y-axis, and a z-axis in terms of direction throughout the disclosure. The x-axis may refer to an axis that extends along the width of the nest device, the y-axis may refer to an axis that extends along the length of the nest device, and the z-axis may refer to an axis that extends perpendicular to the width and the length of the nest device. Further, when the description refers to translating a component in the x-direction, the y-direction, or the z-direction, it is to be understood that the component is translated in the x-axis, the y-axis, or z-axis, respectively.

FIG. 1 illustrates an example nest device 100 with placement mechanism 102, according to various embodiments. The placement mechanism 102 may include a part 104 and a carrier 106 on which the part 104 may be positioned and/or affixed to facilitate movement of the part 104. The nest device 100 may cause force to be applied to the placement mechanism 102 to position the part 104 in an intended position. In particular, the nest device 100 may include one or more air bearings (see air bearings 206 (FIG. 2) and/or air bearing 500 (FIG. 5)) and/or air jets (see air jets 1602 (FIG. 16), air jet mechanisms 1802 (FIG. 18), and/or air jet mechanisms 1900 (FIG. 19A and FIG. 19B)) that blow air against, and/or generate suction with, one or both of the part 104 and the carrier 106 (as is described throughout this disclosure). For example, one or more air bearings of the nest device 100 may blow air against the carrier 106 to hover the placement mechanism 102 off of the air bearings of the nest device 100 when positioning the placement mechanism 102, and may generate suction with the carrier 106 to suction the carrier 106 against the air bearings and maintain a position of the placement mechanism 102. Further, when the placement mechanism 102 is levitated off of the air bearings, the air jets may blow air against one or both of the part 104 and the carrier 106 to translate the placement mechanism 102 in the x-direction and/or the y-direction.

In other embodiments, the carrier 106 may be omitted from the placement mechanism 102. In these embodiments, the placement mechanism 102 may include only the part 104. Further, the one or more air bearings and/or air jets of the nest device 100 may blow air against, and/or generate suction with, the part 104. For example, the one or more air bearings of the nest device 100 may blow air against the part 104 to hover the placement mechanism 102 off of the air bearings of the nest device 100 when the positioning the placement mechanism 102, and may generate suction with the part 104 to suction the part 104 against the air bearings and maintain the position of the placement mechanism 102. Further, when the placement mechanism 102 is levitated off of the air bearings, the air jets may blow air against the part 104 to translate the placement mechanism 102 in the x-direction and/or the y-direction.

The carrier 106 may be omitted in instances where the part 104 has a shape that provides sufficient surface area and geometry for the air bearings and/or the air jets of the nest device 100 to cause sufficient force to be applied to the part 104 for proper operation in accordance with this disclosure. Whereas, the carrier 106 may be included in the placement mechanism 102 in instances where the part 104 has a shape that does not provide sufficient surface area and/or geometry for the air bearings and/or air jets of the nest device 100 to cause sufficient force, or intended direction of force, to be applied to the part 104 for proper operation in accordance with the disclosure. For example, the part 104 in the illustrated embodiment is a frame that does not have sufficient surface area in a direction perpendicular to the air bearings of the nest device 100 for the part 104 to be properly hovered off of the air bearings of the nest device 100 by itself. Accordingly, the carrier 106 is included in the placement mechanism 102 in the illustrated embodiment for proper operation in accordance with the disclosure.

The nest device 100 may position the part 104 at an intended position relative to the nest device 100 and may maintain the part 104 at the intended position as the nest device 100 is moved. The nest device 100 may position the part 104 by causing force to be applied to the placement mechanism 102 via the air bearings and/or air jets of the nest device 100.

In embodiments where the placement mechanism 102 includes the carrier 106, the carrier 106 may be positioned on the air bearings of the nest device 100. In some embodiments, the carrier 106 may remain on the air bearings of the nest device 100 as the part 104 is interchanged and, therefore, the carrier 106 may not need to be placed on the air bearings each time the part 104 is interchanged with a new part. The part 104 may be placed on the carrier 106 within 2 millimeters (mm) of the intended position. The nest device 100 may move the part 104, via causing force to be applied to the placement mechanism 102, to within 10 μm of the intended position and may maintain the position of the part 104 after the movement of the part 104 is completed, as is described further throughout this disclosure.

In embodiments where the carrier 106 is omitted from the placement mechanism 102, the part 104 may be placed directly on the air bearings of the nest device 100 rather than on the carrier 106. The part 104 may be placed on the air bearings of the nest device 100 within 2 millimeters (mm) of the intended position. The nest device 100 may move the part 104, via causing force to be applied to the placement mechanism 102 (which is only the part 104 in these embodiments), to within 10 µm of the intended position and may maintain the position of the part 104 after the movement of the part 104 is completed, as is described further throughout this disclosure.

The part 104 may include a frame for a mobile device (such as cell phone). The frame may be mounted to an outer edge of the mobile device when installed on the mobile device. The part 104 may include a substantially rectangular frame with an aperture formed in the middle of the frame. For example, the part 104 may include a rectangular frame with curved corners with an aperture formed in the middle of the frame. In other embodiments, the part 104 may be any other shape and/or size that may be positioned on the nest device 100. In some embodiments for example, the part 104 may include the substantially rectangular frame without the aperture formed in the middle of the frame.

Figure 2:
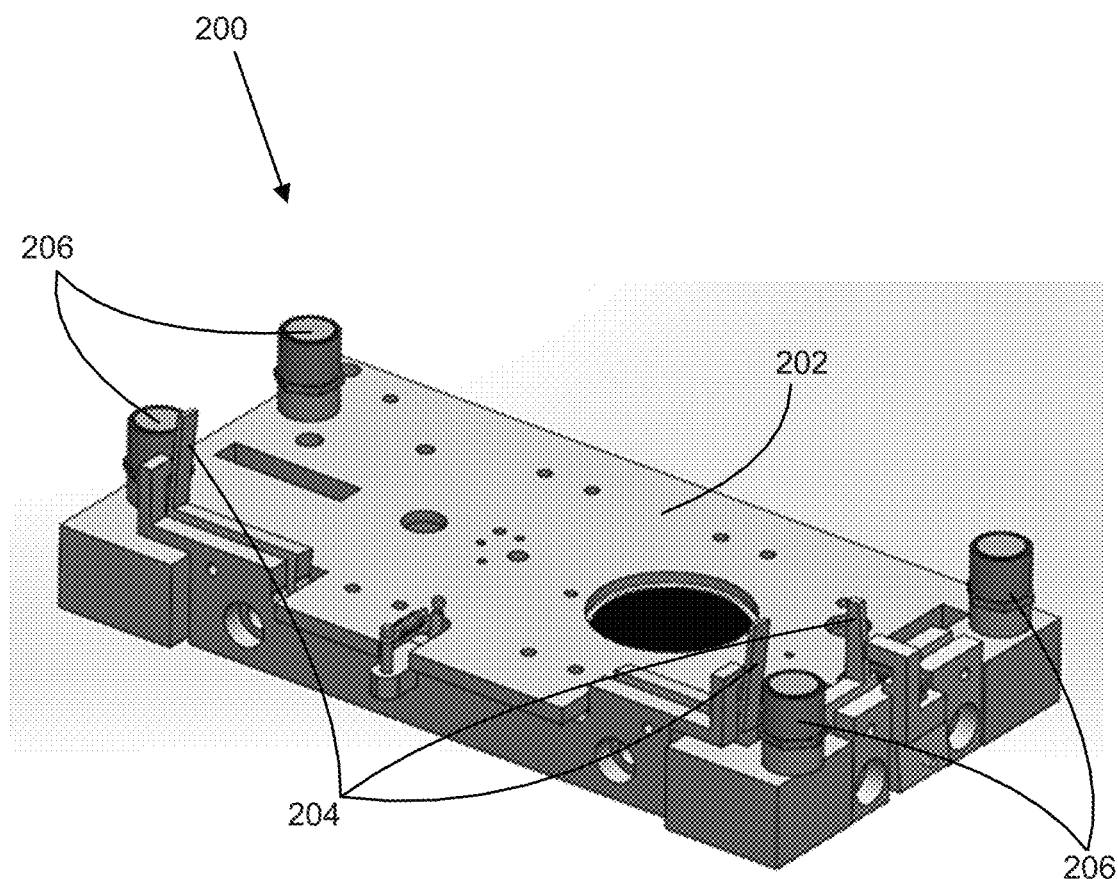
FIG. 2 illustrates a portion of an example nest device, according to various embodiments.

FIG. 2 illustrates a portion of an example nest device 200, according to various embodiments. The nest device 200 may include one or more of the features of the nest device 100 (FIG. 1). Further, the nest device 100 may include one or more of the features of the nest device 200. The nest device 200 may include a main body 202. The main body 202 may be coupled to a motion device, the motion device to move the nest device 200 via the coupling with the main body 202. For example, the main body 202 may be coupled to a track of an automation system, where the track moves the nest device 200 through the automation system by applying force to the main body 202.

The nest device 200 may further include one or more datum fingers 204 coupled to the main body 202. The datum fingers 204 may be utilized to position a part (such as the part 104 (FIG. 1)) relative to the nest device 200. In particular, the datum fingers 204 may define an intended position relative to the nest device 200 at which the part is to be positioned and maintained as the nest device 200 is moved by the motion device.

The datum fingers 204 may transition between two states: a first state where the datum fingers 204 are located in extended positions and utilized to position the part relative to the nest device 200; and a second state where the datum fingers 204 are located in retracted positions (different from the extended positions), and are to allow a placement mechanism (such as the placement mechanism 102 (FIG. 1)) to freely move on the air bearings without inadvertent contact between the part and the datum finger and to provide greater flexibility in placement of the part onto the carrier (such as the carrier 106 (FIG. 1)) or the air bearings 206. The datum fingers 204 may be configured to transition between the two states in response to one or more trigger events, expiration of one or more time periods, or some combination thereof. For example, in some embodiments, the datum fingers 204 may transition to the first state in response to an indication that the part has been placed on the nest device 200, an indication that the positioning mechanism has been translated away from the datum fingers, expiration of a certain time period after the indication that the part has been placed on the nest device, or some combination thereof. Further, the datum fingers 204 may transition to the second state in response to expiration of a certain time period after the indication that the part has been placed on the nest device 200, expiration of a certain time period since the datum fingers 204 transitioned to the first state, indication that the part has been moved against the datum fingers 204, or some combination thereof.

The nest device 200 may position the part in the intended position relative to the nest device 200 by moving the part into contact with one or more of the datum fingers 204 when the datum fingers 204 are in the extended position. The datum fingers 204 may be in the retracted position when the placement mechanism and/or the part is initially placed on the nest device 200. The nest device 200 may begin by moving the part away from the datum fingers 204 via blowing air against the placement mechanism to ensure that the datum fingers 204 do not contact the placement mechanism when transitioning to the extended positions. After the part is moved away from the datum fingers 204, the datum fingers 204 may be transitioned to the extended positions. With the datum fingers 204 in the extended positions, the nest device 200 may move the part against one or more of the datum fingers 204 to position the part in the intended position relative to the nest device 200. In some embodiments, the part may be positioned within 10 µm of the intended position in response to being moved against the datum fingers 204. Once the part has been positioned in the intended position, the datum fingers 204 may be transitioned to the retracted positions, allowing the placement mechanism to be suctioned against air bearings 206 of the nest device 200 without interference from the datum fingers 204.

The nest device 200 may further include one or more air bearings 206. The air bearings 206 may transition between two states: a first state where the air bearings 206 blow air out of the ends of each of the air bearings 206, the ends of each of the air bearings 206 located opposite to the main body 202; and a second state where the air bearings 206 draw air in through the ends of each of the air bearings 206. The air bearings 206 may transition between the two states in response to one or more trigger events, expiration of one or more time periods, or some combination thereof. For example, in some embodiments, the air bearings 206 may transition to the first state in response to an indication that the part has been placed on the nest device 200, expiration of a certain period of time after the part has been placed on the nest device 200, or some combination thereof. Further, the air bearings 206 may transition to the second state in response to an expiration of a certain time period after the indication that the part has been placed on the nest device 200, a certain time period after the air bearings 206 transitioned to the first state, an indication that the datum fingers 204 have been transitioned to the retracted positions after the part was translated to the intended positions, or some combination thereof. In some embodiments, the air bearings 206 may transition to the first state prior to the datum fingers 204 being transitioned to the extended state prior to the positioning of the part and the datum fingers 204 may be transitioned to the retracted state prior to the air bearings 206 being transitioned to the second state after the part has been moved against the datum fingers 204.

The air bearings 206 may blow air out of the ends of each of the air bearings 206 when the placement mechanism is being moved, and may draw air in through the ends of each of the air bearings 206 to suction the placement mechanism against the ends of each of the air bearings 206 and maintain the position of the placement mechanism when the part has been positioned in the intended position. When the air bearings 206 are blowing air out of the ends, the air may be directed at the placement mechanism. The air may apply a force to the placement mechanism that causes the placement mechanism to hover off of the air bearings 206. Levitating the placement mechanism off of the air bearings 206 may eliminate, or at least reduce, frictional force between the placement mechanism and the nest device 200 allowing the placement mechanism to be translated in the x-direction and/or the y-direction with a minimal amount of force applied to the placement mechanism.

When the air bearings 206 are drawing air in through the ends, the draw of the air may generate suction between the placement mechanism and the ends of each of the air bearings 206. The placement mechanism may be suctioned against the ends of each of the air bearings 206. The position of the placement mechanism may be maintained when the placement mechanism is suctioned against the ends of each of the air bearings 206. Once the part is moved into the intended position, the placement mechanism may be suctioned against the ends of each of the air bearings 206, which may maintain the position of the placement mechanism relative to the nest device 200 as the nest device 200 is moved.

Figure 5:
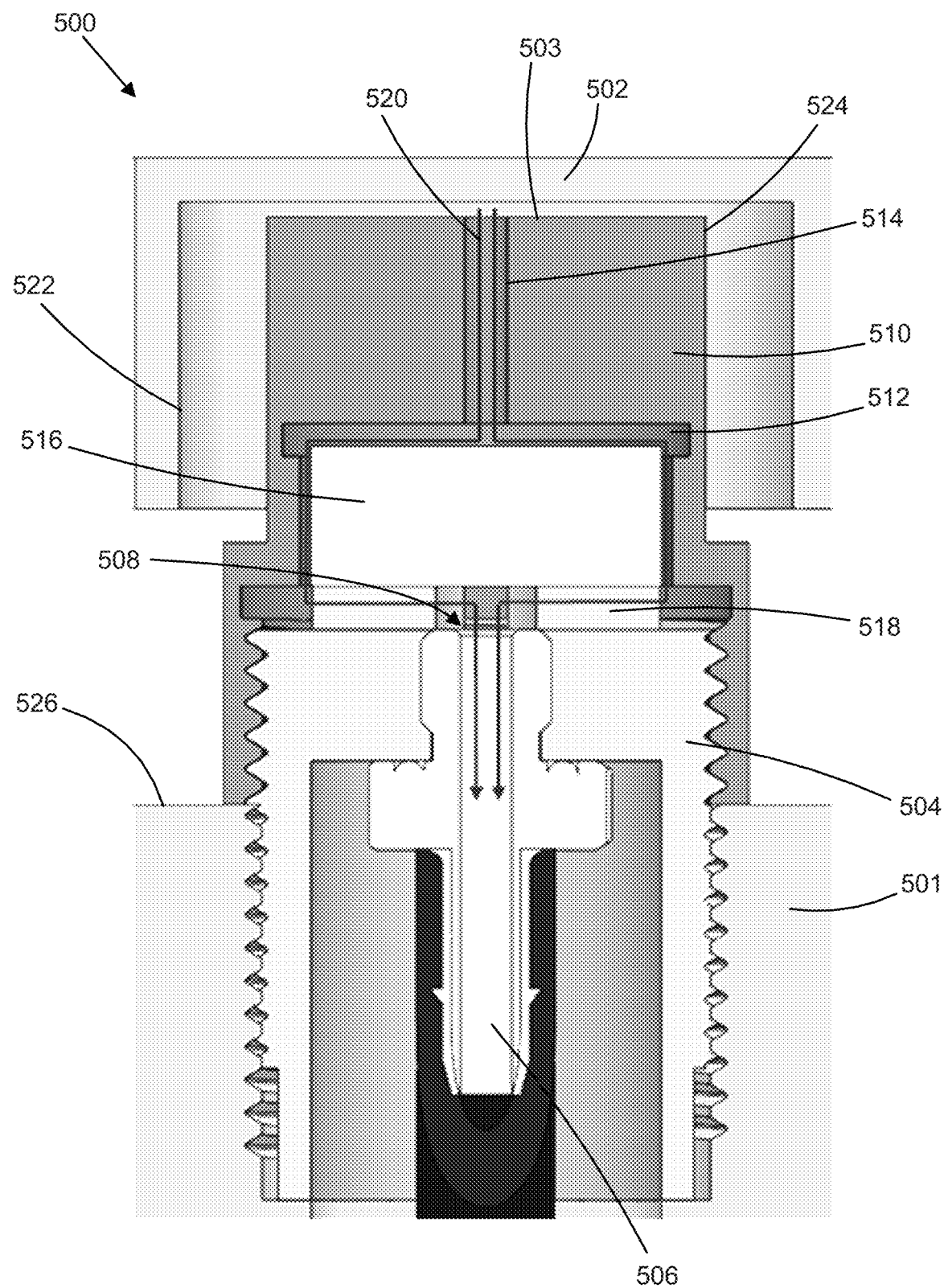
FIG. 5 illustrates a cross-sectional view of an example air bearing in a first state, according to various embodiments.
Figure 6:
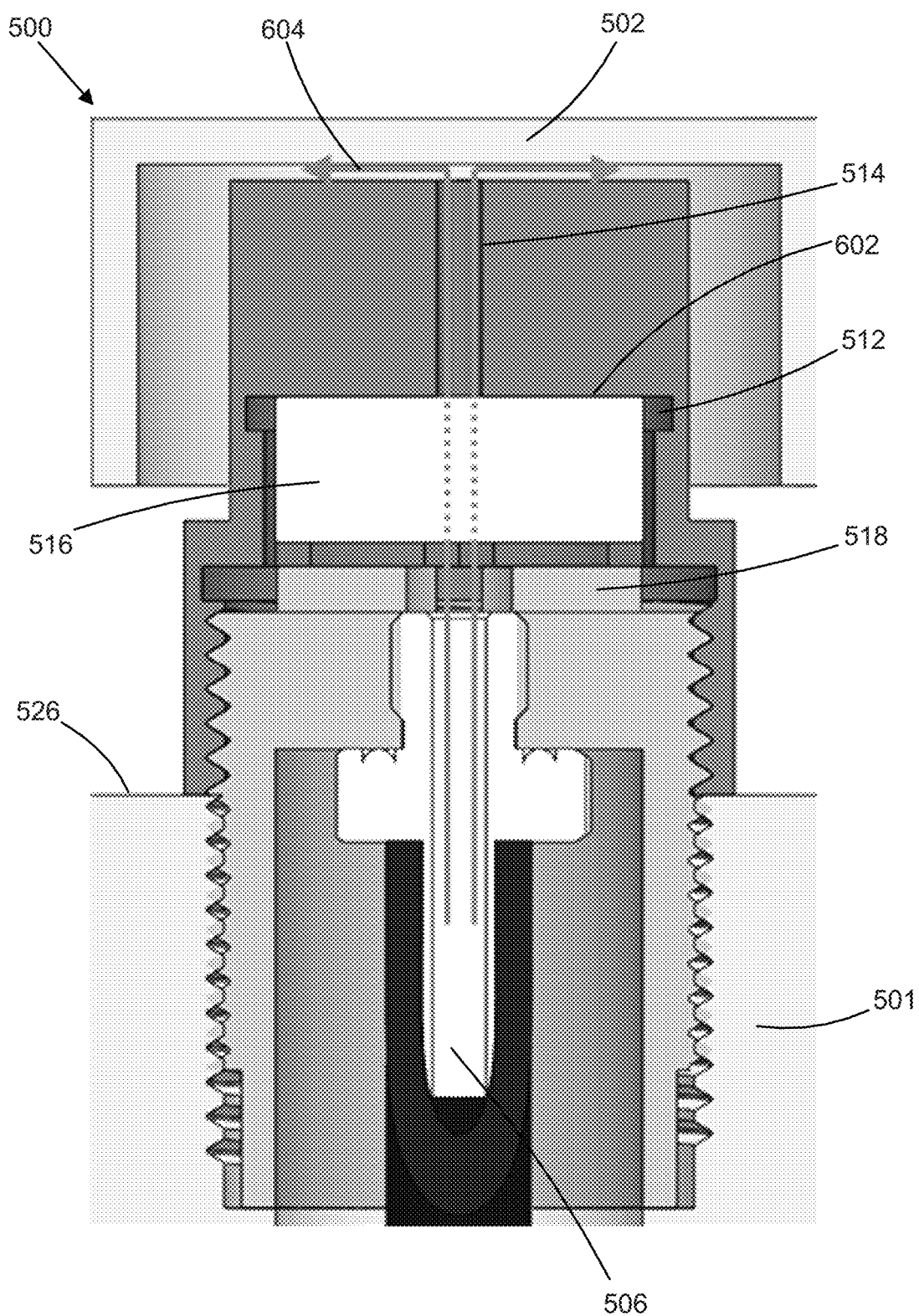
FIG. 6 illustrates the example air bearing of FIG. 5 in a second state, according to various embodiments.

Further description of the operation of the air bearings 206 is provided in relation to FIG. 5 and FIG. 6 of this disclosure.

Figure 3:
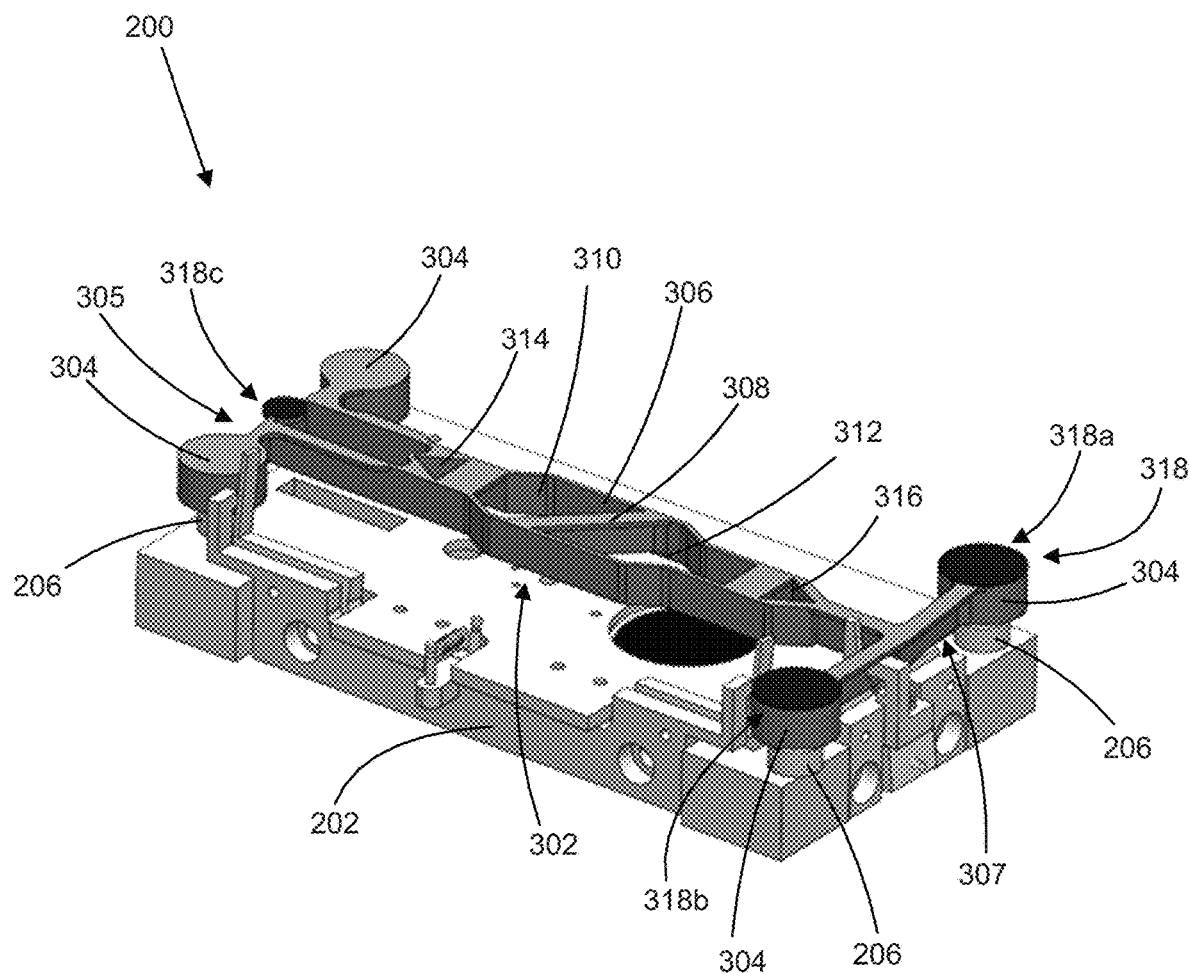
FIG. 3 illustrates the nest device of FIG. 2 with an example carrier, according to various embodiments.

FIG. 3 illustrates the nest device 200 of FIG. 2 with an example carrier 302, according to various embodiments. In the illustrated embodiment, the carrier 302 may be positioned on the air bearings 206 of the nest device 200. The carrier 302 may include one or more of the features of the carrier 106 (FIG. 1). Further, the carrier 106 may include one or more of the features of the carrier 302. The carrier 302 may be included in a placement mechanism (such as the placement mechanism 102 (FIG. 1)). In some embodiments, the carrier 302 may be coupled to the air bearings 206 of the nest device 200 and may remain coupled to the air bearings 206 as a part (such as the part 104 (FIG. 1)) of the placement mechanism is interchanged.

The carrier 302 may include one or more support elements 304. The support elements 304 may be positioned on the air bearings 206. Each of the support elements 304 may be positioned on a corresponding air bearing 206, for a one-to-one ratio between the air bearings 206 and the support elements 304. Each of the support elements 304 may at least partially encompass the corresponding air bearings 206. In the illustrated embodiment, the carrier 302 includes four support elements 304 and the nest device 200 includes four air bearings 206, where each of the four support elements 304 at least partially encompasses corresponding ones of the four air bearings 206. Further, in the illustrated embodiment, the four support elements 304 are located at four corners of the carrier 302.

The carrier 302 may further include a body 306. The body 306 may extend among the support elements 304 and may couple the support elements 304 to each other. The body 306 may include a crossbar 308. The crossbar 308 may extend between a side of the body 306 and an opposite side of the body 306, with a cutout 310 formed on a side of the crossbar 308 and a cutout 312 formed on an opposite side of the crossbar 308. The crossbar 308 may extend diagonally from the side of the body 306 to the opposite side of the body 306. The crossbar 308 may be utilized for positioning the carrier 302 on the nest device 200, as is described further throughout this disclosure.

A first tapered cutout 314 and a second tapered cutout 316 may be formed in the body 306. The first tapered cutout 314 may be formed toward a first end 305 of the body 306, with the first tapered cutout 314 being tapered toward the first end 305. The second tapered cutout 316 may be formed toward a second end 307 of the body 306 (the second end 307 opposite to the first end 305), with the second tapered cutout 316 being tapered toward the second end 307. The first tapered cutout 314 and the second tapered cutout 316 may be utilized to re-center the carrier 302, as is described further throughout this disclosure (see FIG. 15 and the corresponding description). In other embodiments, the first tapered cutout 314 and the second tapered cutout 316 may be formed in different portions of the carrier 302 and/or may be tapered in different directions than shown in the illustrated embodiment.

The carrier 302 may further include one or more mounting elements 318. The mounting elements 318 may be formed of a material that prevents damage, or at least minimizes the chance of damage, to the part when the part is positioned on the carrier 302. For example, the mounting elements 318 may be urethane pads in some embodiments. The part may be positioned on the mounting elements 318 when the part is placed on the nest device 200.

The mounting elements 318 may be located on a top surface of the carrier 302, the top surface being opposite to the main body 202 of the nest device 200. In particular, the mounting elements 318 may be located on a top surface of the body 306, top surfaces of one or more of the support elements 304, or some combination thereof. In the illustrated embodiment, a first mounting element 318a and a second mounting element 318b are located on the support elements 304 at the second end 307 of the carrier 302 and a third mounting element 318c is located on the body 306 at the first end 305 of the carrier 302. The first mounting element 318a, the second mounting element 318b, and the third mounting element 318c may form a triangular layout, which may reduce a risk of warpage to the part when the part is placed on the carrier 302. In some embodiments, the mounting elements 318 may be located on different portions of the top surface of the carrier 302 than illustrated and may form a layout different than the triangular layout. Further, in some embodiments, the mounting elements 318 may be omitted.

Figure 4A:
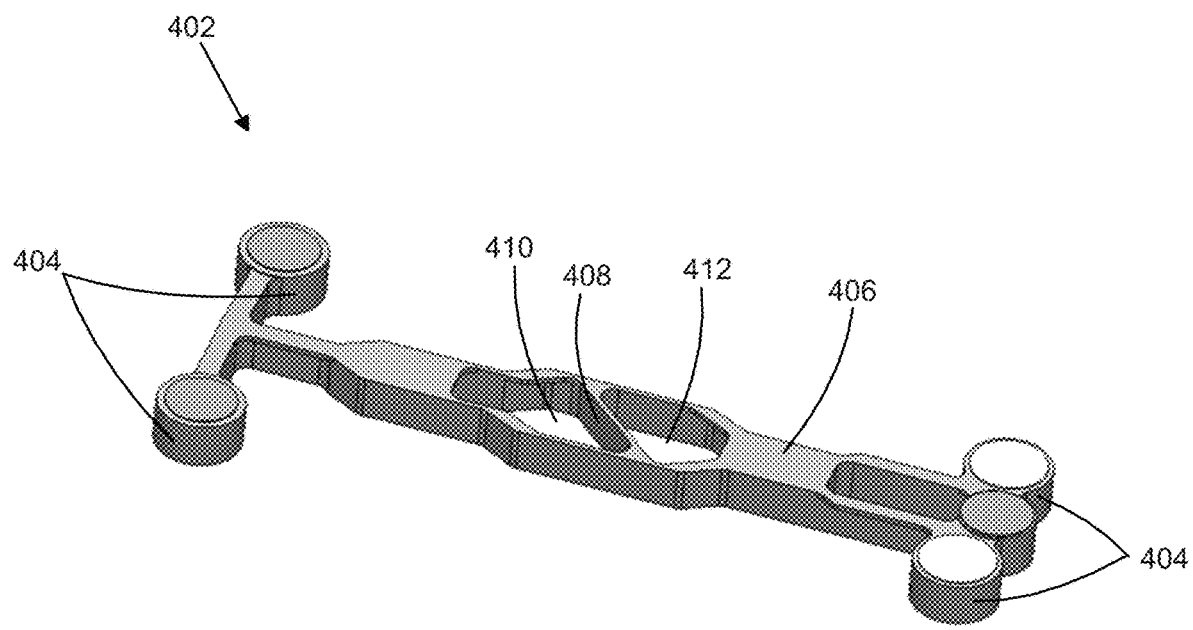
FIG. 4A illustrates a top, perspective view of another example carrier, according to various embodiments.

FIG. 4A illustrates a top, perspective view of another example carrier 402, according to various embodiments. The carrier 402 may include one or more features of the carrier 302 (FIG. 3). In some embodiments, the carrier 402 may include the same features as the carrier 302 with the exception of the differences described in relation to the carrier 402 below.

The carrier 402 may include support elements 404 with a body 406 that extends among the support elements 404 and couples the support elements 404 to each other. The support elements 404 may include one or more of the features of the support elements 304 (FIG. 3). Further, the body 406 may include one or more of the features of the body 306 (FIG. 3).

The body 406 may omit the first tapered cutout 314 (FIG. 3) and the second tapered cutout 316 (FIG. 3) of the carrier 302. In particular, the material of the body 406 may extend across locations where the first tapered cutout 314 and the second tapered cutout 316 would be formed in the body 406.

The body 406 may include a crossbar 408, a cutout 410 formed on one side of the crossbar 408, and a cutout 412 formed on an opposing side of the crossbar 508. The crossbar 408 may include one or more of the features of the crossbar 308 (FIG. 3). Further, the cutout 410 and the cutout 412 may include one or more of the features of the cutout 310 (FIG. 3) and the cutout 312 (FIG. 3).

Figure 4B:
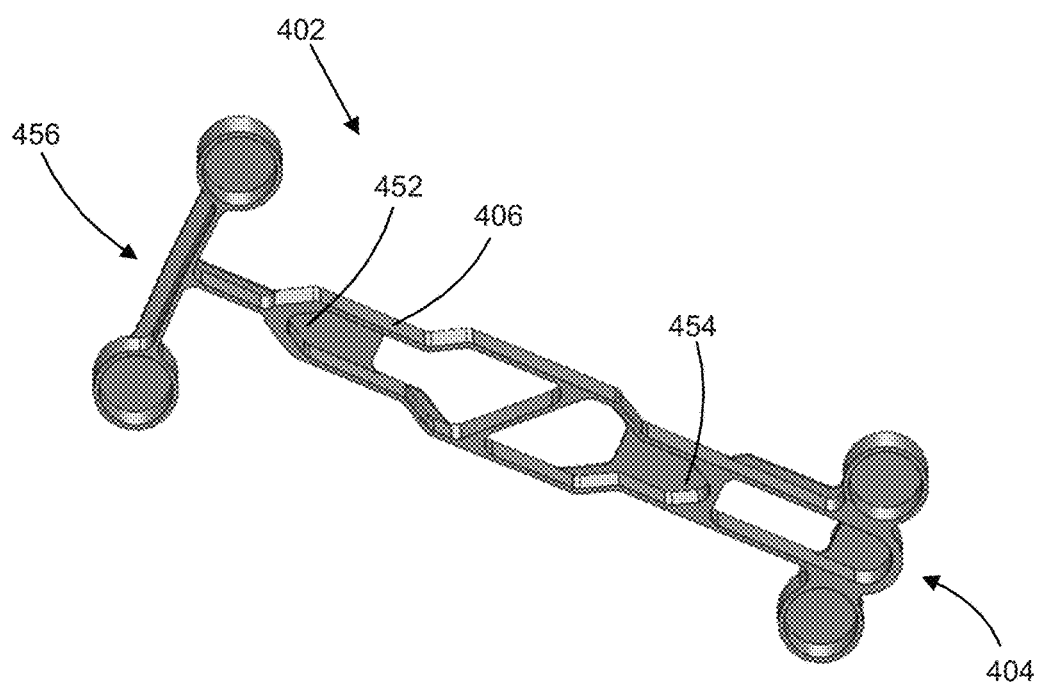

FIG. 4B illustrates a bottom, perspective view of the example carrier 402 of FIG. 4a. The carrier 402 may include a first tapered recess 452 and a second tapered recess 454. The first tapered recess 452 may be formed toward a first end 456 of the body 406, with the first tapered recess 452 being tapered to toward the first end 456. The second tapered recess 454 may be formed toward a second end 458 of the body 406 (the second end 458 opposite to the first end 456), with the second tapered recess 454 being tapered toward the second end 458. The first tapered recess 452 and the second tapered recess 454 may be utilized for the same operations as the first tapered cutout 314 and the second tapered cutout 316, respectively. In particular, the first tapered recessed 452 and the second tapered recess 454 may be utilized to re-center the carrier 402, as is described throughout this disclosure (see FIG. 15 and the corresponding disclosure). In other embodiments, the first tapered recess 452 and the second tapered recess 454 may be formed in different portions of the carrier 402 and/or may be tapered in different directions than shown in the illustrated embodiment.

FIG. 5 illustrates a cross-sectional view of an example air bearing 500 in a first state, according to various embodiments. The air bearing 500 may be implemented in the nest device 100 (FIG. 1) and/or the nest device 200 (FIG. 2). For example, the air bearings 206 (FIG. 2) may include one or more of the features of the air bearing 500. In the first state, the air bearing 500 may be drawing air in through the end 503 of the air bearing 500. The air bearing 500 may include a body 503 that couples to a nest device and extends from the nest device. The body 503 may include a cap 510 and a base 504, wherein the end 503 through which the air bearing 500 draws is along the cap 510.

A support element 502 may be positioned on the end 503 of the air bearing 500, wherein the end 503 is located opposite to a main body 501 of a nest device. The support element 502 may include one or more of the features of the support elements 304 (FIG. 3), the support elements 404 (FIG. 4), or some combination thereof. A circumference of an inner wall 522 of the support element 502 may be greater than a circumference of an outer wall 524 of the end 503 the air bearing 500, which may leave space between the inner wall 522 and the outer wall 524 allowing for translation of the support element 502 in directions parallel to a surface 526 of the main body 501 (i.e. translation in the x-direction and/or the y-direction). In some embodiments, a radius of the inner wall 522 may be at least 4 millimeters larger than the radius of the outer wall 524, which may allow for translation of the support element 502 of at least 2 millimeters in the directions from a position where the support element 502 is centered over the cap 510 of the air bearing 500.

When the air bearing 500 is drawing air in through the end 503 of the air bearing 500, suction may be generated between the support element 502 and the end 503 of the air bearing 500, which may draw the support element 502 against the end 503 of the air bearing 500 and maintain a position of the support element 502. In particular, the suction of the support element 502 to the end 503 of the air bearing 500 may prevent translation of the support element 502 in directions parallel to the surface 526 of the main body 501 (i.e. translation in the x-direction and/or the y-direction), or at least require a greater amount of force to be applied to the support element 502 than when the suction is not being generated.

The air bearing 500 may include the base 504. The base 504 may be coupled to a main body 501 of a nest device and may affix the air bearing 500 to the main body 501. The main body 501 may include one or more features of the main body 202 (FIG. 2). In the illustrated embodiment, the base 504 may include a threaded circumference and the main body 501 may include a threaded aperture, wherein the base 504 may be screwed into the threaded aperture to affix the base 504 to the main body 501. In some embodiments, the base 504 may be affixed to the main body 501 via other means known to one having ordinary skill in the art, including via epoxy and/or via friction. Further, in some embodiments, the base 504 may be part of the main body 501 and/or formed of the same piece of material as the main body 501.

The air bearing 500 may include an air supply 506. The air supply 506 may extend into the base 504 and may be affixed to the base 504 with an aperture 508 of the air supply 506 (through which air is supplied and/or drawn) directed toward the end 503 of the air bearing 500 on which the support element 502 is located. The air supply 506 may be bi-directional, wherein the air supply 506 may blow air out of the aperture 508 and may draw air in through the aperture 508 at different times. In some embodiments, the air supply 506 may be uni-directional, wherein the air supply 506 may either blow air out of the aperture 508 or draw air in through the aperture 508.

The air bearing 500 may further include a cap 510. The cap 510 may be affixed to the base 504 at an end of the base 504 opposite to the main body 501. A cavity 512 may be formed in a center of the cap 510. The aperture 508 of the air supply 506 may be directed into the cavity 512 and the air supply 506 may blow air into and/or draw air out of the cavity 512 via the aperture 508. Further, a tunnel 514 may be formed in the cap 510. The tunnel 514 may be coupled to the cavity 512 and may extend to the end 503 of the air bearing 500 opposite to the main body 501. Air directed into the cavity 512 by the air supply 506 may pass out of the end 503 of the air bearing 500 via the tunnel 514. Further, air may be drawn into the cavity 512 via the tunnel 514 when the air supply 506 draws air out of the cavity 512.

The air bearing 500 may further include a regulator 516. The regulator 516 may be located within the cavity 512 formed in the cap 510. The regulator 516 may be formed of a porous material. The porous material that forms the regulator 516 may be selected based on an amount of air flow intended to pass through the regulator 516. In some embodiments, the regulator 516 may be formed of a porous polyethylene. Further, in some embodiments, the regulator 516 may be formed of a porous material with a pore size of between 50 and 90 microns. It is to be understood that the regulator 516 may be formed of any other porous material, and/or may have any other pore sizes and/or levels of porosity in other embodiments. Further, the regulator 516 may be formed of a non-porous material with one or more apertures and/or channels formed in the non-porous material that allow a limited amount of air flow through the regulator 516. The regulator 516 may regulate an amount of air flow that passes through the regulator 516. In particular, the regulator 516 may limit the amount of air to a maximum level of flow and/or to a certain level of flow based on a pressure of the air applied to regulator 516, the pore size of the porous material, the porosity of the porous material, or some combination thereof.

In the first state, the air supply 506 may be drawing air out of the cavity 512. When the air supply 506 is drawing air out of the cavity 512, the regulator 516 may be drawn toward the air supply 506 and may set on one or more spacers 518 of the base 504. The spacers 518 may maintain a distance between the aperture 508 of the air supply 506 and the regulator 516. Further, the spacers 518 may be arranged such that air may pass between the spacers 518. In some embodiments, the spacers 518 may be arranged in a castellated arrangement with spaces between the spacers 518 through which air may pass. With the regulator 516 set on the spacers 518 and the air supply 506 drawing air out of the cavity 512, air may flow (as indicated by arrows 520) into the cavity 512 via the tunnel 514, around the regulator 516, and out of the cavity 512 via the air supply 506. Based on the air flow being around the regulator 516, the amount of air, and/or the velocity of the air flow, drawn in through the tunnel 514 may be unregulated by the regulator 516. Accordingly, the amount of air, and/or the velocity of the air flow, drawn in through the tunnel 514 may be controlled by the air supply 506.

As the air is drawn in through the tunnel 514, suction may be generated between the end 503 of the air bearing 500 and the support element 502. The support element 502 may be drawn against the end 503 of the air bearing 500 and may be maintained in position against the end 503 of the air bearing 500 via the suction. Having the amount of air drawing in through the tunnel 514 being unregulated may allow for a high flow of air, which may cause the support element 502 to be quickly suctioned against the end 503 of the air bearing 500 and be maintained in position against the end 503 of the air bearing 500.

For the nest device 200 illustrated in FIG. 3, the air bearings 206 (FIG. 2), or some portion thereof, may be in the first state (i.e. drawing air in through the ends of the air bearings 206) and positions of the support elements 304 (FIG. 3) may be maintained on the air bearings 206 via suction between the support elements 304 and the air bearings 206. Based on the support elements 304 being maintained in position via the suction, the position of the carrier 302 may be maintained relative to the nest device 200. Further, in instances where the part 104 (FIG. 1) is located on the mounting elements 318 (FIG. 3), the position of the part 104 relative to the nest device 200 may be maintained based on the position of the carrier 302 being maintained.

In some embodiments, the support element 502, the carrier 302, and/or the carrier 402 may be omitted. In these embodiments, the part 104 may be located over the tunnel 514 of the air bearing 500. As the air is drawn in through the tunnel 514, the part 104 may be drawn against the end 503 of the air bearing 500 and suction may be generated between the part 104 and the end 503 of the air bearing 500. The position of the part 104 may be maintained against the end 503 of the air bearing 500 via the suction.

FIG. 6 illustrates the example air bearing 500 of FIG. 5 in a second state, according to various embodiments. In the second state, air may be blown out of the end 503 of the air bearing 500. In particular, the air supply 506 may blow air into the cavity 512. Air from the cavity 512 may exit the cavity 512 via the tunnel 514 and may be blown out of the end 503 of the air bearing 500.

The air being blown into the cavity 512 via the air supply 506 may cause the regulator 516 to lift off of the spacers 518 and be pressed against a top wall of 606 of the cavity 512 where the tunnel 514 may couple with the cavity 512 at the top wall 606. The regulator 516 may block direct paths of the air out of the end 503 of the air bearing 500 via the tunnel 514 causing the air to pass through the regulator 516 to exit the end 503 of the air bearing 500. A flow of the air (as indicated by arrows 604) may be directed into the cavity 512 from the air supply 506, may pass through the regulator 516 and out the end 503 of the air bearing 500 via the tunnel 514. The regulator 516 may limit an amount of air, and/or velocity of air flow, out the end 503 of the air bearing 500 to a certain amount of air, and/or velocity of air flow, based on a pressure of the air applied to regulator 516, the pore size of the porous material, the porosity of the porous material, or some combination thereof. Accordingly, an amount of air, and/or the velocity of the air flow, being blown out of the end 503 of the air bearing 500, may be limited by the regulator 516. The amount of air, and/or the velocity of the air flow, being blown out of the end 503 of the air bearing 500 in the second state may be less than the amount of air, and/or the velocity of the air flow, being drawn in through the end 503 of the air bearing 500 in the first state.

The air being blown out of the end 503 of the air bearing 500 may apply force to the support element 502, which may cause the support element 502 to hover off of the air bearing 500. The support element 502 hovering above the air bearing 500 may allow the support element 502 to be moved relative to the air bearing 500 with a minimal amount of force being applied to the support element 502. In particular, the support element 502 may be moved parallel to the surface 526 of the main body 501 (i.e. the x-direction and/or the y-direction) in response to force being applied to the support element 502. In some embodiments, the support element 502 may still be located on the end 503 of the air bearing 500 when the air is being blown out of the end 503 of the air bearing 500, although a frictional force between the support element 502 and the end 503 of the air bearing 500 may be reduced due to the air. Accordingly, the support element 502 may be moved parallel to the surface 526 of the main body 501 (i.e. the x-direction and/or the y-direction) in response to application of an amount of force that is less than a force needed to move the support element 502 relative to the end 503 of the air bearing 500 if the air was not being blown out of the end 503 of the air bearing 500.

For the nest device 200 illustrated in FIG. 3, the air bearings 206 (FIG. 2), or some portion thereof, may be in the second state (i.e. blowing air out through the ends of the air bearings 206). The air being blown out of the ends of the air bearings 206 may apply force to the corresponding support elements 304 (FIG. 3), causing the support elements 304 to hover above the air bearings 206 and/or have a reduced frictional force between the support elements 304 and the air bearings 206. Due to the support elements 304 hovering above and/or having reduced frictional force with the air bearings 206, the carrier 302 (FIG. 3) may be moved via applying a minimal amount of force to the placement mechanism 102 (FIG. 1). In particular, force may be applied to the carrier 302 and/or a part (such as the part 104 (FIG. 1)) coupled to the carrier 302 to move the carrier 302, as described throughout this disclosure.

In some embodiments, the support element 502, carrier 302, and/or the carrier 402 may be omitted. In these embodiments, a part (such as the part 104 (FIG. 1)) may be located over the tunnel 514 of the air bearing 500. As the air is blown out of the air bearing 500 via the tunnel 514, the air may apply force to the part, and cause the part to hover above the air bearings 206 and/or have a reduced frictional force between the part and the air bearings 206. The position of the part may be moved via application of a minimal amount of force to the part when the part is hovered above the air bearings 206. In some of these embodiments, the size and/or quantity of the tunnel 515 at the top of the air bearing 500 may be the same size and/or quantity as the air bearings 2102 illustrated in FIG. 21.

Figure 7:
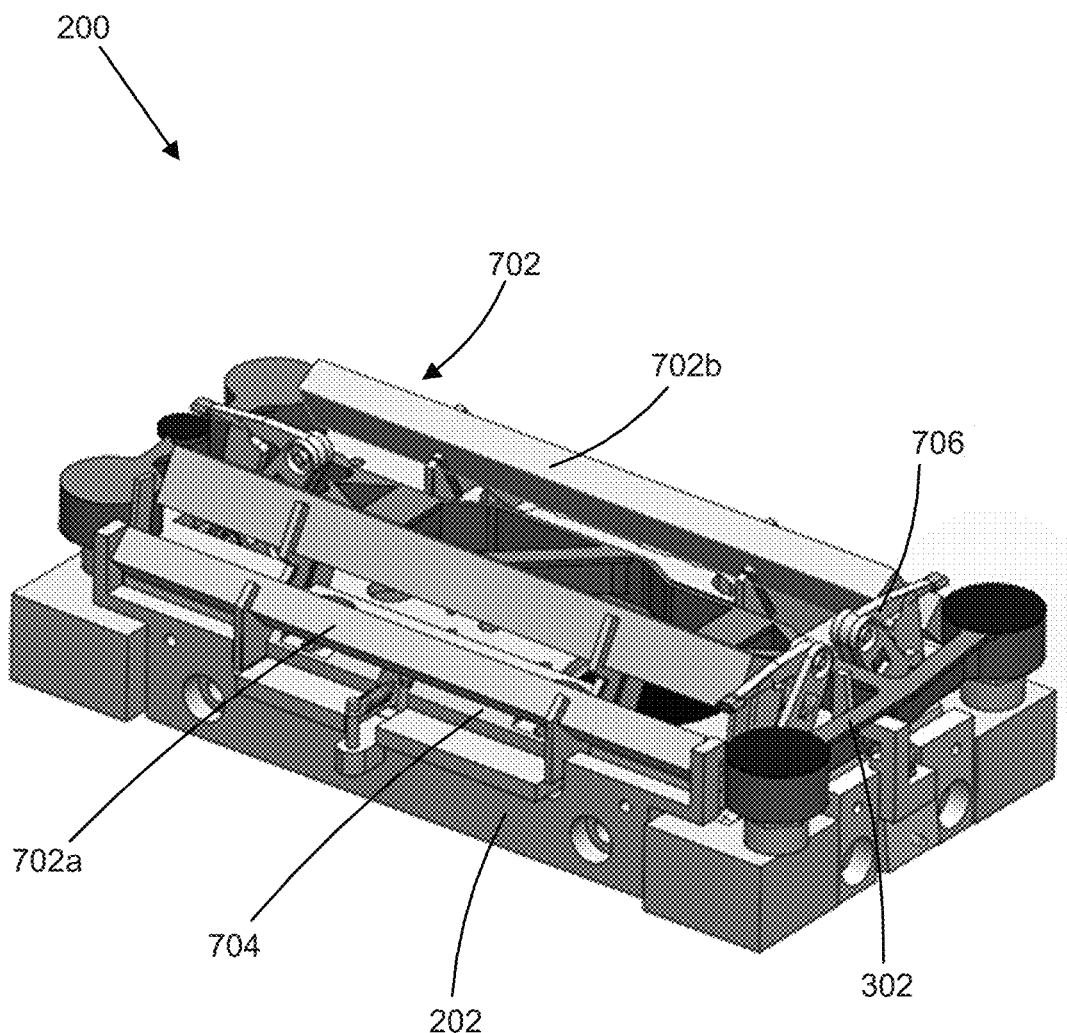
FIG. 7 illustrates another portion of the example nest device of FIG. 2, according to various embodiments.

FIG. 7 illustrates another portion of the example nest device 200 of FIG. 2, according to various embodiments. The nest device 200 may include one or more mirrors 702. The mirrors 702 may be positioned above the main body 202 of the nest device 200. Further, the mirrors 702 may be positioned to avoid interference with movement of a placement mechanism (such as the placement mechanism 102 (FIG. 1)). Still further, the mirrors 702 may be positioned such that a sensor (not shown), located separate from the nest device 200, may be able to sense alignment of a part (such as the part 104 (FIG. 1)), portions of the part, features of the part, and/or damage to the part without having to move the sensor from a single position. The mirrors 702 may provide a line-of-sight view for sensing the alignment of the part, the portions of the part, the features of the part, and/or the damage to the part. In the illustrated embodiment, a first set of mirrors 702a may be positioned to provide a line-of-sight view to a side of the part and a second set of mirrors 702b may be positioned to provide a line-of-sight to an opposing side of the part.

Each of the first set of mirrors 702a and the second set of mirrors 702b may be mounted to the main body 202 of the nest device 200 via a corresponding mirror mount 604. The mirror mount 604 may be coupled to the main body 202 and may maintain the mirrors 602 in certain locations relative to the main body. Features of the mirror mount 604 may be described further in relation to FIGS. 11-13. In some embodiments, the mirrors 702 may be omitted.

The nest device 200 may further include one or more clamps 706. The clamps 706 may mount to a top of the nest device 200, a bottom of the nest device 200, sides of the nest device 200, or some combination thereof. For example, the clamps 706 may mount to a top of the main body 202, a bottom of the main body 202, sides of the main body 202, or some combination thereof.

The clamps 706 may transition between a first state and a second state. In the first state, the clamps 706 may contact a part (such as the part 104 (FIG. 1)) and may maintain a position of the part relative to the carrier 302. In the second state, the clamps 706 may be out of contact with the part and may avoid contact with a placement mechanism (such as the placement mechanism 102 (FIG. 1)). Features of the clamps 706 are described further in relation to FIGS. 8A, 8B, 9, and 10. In some embodiments, the clamps 706 may be omitted. For example, the nest device 200 may include the clamps 706 where the placement mechanism includes the part and a carrier (such as the carrier 106 (FIG. 1), the carrier 302 (FIG. 3), and/or the carrier 402 (FIG. 4)) and the clamps 706 may maintain a position of the part relative to the carrier when in the first state. Whereas, the clamps 706 may be omitted, and/or be maintained in the second state, where the placement mechanism includes only the part and the air bearings (such as the air bearings 206 (FIG. 2) and/or the air bearing 500 (FIG. 5)) may maintain the position of the part relative to the nest device 200 via suction produced by drawing air in via the air bearings without the clamps 706 needed to maintain the position of the part.

Figure 8A:
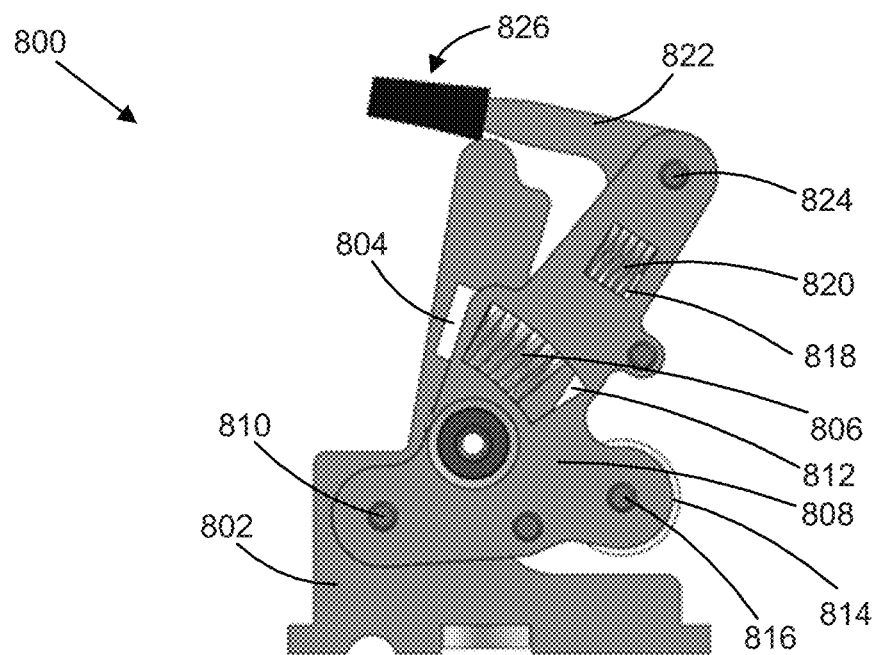
FIG. 8A illustrates an example clamp in the second state, according to various embodiments.

FIG. 8A illustrates an example clamp 800 in the second state, according to various embodiments. The clamp 800 may include one or more of the features of the clamps 706 (FIG. 7). Further, the clamps 706 may include one or more of the features of the clamp 800. The clamp 800 is illustrated in the second state (which may be referred to as a "retracted state") in FIG. 8A.

The clamp 800 may include a mount 802. The mount 802 may couple to a main body of a nest device (such as the main body 202 (FIG. 2)) and may affix the clamp 800 to the main body. The mount 802 may include a cutout 804 formed through the mount 802 to house a first spring 806. A first portion of the first spring 806 may be located within the cutout 804, while a second portion of the first spring 806 may extend outside of the cutout 804.

The clamp 800 may further include an intermediate member 808. The intermediate member 808 may be coupled to the mount 802 via a fastener 810. The intermediate member 808 may rotate about the fastener 810, where the fastener 810 operates as an axis of rotation for the intermediate member 808. The intermediate member 808 may extend along a side of the mount 802 and may abut the side of the mount 802. In some embodiments, the clamp 800 may include a second intermediate member located on an opposite of the mount 802 from the intermediate member 808. The second intermediate member may include one or more of the features of the intermediate member 808, and may have the same shape, operations, and interactions with the mount 802 and the contact member 822 as the intermediate member 808.

The intermediate member 808 may include a first cutout 812 formed in the intermediate member 808. The first cutout 812 may be substantially (within 5% variance) the same shape as the cutout 804 of the mount 802. The first cutout 812 may house, at least partially, the second portion of the first spring 806 that extends outside of the cutout 804.

Figure 8B:
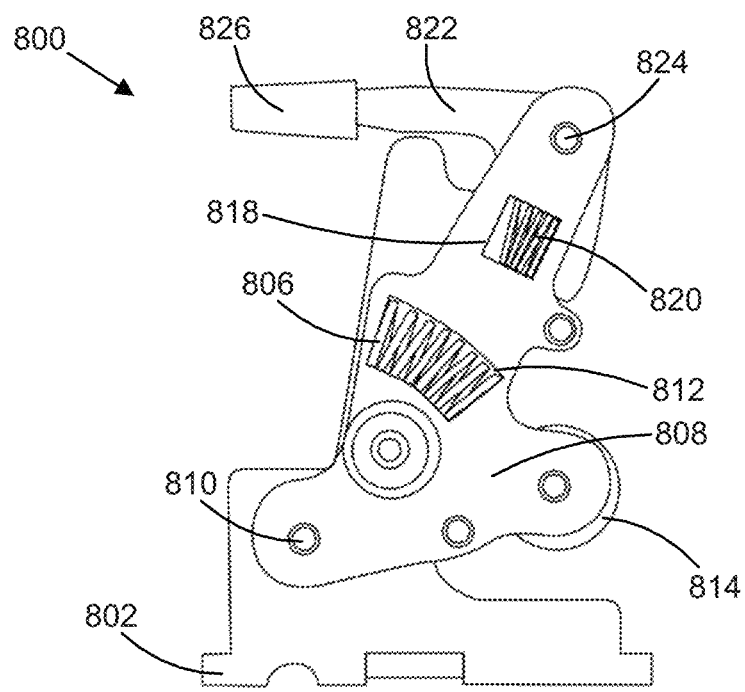
FIG. 8B illustrates the example clamp of FIG. 8A in the first state, according to various embodiments.

In the first state of the clamp 800, the first cutout 812 of the intermediate member 808 may be aligned with the cutout 804 of the mount 802 (as illustrated in FIG. 8B). In the first state, the first spring 806 may be expanded within the first cutout 812 of the intermediate member 808 and the cutout 804 of the mount 802. In the second state of the clamp 800, the first cutout 812 of the intermediate member 808 may be offset from the cutout 804 of the mount 802 due to rotation of the intermediate member 808 about the fastener 810. In the second state, the first spring 806 may be compressed between the cutout 804 of the mount 802 and the first cutout 812 of the intermediate member 808. When compressed, the first spring 806 may urge the clamp 800 back into the first state via urging the intermediate member 808 to rotate about the fastener 810 to the position where the first spring 806 is expanded.

The clamp 800 may further include an actuation member 814 coupled to the intermediate member 808. In the illustrated embodiment, the actuation member 814 is a wheel coupled to the intermediate member 808 by a fastener 816. The actuation member 814 may contact a means of actuation (as is described further in relation to FIG. 17) and facilitate transition of the clamp 800 between the first state and the second state. In particular, actuation member 814 may cause the intermediate member 808 to rotate about the fastener 810 to positions associated with the first state and the second state based on contact with the means of actuation, as is described further throughout this disclosure. In the second state of the clamp 800, the means of actuation may apply a downward force to the actuation member 814, which may cause the first spring 806 to be compressed as the intermediate member 808 rotates about the fastener 810 to a position associated with the second state. The clamp 800 may be in the second state based on the means of actuation applying the downward force to the actuation member 814.

The intermediate member 808 may further include a second cutout 818. The second cutout 818 may be formed through the intermediate member 808 to house a second spring 820. The second cutout 818 may house at least a first portion of a second spring 820, while a second portion of the second spring 820 may extend outside of the second cutout 818.

The clamp 800 may further include a contact member 822. The contact member 822 may be coupled to the intermediate member 822 via a fastener 824. The contact member 822 may rotate about the fastener 824, where the fastener 824 operates as an axis of rotation for the contact member 822. The contact member 822 may extend along a side of the intermediate member 808 and may abut the side of the intermediate member 808. Further, the contact member 822 may extend along the same plane as the mount 802, such that the contact member 822 may contact the mount 802 as the clamp 800 is transitioned between the first state and the second state (as described further in relation to FIG. 10).

The contact member 822 may further include a cutout (see cutout 1004 (FIG. 10)) formed in the contact member 822. The cutout of the contact member 822 may be substantially (within 5% variance) the same shape as the second cutout 818 of the intermediate member 808. The cutout of the contact member 822 may house, at least partially, the second portion of the second spring 820 that extends outside of the second cutout 818.

In the second state of the clamp 800, the cutout of the contact member 822 may be aligned with the second cutout 818 of the intermediate member 808. In the second state, the second spring 820 may be expanded within the cutout of the contact member 822 and the second cutout 818 of the intermediate member 808. In the first state of the clamp 800, the cutout of the contact member 822 may be offset from the second cutout 818 of the intermediate member 808. In the second state, the second spring 820 may be compressed between the cutout of the contact member 822 and the second cutout 818 of the intermediate member 808. When compressed, the second spring 820 may urge the contact member 822 into a position associated with the second state of the clamp 800, via urging the contact member 822 to rotate about the fastener 824 to position when the second spring 820 is expanded.

The clamp 800 may further include a contact pad 826. The contact pad 826 may be coupled to the contact member 822 at an end of the contact member opposite to where the contact member 822 is coupled to the intermediate member 808. The contact pad 826 may be formed of a padded and/or soft material that is to prevent damage to a part (such as the part 104 (FIG. 1)), or at least minimize the chance of damage to the part, when the clamp 800 contacts the part. In some embodiments, the contact pad 826 may be formed of urethane. The contact pad 826 may contact the part when the clamp 800 is in the first state and may be out of contact with the part when the clamp is in the second state.

FIG. 8B illustrates the example clamp 800 of FIG. 8A in the first state, according to various embodiments. In the first state, the contact pad 826 may contact the part (as described regards in FIG. 9).

In the first state, the intermediate member 808 may have rotated about the fastener 810 to a position where the first cutout 812 of the intermediate member 808 is aligned with the cutout 804 (FIG. 8) of the mount 802. The intermediate member 808 may have rotated about the fastener 810 to the position in response to force applied via the first spring 806. In the first state, the first spring 806 may be in an expanded state and may maintain the position of the intermediate member 808 relative to the mount 802.

Further, the contact member 822 may have rotated about the fastener 824 to a position where the second cutout 818 of the intermediate is offset for the cutout of the contact member 822. The contact member 822 may have rotated about the fastener 824 to the position in response to a force generated by a lower surface of the contact member 822 contacting the mount 802 (as described in relation to FIG. 10). In the first state, the second spring 820 may be compressed via the second cutout 818 of the intermediate member 808 and the cutout of the contact member 822, and may urge the contact member 822 toward a position of the contact member 822 relative to the intermediate member 808 associated with the second state of the clamp 800.

The clamp 800 may be in the first state based on an absence of force being applied to the actuation member 814 via the means of actuation. In response to the absence of force, the first spring 806 may cause the intermediate member 808 to rotate about the fastener 810 to a position associated with the first state. Further, the contact member 822 may have rotated about the fastener 824 to a position associated with the first state in response to the intermediate member 808 rotating about the fastener 810. The contact pad 826 may have been translated away from the mount 802 and in a downward direction from a position of the contact pad 826 in the second state (as is described further in relation to FIG. 9) in response to the change in the positions of the intermediate member 808 and the contact member 822.

Figure 9:
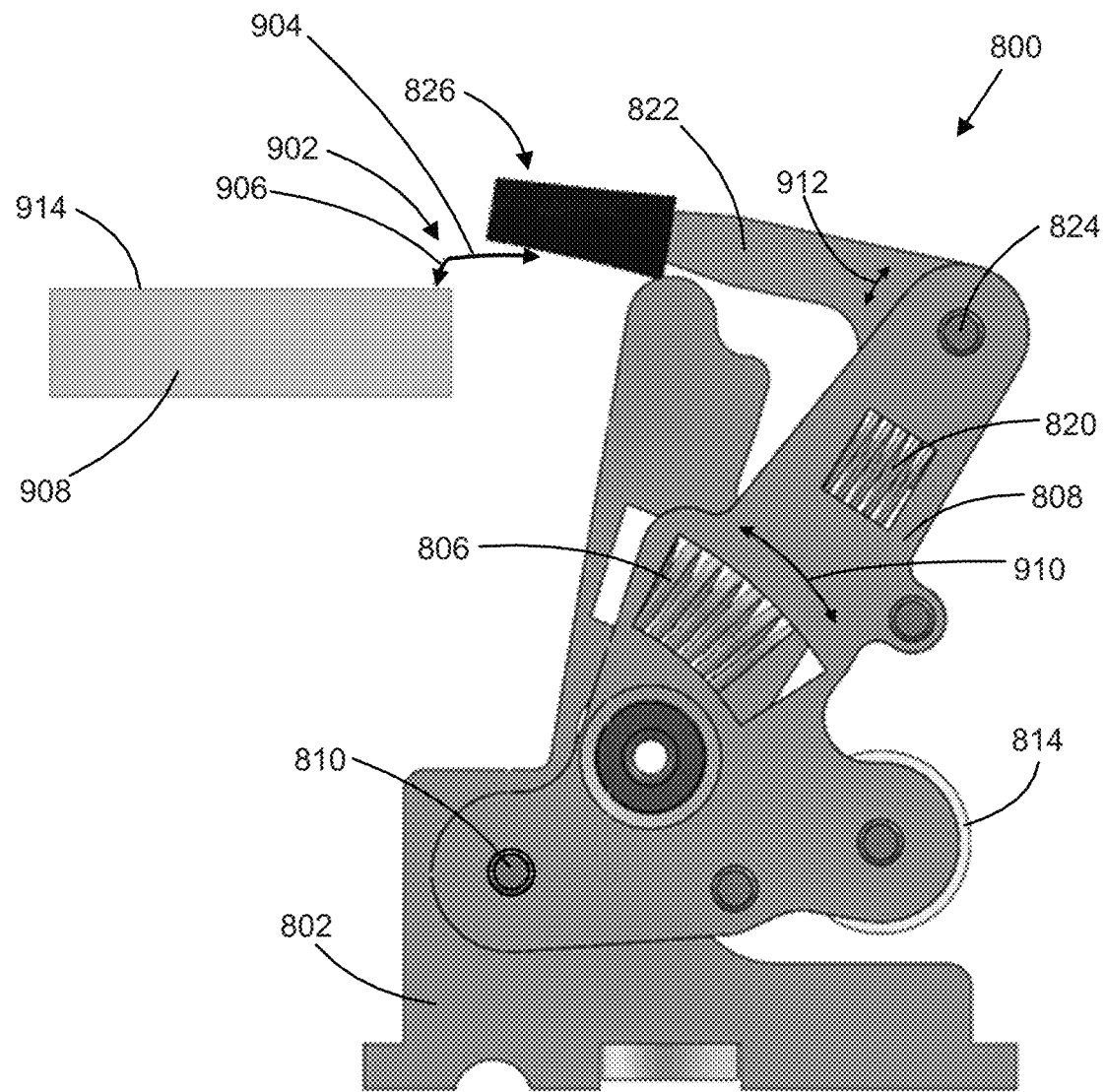
FIG. 9 illustrates an example travel path of the clamp of FIG. 8A and FIG. 8B between the first state and the second state, according to various embodiments.

FIG. 9 illustrates an example travel path of the clamp 800 of FIG. 8A and FIG. 8B between the first state and the second state, according to various embodiments. In transitioning between the first state and the second state, the contact pad 826 may travel along a contact pad travel path 902. In particular, the contact pad travel path 902 may illustrate where a point on the contact pad 826 travels in transition between the first state and the second state. The contact pad travel path 902 may include a first portion of travel 904 and a second portion of travel 906.

In the first portion of travel 904, the contact pad 826 may travel substantially (within 1 millimeter) horizontally (i.e. parallel to an object to which the clamp 800 is mounted). The substantially horizontal travel during the first portion of the travel 904 may be advantageous in embodiments where there is limited clearance above the clamp 800. In some embodiments, the clamp 800 may be mounted on a nest device (such as the nest device 100 (FIG. 1) and/or the nest device 200 (FIG. 2)) with a clearance of 10 millimeters above the nest device, wherein the clamp 800 may cause interference if the clamp extends greater than 10 millimeters from the nest device at any point along the contact pad travel path 902. Further, in some embodiments, the clearance above the nest device may be 6 millimeters.

In the second portion of travel 906, the contact pad 826 may travel in a substantially vertically (i.e. perpendicular to an object to which the clamp 800 is mounted). In some embodiments, the contact pad 826 may travel within 15 degrees of exact vertical travel during the second portion of travel 906. In some embodiments, the contact pad 826 may travel further in the horizontal direction than in the vertical direction in the first portion of travel 904 and may travel further in the vertical direction than in the horizontal direction during the second portion of travel 906.

The increased vertical movement and the decreased horizontal movement of the contact pad 826 during the second portion of travel 906 may limit relative motion between the contact pad 826 and a part 908 in the horizontal direction. The part 908 may include one or more of the features of the part 104 (FIG. 1) and may be a part of a placement mechanism (such as the placement mechanism 102 (FIG. 1)). The limited relative motion in the horizontal direction may reduce risk of damage and/or warpage to the part 908 due to contact of the contact pad 826. Further, the contact pad 826 may apply a small amount of force to the part 908 when in contact with the part 908, which may also reduce the risk of damage and/or warpage to the part 908 due to contact of the contact pad 826. In some embodiments, the amount of force applied to the part 908 via the contact pad 826 may be less than 0.2 pounds (90.7185 grams). The amount of force applied to the part 908 via the contact pad 826 may be tuned via selecting spring constants of the first spring 806 and the second spring 820 to achieve an intended amount of force to be applied via the contact pad 826. The amount of force may be selected based on characteristics of the part 908 and/or the application in which a nest device (such as the nest device 100 (FIG. 1) and/or the nest device 200 (FIG. 2)) is utilized.

In transitioning between the first state and the second state, the intermediate member 808 may rotate about the fastener 810 along an intermediate member travel direction 910. As the clamp 800 transitions to the second state where the contact pad 826 is out of contact with the part 908, the intermediate member 808 may rotate clockwise about the fastener 810. The intermediate member 808 may rotate clockwise into the second state in response to the means of actuation applying a downward force to the actuation member 814. As the clamp 800 transitions to the first state where the contact pad 826 contacts the part 908, the intermediate member 808 may rotate counterclockwise about the fastener 810. The intermediate member 808 may rotate counterclockwise into the first state in response to the means for actuation removing the downward force from the actuation member 814.

Further, in transitioning between the first state and the second state, the contact member 822 may rotate about the fastener along a contact member travel path 912. It is to be understood that the contact member travel path 912 indicates the travel path of the contact member 822 relative to the fastener 824 and does not illustrate the motion of the contact member 822 caused by the rotation of the intermediate member 808. As the clamp 800 transitions to the second state where the contact pad 826 is out of contact with the part 908, the contact member 822 may rotate clockwise about the fastener 824. The contact member 822 may rotate clockwise into the second state in response a force applied by the second spring 820, and a lack of contact between the lower surface of the contact member 822 and the mount 802. As the clamp 800 transitions to the first state where the contact pad contacts the part 908, the contact member 822 may rotate counterclockwise about the fastener 824. The contact member 822 may rotate counterclockwise about the fastener 824 in response to a force produced by contact between the lower surface of the contact member 822 and the mount 802 (as described further in relation to FIG. 10).

During the first portion of travel 904, the intermediate member 808 may rotate about the fastener 810, while the contact member 822 remains substantially (within 5 degrees of rotation) in the same rotational position about the fastener 824. Accordingly, the rotation of the intermediate member 808 about the fastener 810 may cause the substantially horizontal travel of the first portion of travel 904. During the second portion of travel 906, the intermediate member 808 may continue to rotate about the fastener 810 and the contact member 822 may rotate about the fastener 824. The rotation of the contact member 822 about the fastener 824 may cause the vertical component of travel within the second portion of travel 906, while the rotation of the intermediate member 808 about the fastener 810 may cause the horizontal component of travel within the second portion of travel 906.

As the contact pad travel path 902 indicates, the contact pad 826 may contact a top surface of the part 908 when the clamp 800 is in the first state where the contact pad 826 is in contact with part 908. The contact pad 826 may apply a downward force to the part 908 while the clamp 800 is in the first position. In some embodiments, the downward force applied by the contact pad 826 may be less than 0.2 pounds (90.7185 grams). The downward force may maintain a position of the part 908 relative to a carrier (such as the carrier 106 (FIG. 1), the carrier 302 (FIG. 3), and/or the carrier 402 (FIG. 4a)) in a same placement mechanism as the part 908. In some instances, the clamp 800 may be transitioned to the first position while air bearings (such as the air bearings 206 (FIG. 2) and/or the air bearing 500 (FIG. 5)), of a nest device to which the clamp 800 is mounted, are drawing in air to maintain the position of the carrier relative to the nest device. The clamp 800 may maintain the position of the part 908 relative to the carrier, which in turn maintains the part 908 relative to the nest device.

Figure 10:
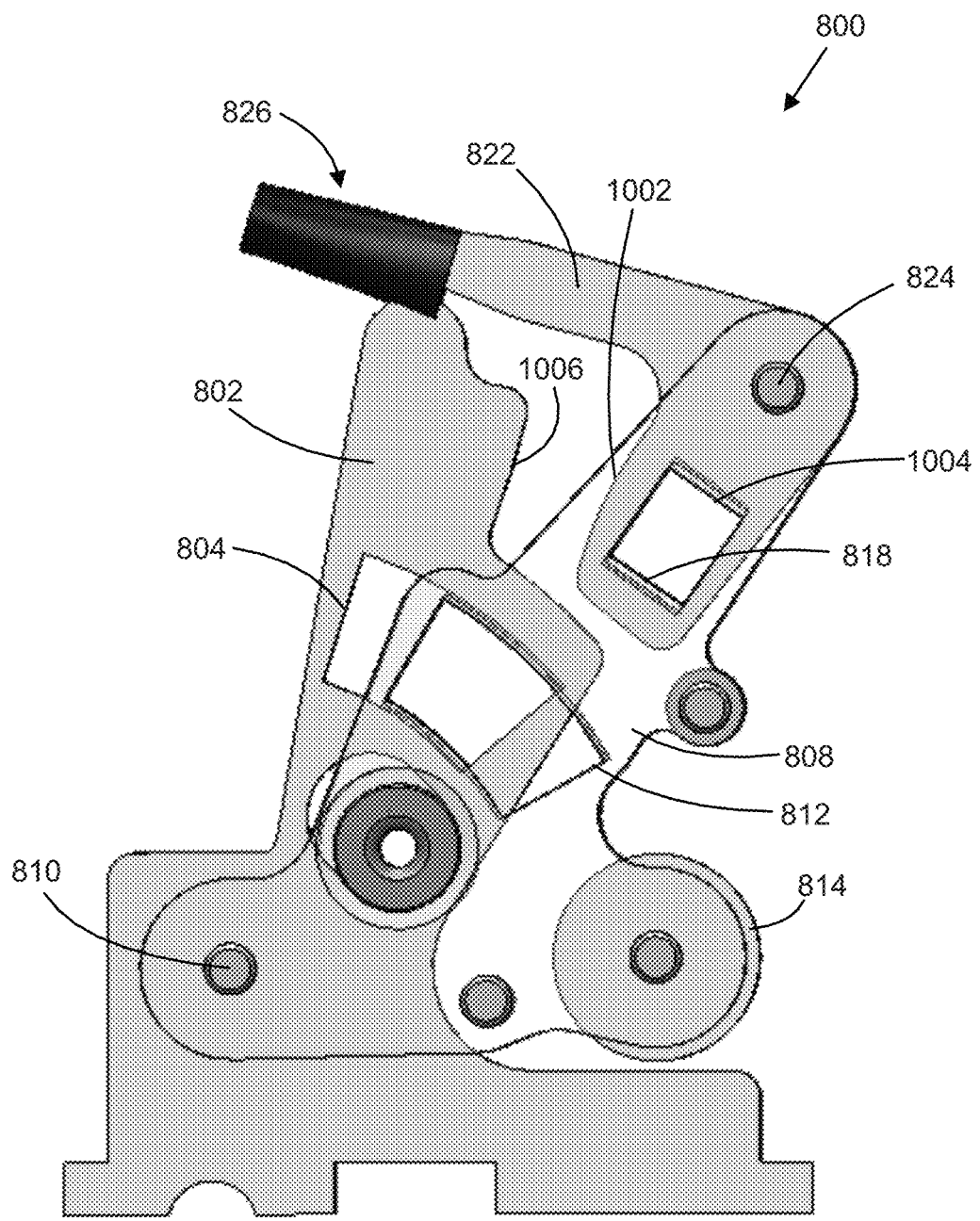
FIG. 10 illustrates a partially transparent view of the clamp of FIG. 8A in the second state, according to various embodiments.

FIG. 10 illustrates a partially transparent view of the clamp 800 of FIG. 8A in the second state, according to various embodiments. In particular, the intermediate member 808 is illustrated transparently and the first spring 806 and the second spring 820 are omitted from the illustration for the purpose of showing obscured features of the clamp 800 not visible in FIGS. 7-9.

In the second state, a lower surface 1002 of the contact member 822 may be out of contact with the mount 802. When the lower surface 1002 is out of contact with the mount 802, a cutout 1004 of the contact member 822 may be aligned with the second cutout 818 of the intermediate member 808. The second spring 820 (FIG. 8) may maintain the alignment of the cutout 1004 of the contact member 822 and the second cutout 818 of the intermediate member 808 while the lower surface 1002 is out of contact with the mount 802.

As the clamp 800 is transitioned from the second state toward the first state, the intermediate member 808 may rotate about the fastener 810 in the counterclockwise direction. As the intermediate member 808 rotates about the fastener 810, the lower surface 1002 of the contact member 822 may contact a surface 1006 of the mount 802. The contact pad 826 may travel along the first portion of travel 904 (FIG. 9) as the intermediate member 808 is rotated about the fastener 810 until the lower surface 1002 of the contact member 822 contacts the surface 1006 of the mount 802.

The intermediate member 808 may continue to rotate about the fastener 810 after the lower surface 1002 of the contact member 822 initially contacts the surface 1006 of the mount 802. In particular, the intermediate member 808 may continue to rotate about the fastener due to a force generated by the first spring 806 (FIG. 8) urging alignment of the first cutout 812 of the first cutout 812 of the intermediate member 808 and the cutout 804 of the mount 802 being greater than a force generated by the second spring 820 attempting to maintain the alignment of the second cutout 818 of the intermediate member 808 and the cutout 1004 of the contact member 822. In some embodiments, the intermediate member 808 may continue to rotate about the fastener due to a force applied to the actuation member 814 that causes the intermediate member 808 to rotate about the fastener 810 in the counterclockwise direction.

As the intermediate member 808 continues to rotate about the fastener 810, the surface 1006 of the mount 802 may prevent the lower surface 1002 of the contact member 822 from translating further as the intermediate member 808 continues to rotate about the fastener 810. However, the fastener 824 may be located above the surface 1006 of the mount 802 as the lower surface 1002 of the contact member 822 contacts the surface 1006 of the mount 802 and the fastener 824 may continue to be translated as the intermediate member 808 rotates about the fastener 810. Based on the fastener 824 continuing to be translated and the translation of the lower surface 1002 of the contact member 822 being prevented while the intermediate member continues to rotate about the fastener 810, the contact member 822 may rotate in the counterclockwise direction about the fastener 824. In particular, the surface 1006 of the mount 802 may apply a force to the lower surface 1002 of the contact member 822 resisting the translation of the lower surface 1002, wherein the force causes the contact member 822 to rotate about the fastener 824. As the contact member 822 rotates counterclockwise about the fastener 824, the contact pad 824 may move in the substantially vertical direction of the second portion of travel 906 (FIG. 9). While the clamp 800 is described in a certain physical configuration in FIGS. 8-10, it is to be understood that in other embodiments the physical configuration of the clamp may vary without deviating from the purpose and/or the operations of the clamp 800 described herein.

Figure 11:
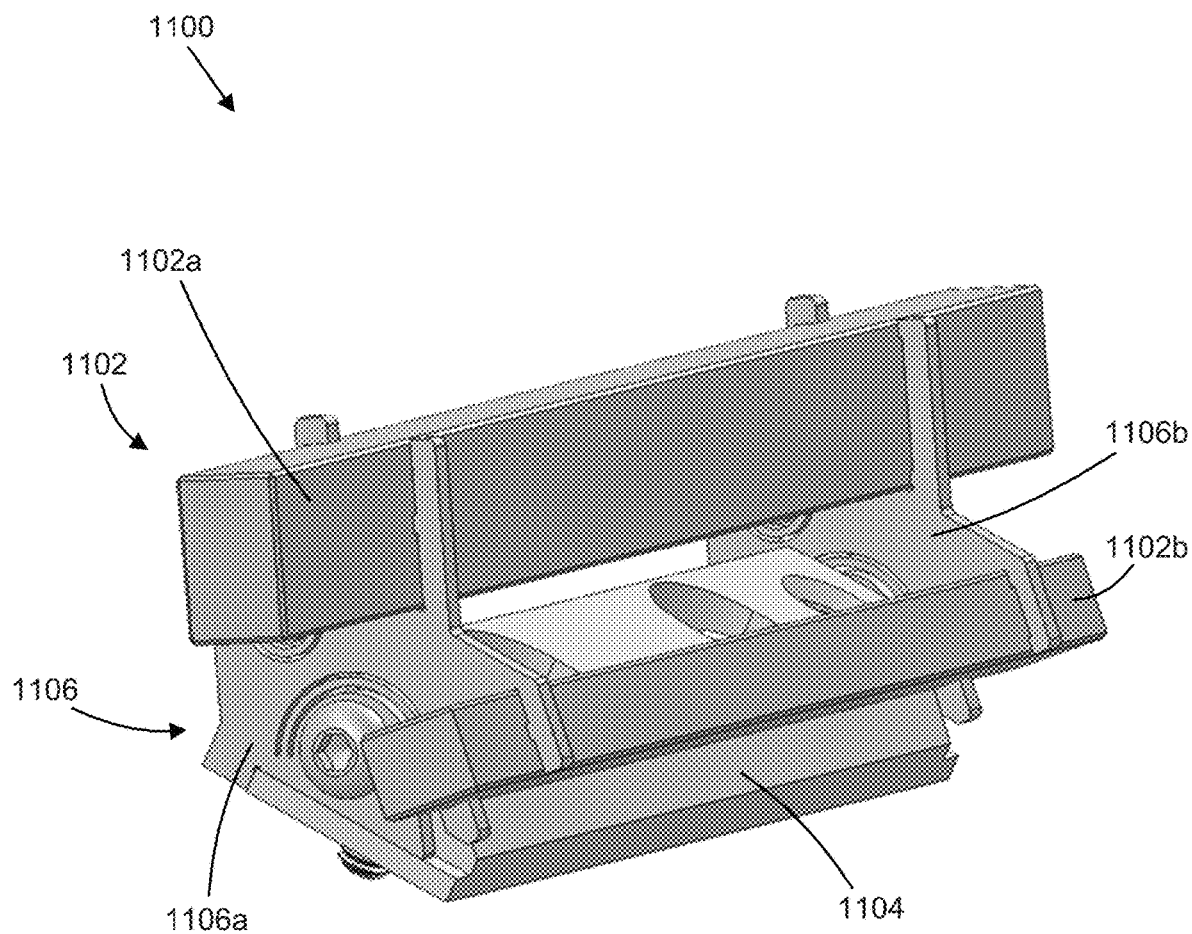
FIG. 11 illustrates a mirror assembly, according to various embodiments.

FIG. 11 illustrates a mirror assembly 1100, according to various embodiments. The mirror assembly 1100 may include one or more of the features of the mirror assembly 701 (FIG. 7). Further, the mirror assembly 701 may implement one or more of the features of the mirror assembly 1100.

The mirror assembly 1100 may include one or more mirrors 1102. In the illustrated embodiment, the mirror assembly 1100 may include a first mirror 1102a and a second mirror 1102b. A part (such as the part 104 (FIG. 1)) may extend between the first mirror 1102a and the second mirror 1102b, such that a sensor (not shown) may sense one or more features of the features of the part based on a line of sight reflected off the first mirror 1102a and the second mirror 1102b.

The mirror assembly 1100 may further include an assembly mount 1104. The assembly mount 1104 may mount the mirror assembly 1100 to a nest device (such as the nest device 100 (FIG. 1) and/or the nest device 200 (FIG. 2)). The assembly mount 1104 may maintain the positions of the first mirror 1102a and the second mirror 1102b relative to the nest device. In some embodiments, the assembly mount 1104 may further facilitate minor adjustments to position of the mirror assembly 1102 relative to the nest device (as described further in relation to FIG. 14).

The mirror assembly 1100 may further include one or more mirror mounts 1106 that mount the mirrors 1102 to the assembly mount 1104. The mirror mounts 1106 may maintain the position of the mirrors 1102 relative to the assembly mount 1104. In the illustrated embodiment, the mirror assembly 1100 may include a first mirror mount 1106a and a second mirror mount 1106b. The first mirror mount 1106a may be located to a first end of the mirrors 1102 and the second mirror mount 1106b may be located at a second end of the mirrors 1102, the second end opposite to the first end. The mirrors 1102 may be interchangeable within the mirror mounts 1106, which may be beneficial if the mirrors 1102 become damaged or need to be replaced for another reason. The first mirror mount 1106a and the second mirror mount 1106b may facilitate alignment of the mirrors 1102. In particular, the first mirror mount 1106a and the second mirror mount 1106b may align the first mirror 1102a and the second mirror 1102b in intended positions upon installation (as is described further in relation to FIG. 12 and FIG. 13). In some embodiments, the first mirror mount 1106a and the second mirror mount 1106b may receive each of the mirrors 1102 and may align the mirrors within 25 microns of the intended positions.

Figure 12:
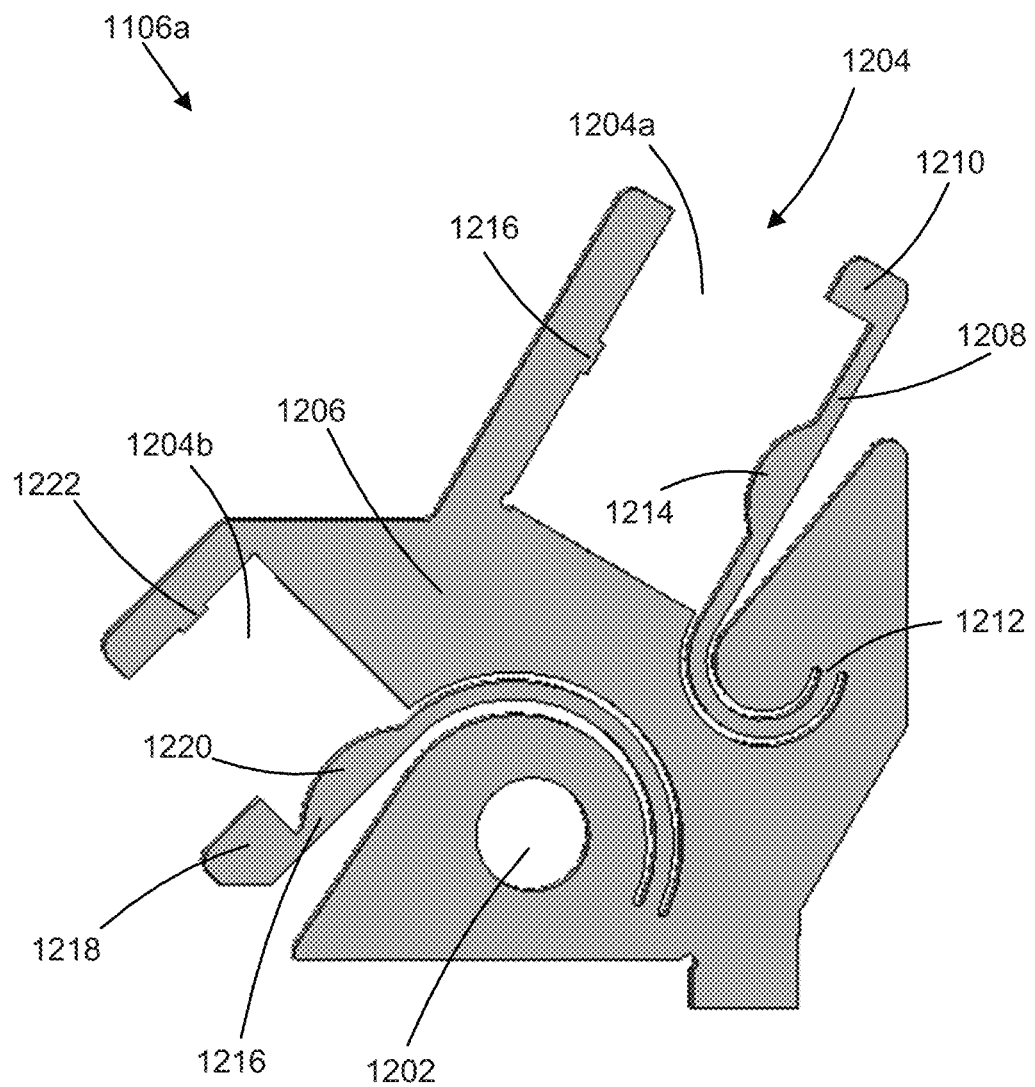
FIG. 12 illustrates the first mirror mount of FIG. 11, according to various embodiments.

FIG. 12 illustrates the first mirror mount 1106a of FIG. 11, according to various embodiments. The first mirror mount 1106a may be formed of a metal, such as steel, iron, copper, aluminum, brass, zinc, tin, or some combination thereof. The metal of the first mirror mount 1106a may be semi-rigid, where the metal may flex where the metal is formed in thin portions and may be rigid where the metal is formed in thick portions.

The first mirror mount 1106a may include an aperture 1202 for mounting the first mirror mount 1106a to the assembly mount 1104 (FIG. 11). In other embodiments, the first mirror mount 1106a may be mounted to the assembly mount 1104 via other means of mounting, including epoxy, adhesives, welding, or some combination thereof.

One or more mirror cutouts 1204 may be formed in the first mirror mount 1106a to receive the mirrors 1102 (FIG. 11). In the illustrated embodiment, a first mirror cutout 1204a may be formed in the first mirror mount 1106a to receive the first mirror 1102a (FIG. 11) and a second mirror cutout 1204b may be formed in the first mirror mount 1106a to receive the second mirror 1102b (FIG. 11). The mirror cutouts 1204 may receive the mirrors 1102 and may, in combination the second mirror mount 1106b, align the mirrors 1102 within 25 microns of the intended positions of the mirrors 1102. Further, the mirror cutouts 1204, in combination with the second mirror mount 1106b, may maintain the mirrors 1102 in the intended positions.

The mirror cutouts 1204 may be encircled on three sides by the material of the first mirror mount 1106a and partially encircled on a fourth side by the material. In the illustrated embodiment, the first mirror cutout 1204a may be encircled on two sides by a rigid portion 1206 of the first mirror mount 1106a, may be encircled on a third side by a flexible portion 1208 of the first mirror mount 1106a, and may be partially encircled on a fourth side by a tab 1210 that extends from the flexible portion 1208. The flexible portion 1208 may be formed of a thin strip of material, which may facilitate the flexibility of the flexible portion 1208. The flexible portion 1208 may be connected to the rigid portion 1206 at a coupling area 1212. The flexible portion 1208 may extend into the rigid portion 1206 (with space between the flexible portion 1208 and the rigid portion 1206 where the flexible portion extends into the rigid portion 1206), and may be connected to the rigid portion 1206 at the coupling area 1212 within an inner part of the rigid portion 1206. Extending the flexible portion 1208 into the rigid portion 1206 may increase the length of the flexible portion 1208 and may facilitate greater flexibility based on the increased length. In other embodiments, the flexible portion 1208 may connect to the rigid portion 1206 at an outer surface of the rigid portion 1206 rather than extending into the rigid portion 1206.

The flexible portion 1208 may flex in response to a force being applied to the flexible portion 1208. When force is not being applied to the flexible portion 1208, the flexible portion 1208 may abut a side of the first mirror 1102a and may apply force to the first mirror 1102a to maintain a position of the first mirror 1102a. As force is applied to the flexible portion 1208 in a direction away from the first mirror 1102a, the flexible portion 1208 may be flexed away from the first mirror 1102a via application of force to the flexible portion 1208 in a direction away from the first mirror 1102a.

The tab 1210 may be located at an end of the flexible portion 1208 opposite to the coupling area 1212 and may extend from the flexible portion 1208. When force is not being applied to the flexible portion 1208, the tab 1210 may partially encircle the first mirror 1102a on the fourth side of the first mirror 1102a and may maintain the first mirror 1102a within the first mirror cutout 1204a. As the flexible portion 1208 is flexed away from the first mirror 1102a, the tab 1210 may be translated away from the first mirror 1102a to a position where the tab 1210 does not partially encircle the fourth side of the first mirror 1102a and does not abut the fourth side of the mirror 1102a. While the tab 1210 is translated away from the first mirror 1102a, the first mirror 1102a may be removed from the first mirror cutout 1204a toward the direction from which the tab 1210 was translated. Further, a new first mirror 1102a may be installed within the first mirror cutout 1204a when the tab 1210 is translated away from the first mirror 1102a. This may allow for easy interchange of the first mirror 1102a in instances where the first mirror 1102a is damaged or is desired to be interchanged for another reason.

The first mirror mount 1106a, in combination with the second mirror mount 1106b, may facilitate alignment of the first mirror 1102a within the first mirror cutout 1204a when the first mirror 1102a is installed within the first mirror cutout 1204a. In particular, the flexible portion 1208 may include a curved extension 1214 that extends toward the first mirror cutout 1204a. The curved extension 1214 may be located at approximately (within 2 millimeters) a middle point of the third side of the first mirror cutout 1204a on which the flexible portion 1208 extends. Further, the rigid portion 1206 may include a rectangular extension 1216 that extends toward the first mirror cutout 1204a from an opposite side of the first mirror cutout 1204a from the curved extension 1214. The rectangular extension 1216 may be located at approximately (within 2 millimeters) a middle point of the first side of the first mirror cutout 1204a on which the rigid portion 1206 extends, wherein the first side is opposite to the third side. In some embodiments, a center of the rectangular extension 1216 may be approximately (within 2 millimeters) aligned with a center of the flexible portion 1208. As the force is removed from the flexible portion 1208 with the first mirror 1102a positioned within the first mirror cutout 1204a and the flexible portion 1208 returns to the unflexed position, the curved extension 1214 may contact the first mirror 1102a and apply a force to the first mirror 1102a toward the first side of the first mirror cutout 1204a. The force applied by the curved extension 1214 may cause the first mirror 1102a to be pressed against the rectangular extension 1216. When the first mirror 1102a is pressed against the rectangular extension 1216, the first mirror mount 1106a may facilitate alignment of the first mirror 1102a.

The second mirror cutout 1204b may include one or more of the features described in relation to the first mirror cutout 1204a and may facilitate one or more of the operations described in relation to the first mirror cutout 1204a, including facilitating interchange of a mirror located within the second mirror cutout 1204b and/or facilitating alignment of the mirror located within the second mirror cutout 1204b. In particular, the second mirror cutout 1204b may receive the second mirror 1102b (FIG. 11). The second mirror cutout 1204b may be encircled on two sides by the rigid portion 1206, may be encircled on a third side by a flexible portion 1216, and may be partially encircled on a fourth side by a tab 1218 that extends from the flexible portion 1216. The flexible portion 1216 may flex to facilitate interchange of the second mirror 1102b. Further, the flexible portion 1216 may include a curved extension 1220 and the rigid portion 1206 may include a rectangular extension 1222, the rectangular extension 1222 being located opposite to the curved extension 1220 about the second mirror cutout 1204b. The curved extension 1220 may apply force to the second mirror 1102b when the flexible portion 1216 is unflexed and may press the second mirror 1102b against the rectangular extension 1222. The curved extension 1220 pressing the second mirror 1102b against the rectangular extension 1222 may facilitate alignment of the second mirror 1102b, in combination with the second mirror mount 1106b.

Figure 13:
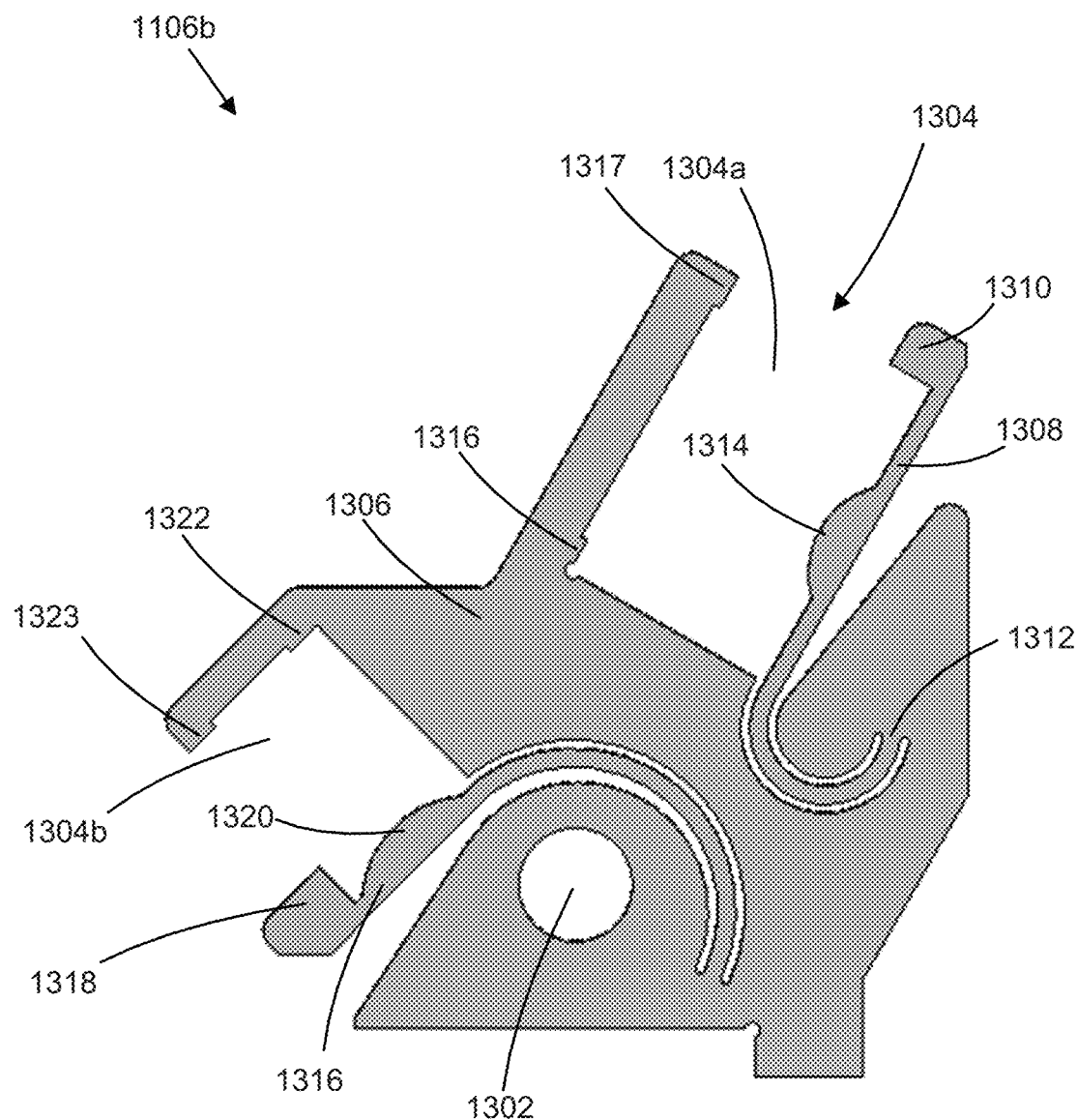
FIG. 13 illustrates the second mirror mount of FIG. 11, according to various embodiments.

FIG. 13 illustrates the second mirror mount 1106b of FIG. 11, according to various embodiments. The second mirror mount 1106b may include one or more of the features of the first mirror mount 1106a (FIG. 11). The second mirror mount 1106b may be formed of a metal, such as steel, iron, copper, aluminum, copper, brass, zinc, tin, or some combination thereof. The metal of the second mirror mount 1106b may be semi-rigid, where the metal may flex where the metal is formed in thin portions and may be rigid where the metal is formed in thick portions.

The second mirror mount 1106b may include an aperture 1302 for mounting the second mirror mount 1106b to the assembly mount 1104 (FIG. 11). In other embodiments, the second mirror mount 1106b may be mounted to the assembly mount 1104 via other means of mounting, including epoxy, adhesives, welding, or some combination thereof.

One or more mirror cutouts 1304 may be formed in the second mirror mount 1106b to receive the mirrors 1102 (FIG. 11). In the illustrated embodiment, a first mirror cutout 1304a may be formed in the second mirror mount 1106b to receive the first mirror 1102a (FIG. 11) and a second mirror cutout 1304b may be formed in the second mirror mount 1106b to receive the second mirror 1102b (FIG. 11). The mirror cutouts 1304 may receive the mirrors 1102 and may, in combination the first mirror mount 1106a, align the mirrors 1102 within 25 microns of the intended positions of the mirrors 1102. Further, the mirror cutouts 1304, in combination with the first mirror mount 1106a, may maintain the mirrors 1102 in the intended positions.

The mirror cutouts 1304 may be encircled on three sides by the material of the second mirror mount 1106b and partially encircled on a fourth side by the material. In the illustrated embodiment, the first mirror cutout 1304a may be encircled on two sides by a rigid portion 1306 of the second mirror mount 1106b, may be encircled on a third side by a flexible portion 1308 of the second mirror mount 1106b, and may be partially encircled on a fourth side by a tab 1310 that extends from the flexible portion 1308. The flexible portion 1308 may be formed of a thin strip of material, which may facilitate the flexibility of the flexible portion 1308. The flexible portion 1308 may be connected to the rigid portion 1306 at a coupling area 1312. The flexible portion 1308 may extend into the rigid portion 1306 (with space between the flexible portion 1308 and the rigid portion 1306 where the flexible portion extends into the rigid portion 1306), and may be connected to the rigid portion 1306 at the coupling area 1312 within an inner part of the rigid portion 1306. Extending the flexible portion 1308 into the rigid portion 1306 may increase the length of the flexible portion 1308 and may facilitate greater flexibility based on the increased length. In other embodiments, the flexible portion 1308 may connect to the rigid portion 1306 at an outer surface of the rigid portion 1306 rather than extending into the rigid portion 1306.

The flexible portion 1308 may flex in response to a force being applied to the flexible portion 1308. When force is not being applied to the flexible portion 1308, the flexible portion 1308 may abut a side of the first mirror 1102a and may apply force to the first mirror 1102a to maintain a position of the first mirror 1102a. As force is applied to the flexible portion 1308 in a direction away from the first mirror 1102a, the flexible portion 1308 may be flexed away from the first mirror 1102a via application of force to the flexible portion 1308 in a direction away from the first mirror 1102a.

The tab 1310 may be located at an end of the flexible portion 1308 opposite to the coupling area 1312 and may extend from the flexible portion 1308. When force is not being applied to the flexible portion 1308, the tab 1310 may partially encircle the first mirror 1102a on the fourth side of the first mirror 1102a and may maintain the first mirror 1102a within the first mirror cutout 1304a. As the flexible portion 1308 is flexed away from the first mirror 1102a, the tab 1310 may be translated away from the first mirror 1102a to a position where the tab 1310 does not partially encircle the fourth side of the first mirror 1102a and does not abut the fourth side of the mirror 1102a. While the tab 1310 is translated away from the first mirror 1102a, the first mirror 1102a may be removed from the first mirror cutout 1304a toward the direction from which the tab 1310 was translated. Further, a new first mirror 1102a may be installed within the first mirror cutout 1304a when the tab 1310 is translated away from the first mirror 1102a. This may allow for easy interchange of the first mirror 1102a in instances where the first mirror 1102a is damaged or is desired to be interchanged for another reason.

The second mirror mount 1106b, in combination with the first mirror mount 1106a, may facilitate alignment of the first mirror 1102a within the first mirror cutout 1304a when the first mirror 1102a is installed within the first mirror cutout 1304a. Further, the first mirror mount 1106a and the second mirror mount 1106b may facilitate alignment of the first mirror 1102a relative to the assembly mount 1104 when the first mirror 1102a is installed in the first mirror mount 1106a and the second mirror mount 1106b.

The flexible portion 1308 may include a curved extension 1314 that extends toward the first mirror cutout 1304a. The curved extension 1314 may be located at approximately (within 2 millimeters) a middle point of the third side of the first mirror cutout 1304a on which the flexible portion 1308 extends. Further, the rigid portion 1306 may include a first rectangular extension 1316 and a second rectangular extension 1317 along the first mirror cutout 1304a. The first rectangular extension 1316 and the second rectangular extension 1317 may extend toward the first mirror cutout 1304a from an opposite side of the first mirror cutout 1304a from the curved extension 1314. The first rectangular extension 1316 may be located at one end of the first side of the first mirror cutout 1304a on which the rigid portion 1306 extends, wherein the first side is opposite to the third side. The second rectangular extension 1317 may be located at an opposite end of the first side of the first mirror cutout 1304a from the first rectangular extension 1316. As the force is removed from the flexible portion 1308 with the first mirror 1102a positioned within the first mirror cutout 1304a and the flexible portion 1308 returns to the unflexed position, the curved extension 1314 may contact the first mirror 1102a and apply a force to the first mirror 1102a toward the first side of the first mirror cutout 1304a. The force applied by the curved extension 1314 may cause the first mirror 1102a to be pressed against the first rectangular extension 1316 and the second rectangular extension 1317.

When the first mirror 1102a is pressed against the first rectangular extension 1316 and the second rectangular extension 1317, the second mirror mount 1106b may facilitate alignment of the first mirror 1102a. In particular, the rectangular extension 1216 (FIG. 12) of the first mirror mount 1106a, and the first rectangular extension 1316 and the second rectangular 1317 of the second mirror mount 1106b may define a plane. When the first mirror 1102a is installed within the first mirror cutout 1204a (FIG. 12) of the first mirror mount 1106a and the first mirror cutout 1304a of the second mirror mount 1106a, and the flexible portion 1208 (FIG. 12) of the first mirror mount 1106a and the flexible portion 1308 of the second mirror mount 1106b are in the unflexed positions, the first mirror 1102a may be pressed against the rectangular extension 1216 of the first mirror mount 1106a, the first rectangular extension 1316 of the second mirror mount 1106b, and the second rectangular extension 1317 of the second mirror mount 1106b. The first mirror 1102a may contact the rectangular extension 1216, the first rectangular extension 1316, and the second rectangular extension 1317 at three points of contact along the side of the first mirror 1102a that abuts the first side of the first mirror cutout 1204a of the first mirror mount 1106a and the first side of the first mirror cutout 1304a of the second mirror mount 1106b. The three points of contact may be along the plane defined by the rectangular extension 1216, the first rectangular extension 1316, and the second rectangular extension 1317. In response to the first mirror 1102a being pressed against the rectangular extension 1216, the first rectangular extension 1316, and the second rectangular extension 1317, the side of the first mirror 1102a may be substantially aligned with the plane, which may result in the first mirror 1102a being aligned within 25 microns of an intended position.

The second mirror cutout 1304b may include one or more of the features described in relation to the first mirror cutout 1304a and may facilitate one or more of the operations described in relation to the first mirror cutout 1304a, including facilitating interchange of a mirror located within the second mirror cutout 1304b and/or facilitating alignment of the mirror located within the second mirror cutout 1304b. In particular, the second mirror cutout 1304b may receive the second mirror 1102b (FIG. 11). The second mirror cutout 1304b may be encircled on two sides by the rigid portion 1306, may be encircled on a third side by a flexible portion 1316, and may be partially encircled on a fourth side by a tab 1318 that extends from the flexible portion 1316. The flexible portion 1316 may flex to facilitate interchange of the second mirror 1102b.

The flexible portion 1316 may include a curved extension 1320 that extends toward the second mirror cutout 1304b. The curved extension 1314 may be located at approximately (within 2 millimeters) a middle point of the third side of the second mirror cutout 1304b on which the flexible portion 1316 extends. Further, the rigid portion 1306 may include a first rectangular extension 1322 and a second rectangular extension 1323 along the second mirror cutout 1304b. The first rectangular extension 1322 and the second rectangular extension 1323 may extend toward the second mirror cutout 1304b from an opposite side of the second mirror cutout 1304b from the curved extension 1320. The first rectangular extension 1322 may be located at one end of the first side of the second mirror cutout 1304b on which the rigid portion 1306 extends, wherein the first side is opposite to the third side. The second rectangular extension 1323 may be located at an opposite end of the first side of the second mirror cutout 1304b from the first rectangular extension 1322. As the force is removed from the flexible portion 1316 with the second mirror 1102b positioned within the second mirror cutout 1304b and the flexible portion 1316 returns to the unflexed position, the curved extension 1320 may contact the second mirror 1102b and apply a force to the second mirror 1102b toward the first side of the second mirror cutout 1304b. The force applied by the curved extension 1320 may cause the second mirror 1102*b* to be pressed against the first rectangular extension 1322 and the second rectangular extension 1323.

When the second mirror 1102*b* is pressed against the first rectangular extension 1322 and the second rectangular extension 1323, the second mirror mount 1106*b* may facilitate alignment of the second mirror 1102*b*. In particular, the rectangular extension 1222 (FIG. 12) of the first mirror mount 1106*a*, and the first rectangular extension 1316 and the second rectangular 1317 of the second mirror mount 1106*b* may define a plane. When the second mirror 1102*b* is installed within the second mirror cutout 1204*b* (FIG. 12) of the first mirror mount 1106*a* and the second mirror cutout 1304*b* of the second mirror mount 1106*a*, and the flexible portion 1216 (FIG. 12) of the first mirror mount 1106*a* and the flexible portion 1316 of the second mirror mount 1106*b* are in the unflexed positions, the second mirror 1102*b* may be pressed against the rectangular extension 1222 of the first mirror mount 1106*a*, the first rectangular extension 1322 of the second mirror mount 1106*b*, and the second rectangular extension 1323 of the second mirror mount 1106*b*. The second mirror 1102*b* may contact the rectangular extension 1222, the first rectangular extension 1322, and the second rectangular extension 1323 at three points of contact along the side of the second mirror 1102*b* that abuts the first side of the second mirror cutout 1204*b* of the first mirror mount 1106*a* and the first side of the second mirror cutout 1304*b* of the second mirror mount 1106*b*. The three points of contact may be along the plane defined by the rectangular extension 1222, the first rectangular extension 1322, and the second rectangular extension 1323. In response to the second mirror 1102*b* being pressed against the rectangular extension 1222, the first rectangular extension 1322, and the second rectangular extension 1323, the side of the second mirror 1102*b* may be substantially aligned with the plane, which may result in the second mirror 1102*b* being aligned within 25 microns of an intended position.

Figure 14:
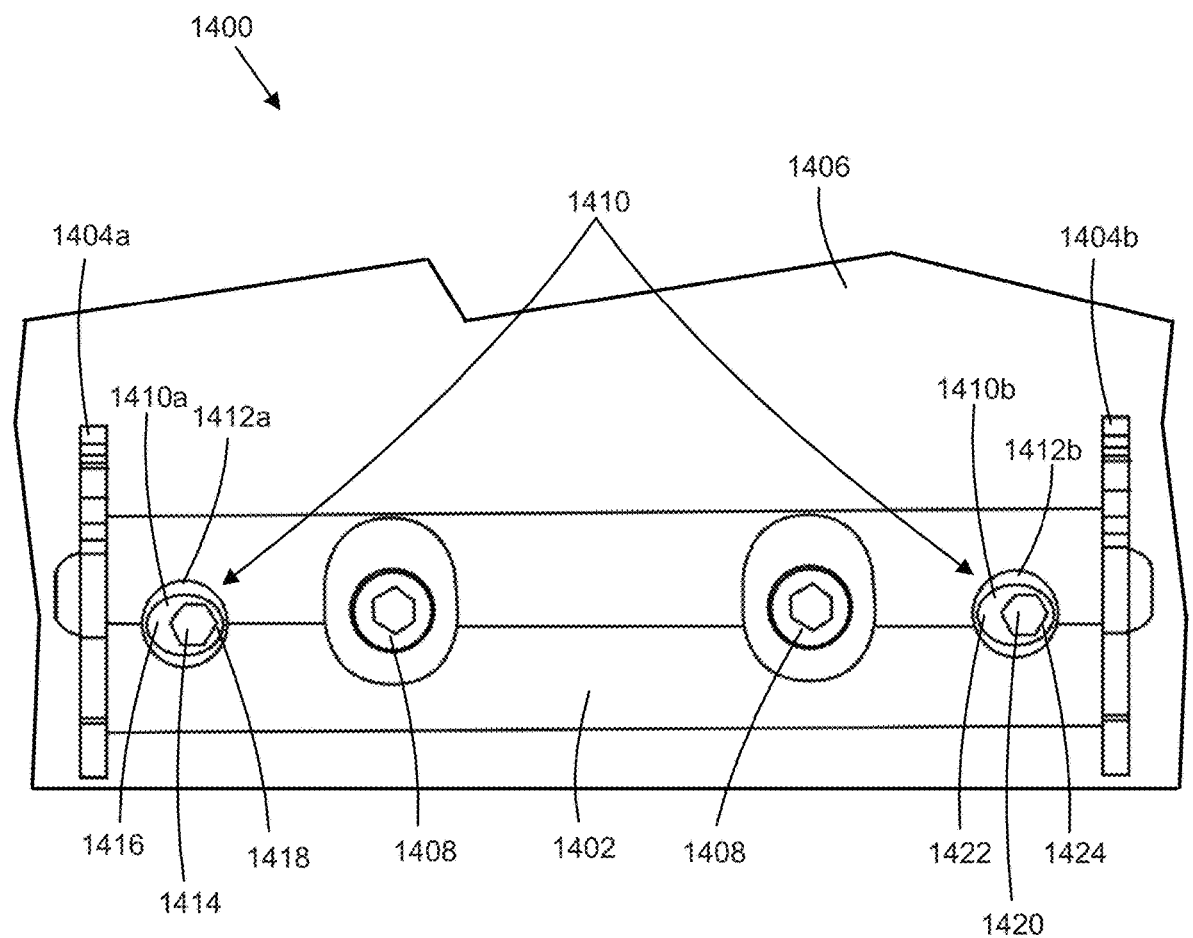
FIG. 14 illustrates a top view of a mirror assembly, according to various embodiments.

FIG. 14 illustrates a top view of a mirror assembly 1400, according to various embodiments. The mirror assembly 1400 may include one or more of the features of the mirror assembly 1100 (FIG. 11). Further, the mirror assembly 1400, or one or more features thereof, may be implemented by the mirror assembly 1100, the nest device 100 (FIG. 1), the nest device 200 (FIG. 2), or some combination thereof. The mirror assembly 1400 may mount one or more mirrors (such as the mirrors 602 (FIG. 6)) on a nest device (such as the nest device 100 and/or the nest device 200).

The mirror assembly 1400 may include an assembly mount 1402 that mounts one or more mirror mounts 1404 to the nest device, wherein the mirror mounts 1404 may couple one or more mirrors (such as the mirrors 602) to the nest device. In the illustrated embodiment, the mirror mounts 1404 may include a first mirror mount 1404*a* and a second mirror mount 1404*b*. The first mirror mount 1404*a* may include one or more of the features of the first mirror mount 1106*a* (FIG. 11). Further, the second mirror mount 1404*b* may include one or more of the features of the second mirror mount 1106*b* (FIG. 11). The first mirror mount 1404*a* may be coupled to the assembly mount 1402 at a first end of the assembly mount 1402 and the second mirror mount 1404*b* may be coupled to the assembly mount 1402 at a second end of the assembly mount 1402, the second end opposite to the first end. The first mirror mount 1404*a* and the second mirror mount 1404*b* may extend from the assembly mount 1402 in a direction opposite to the nest device to which the assembly mount 1402 is mounted.

The assembly mount 1402 may be coupled to a main body 1406 of the nest device via one or more affixment fasteners 1408 and/or one or more adjustment fasteners 1410. The adjustment fasteners 1410 may facilitate minor adjustments to a position of the assembly mount 1402 on the main body 1406. The adjustment fasteners 1410 may include off-center heads and/or oblong heads, where the distances from the outer edge of the heads of the adjustment fasteners 1410 to the shafts of the adjustment fasteners 1410 vary around the circumference of the heads. The assembly mount 1402 may include one or more recesses 1412, wherein the heads of the adjustment fasteners 1410 may be located within corresponding ones of the recesses 1412. The circumferences of the recesses 1412 may be substantially (within 5 millimeters) equal to the circumferences of the adjustment fasteners. The head of each of the adjustment fasteners 1410 may contact one or more walls of the corresponding recesses 1412, which may apply a force to the assembly mount 1402 and may cause the assembly mount 1402 to be translated across the main body 1406.

For example, the mirror assembly 1400 may include a first adjustment fastener 1410*a* and a second adjustment fastener 1410*b*. The head of the first adjustment fastener 1410*a* may be located within the first recess 1412*a*. The circumference of the first recess 1412*a* may be substantially (within 5 millimeters) of the circumference of the head of the first adjustment fastener 1410*a*. Further, the head of the second adjustment fastener 1410*b* may be located within the second recess 1412*b*. The circumference of the second recess 1412*b* may be substantially (within 5 millimeters) of the circumference of the head of the second adjustment fastener 1410*b*.

The shaft of the first adjustment fastener 1410*a* may extend into the main body 1406 from the head of the first adjustment fastener 1410*a*. A center of the shaft may be aligned with a center of the hexagonal recess 1414 formed in the head of the first adjustment fastener 1410*a*. The distance of the outer edge of the head of the first adjustment fastener 1410*a* from the center of the hexagonal recess 1414 may vary around the circumference of the head, with a first portion 1416 of the outer edge being farther away from the center of the hexagonal recess 1414 than a second portion 1418 of the outer edge.

The first adjustment fastener 1410*a* may be rotated about the shaft of the first adjustment fastener 1410*a*. As the first adjustment fastener 1410*a* is rotated about the shaft, the first portion 1416 of the outer edge of the head may be translated to about the shaft due to the rotation. As the first portion 1416 is translated, the first portion 1416 may contact the wall of the first recess 1412*a* and apply a force to the wall. The assembly mount 1402 may be translated across the main body 1406 due to force applied to the wall of the first recess 1412*a*, such that the first recess 1412*a* may be aligned about the head of the first adjustment fastener 1410*a*. As the first portion 1416 continues to be translated about the shaft of the first adjustment fastener 1410*a*, the first recess 1412*a* may continually align with the head of the first adjustment fastener 1410*a* via translating the assembly mount 1402 across the main body 1406. In particular, the rotation of the first adjustment fastener 1410*a* may cause the end of the assembly mount 1402 toward the first adjustment fastener 1410*a* to be translated, whereas the second adjustment fastener 1410*b* may facilitate the translation of the end of the assembly mount 1402 toward the second adjustment fastener 1410*b* (as described further below). The first adjustment fastener 1410*a* may facilitate translation of the assembly mount 1402 in 360 degrees of direction as the first portion 1416 is rotated about the shaft of the first adjustment fastener 1410a.

The shaft of the second adjustment fastener 1410b may extend into the main body 1406 from the head of the second adjustment fastener 1410b. A center of the shaft may be aligned with a center of the hexagonal recess 1420 formed in the head of the second adjustment fastener 1410b. The distance of the outer edge of the head of the second adjustment fastener 1410b from the center of the hexagonal recess 1420 may vary around the circumference of the head, with a first portion 1422 of the outer edge being farther away from the center of the hexagonal recess 1420 than a second portion 1424 of the outer edge.

The second adjustment fastener 1410b may be rotated about the shaft of the second adjustment fastener 1410b. As the second adjustment fastener 1410b is rotated about the shaft, the first portion 1422 of the outer edge of the head may be translated to about the shaft due to the rotation. As the first portion 1422 is translated, the first portion 1422 may contact the wall of the second recess 1412b and apply a force to the wall. The assembly mount 1402 may be translated across the main body 1406 due to force applied to the wall of the second recess 1412b, such that the second recess 1412b may be aligned about the head of the second adjustment fastener 1410b. As the first portion 1422 continues to be translated about the shaft of the second adjustment fastener 1410b, the second recess 1412b may continually align with the head of the second adjustment fastener 1410b via translating the assembly mount 1402 across the main body 1406. In particular, the rotation of the second adjustment fastener 1410b may cause the end of the assembly mount 1402 toward the second adjustment fastener 1410b to be translated. The second adjustment fastener 1410b may facilitate translation of the assembly mount 1402 in 360 degrees of direction as the first portion 1422 is rotated about the shaft of the second adjustment fastener 1410b.

The first adjustment fastener 1410a and the second adjustment fastener 1410b may, in combination, facilitate positioning of the assembly mount 1402 on the main body 1406. The assembly mount 1402 may be positioned such that the mirrors supported by the first mirror mount 1404a and the second mirror mount 1404b may be directed to a part (such as the part 104 (FIG. 1)) positioned on the nest device. The first adjustment fastener 1410a and the second adjustment fastener 1410b may position the assembly mount 1402 such that the planes of the mirrors are parallel to a portion of the part that each of the mirrors extend along. The ability to make fine adjustments to the positions of the mirrors via the first adjustment fastener 1410a and the second adjustment fastener 1410b may facilitate proper alignment of the mirrors for sensing one or more features of the part.

The affixment fasteners 1408 may maintain a position of the assembly mount 1402 relative to the nest device when the affixment fasteners 1408 are tightened. In particular, the affixment fasteners 1408 may be loosened to allow the adjustment fasteners 1410 to adjust the position of the assembly mount 1402. Once the assembly mount 1402 has been moved to the desired position via the adjustment fasteners 1410, the affixment fasteners 1408 may be tightened to maintain the position of the assembly mount 1402. Tightening the affixment fasteners 1408 to maintain the position of the assembly mount 1402 may prevent inadvertent movement of the assembly mount 1402 from the desired position. In some embodiments, the affixment fasteners 1408, the adjustment fasteners 1410, or some combination thereof, may be omitted.

Figure 15:
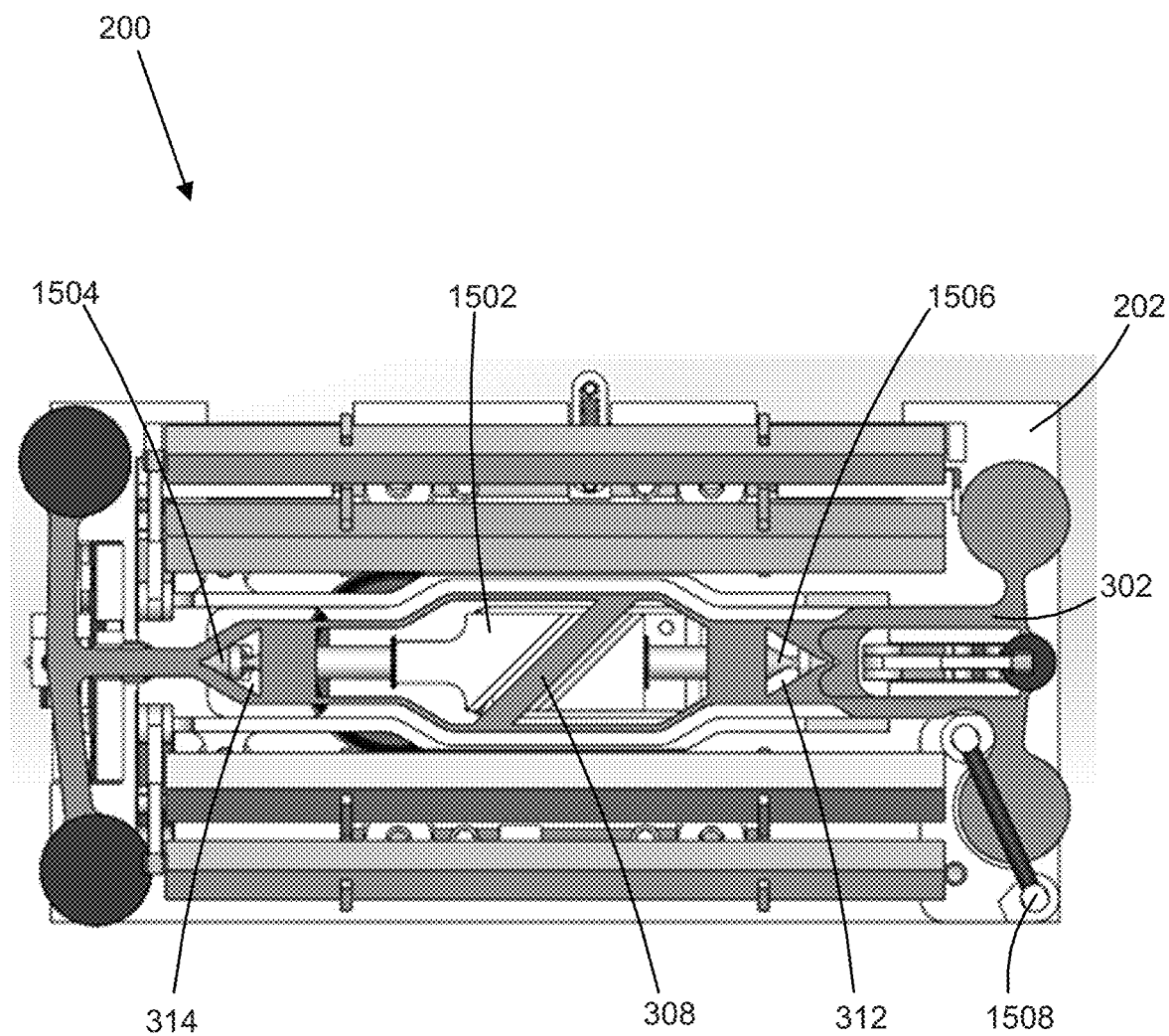
FIG. 15 illustrates a top view of the example nest device of FIG. 2, according to various embodiments.

FIG. 15 illustrates a top view of the example nest device 200 of FIG. 2, according to various embodiments. The nest device 200 may include a cylinder assembly 1502. The cylinder assembly 1502 may be coupled to the main body 202 of the nest device 200 and may be located toward a center of the main body 202. The cylinder assembly 1502 may include one or more air cylinders. In other embodiments, the cylinder assembly 1502 may include any other type of cylinders known to one having ordinary skill in the art, such as hydraulic cylinders and/or electrical cylinders.

The cylinder assembly 1502 may include a first piston 1504 that extends in one direction and a second piston 1506 that extends in an opposing direction. The first piston 1504 and the second piston 1506 may include conical tips, wherein the conical tip of the first piston 1504 is directed in the one direction and the conical tip of the second piston 1506 is directed in the opposing direction. When the cylinder assembly 1502 is activated (such as via pressurization of the cylinders), the conical tip of the first piston 1504 may engage with the tapered cutout 314 and the conical tip of the second piston 1506 may engage with the tapered cutout 316. The conical tip of the first piston 1504 and the conical tip of the second piston 1506 engaging with the tapered cutout 314 and the tapered cutout 316, respectively, may cause the carrier 302 to be centered relative to the main body 202 and/or positioned at an initial position. The first piston 1504 and the second piston 1506 may center the carrier 302 within 500 micrometers of the initial position of the carrier 302 relative to the main body 202. When the cylinder assembly 1502 is deactivated, the conical tip of the first piston 1504 may be disengaged from the tapered cutout 314 and the conical tip of the second piston 1506 may be disengaged from the tapered cutout 316. The carrier 302 may be moved from the initial position relative to the main body 202 when the conical tip of the first piston 1504 and the conical tip of the second piston 1506 are disengaged.

In embodiments that include the carrier 402 (FIG. 4) rather than the carrier 302, the first piston 1504 and the second piston 1506 may engage with the first tapered recess 452 (FIG. 4) and the second tapered recess 454 (FIG. 4). The cylinder assembly 1502 may facilitate the same operations with the carrier 402 as the cylinder assembly 1502 facilitates with the carrier 302. In particular, the cylinder assembly 1502 may center the carrier 402 relative to the main body 202 when the first piston 1504 is engaged with the first tapered recess 452 and the second piston 1506 is engaged with the second tapered recess 454. Further, the carrier 402 may be moved from the centered position relative the main body 202 when the first piston 1504 is disengaged from the first tapered recess 452 and the second piston 1506 is disengaged from the second tapered recess 454.

In other embodiments, the cylinder assembly 1502 may be located at different positions on the main body 202. In some embodiments, the cylinder assembly 1502 may include one or more pistons, where the pistons may engage with the carrier 302, or features of the carrier 302, to center the carrier 302 or move the carrier 302 to the intended position. Further, in some embodiments, the cylinder assembly 1502 may be omitted.

The nest device 200 may further include a sensor 1508. The sensor 1508 may be a through-beam sensor that detects when an object interferes with the beam of the through-beam sensor. The sensor 1508 may detect when a part (such as the part 104 (FIG. 1)) is positioned on the nest device 200. One or more time periods may be initiated in response to the sensor 1508 detecting that the part is positioned on the nest device (such as the time periods for transition of the datum fingers 204 (FIG. 2) and/or the air bearings 206 (FIG. 2) described in relation to FIG. 2). In some embodiments, the sensor 1508 may be omitted.

Figure 16:
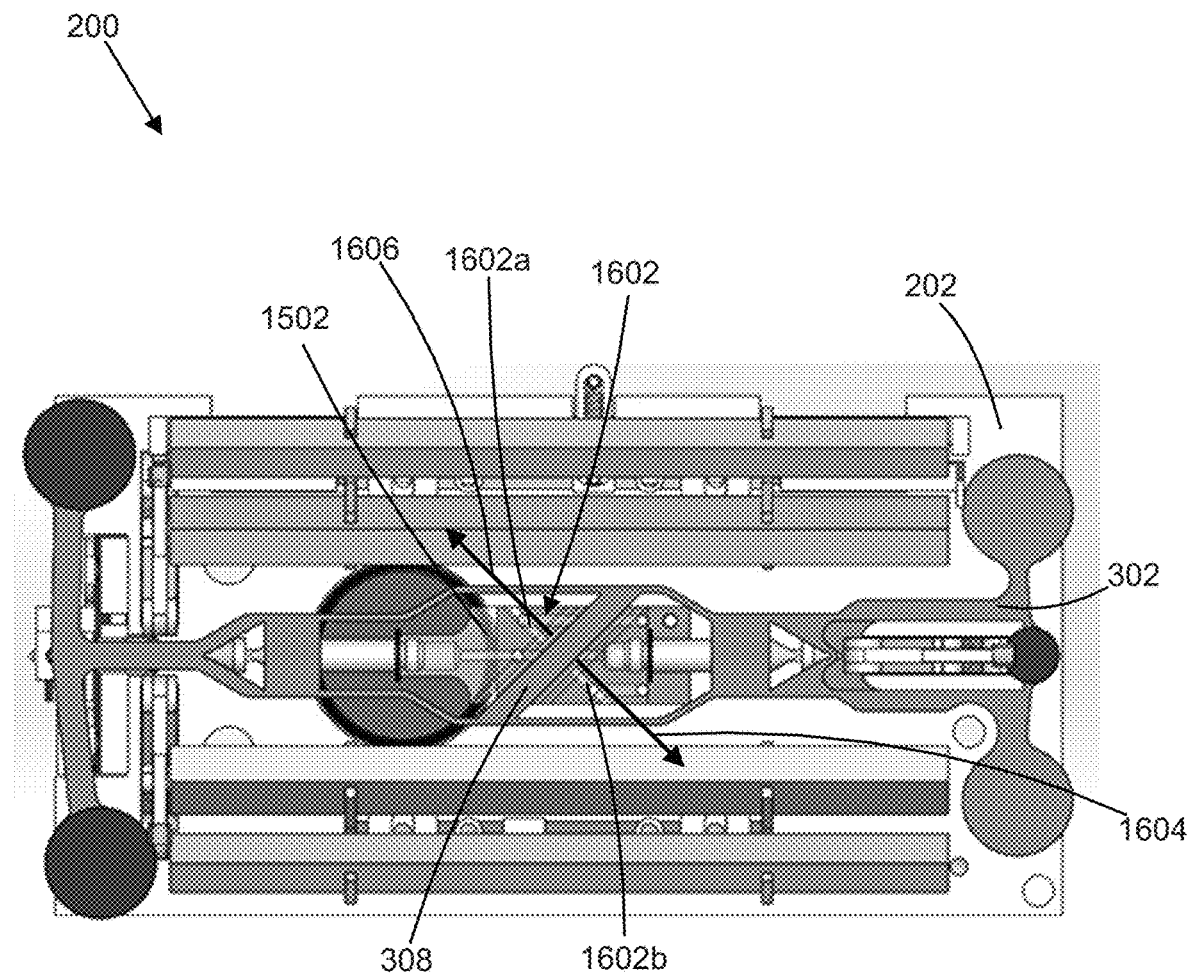
FIG. 16 illustrates another top view of the example nest device of FIG. 2, according to various embodiments.

FIG. 16 illustrates another top view of the example nest device 200 of FIG. 2, according to various embodiments. In the illustrated view, the cylinder assembly 1502 is transparently illustrated to show features of the nest device 200 obscured by the cylinder assembly 1502.

The nest device 200 may include one or more air jets 1602. The air jets 1602 may be utilized to move the carrier 302 relative to the main body 202 of the nest device 200. The air jets 1602 may move the carrier 302 when the carrier 302 is not maintained in position via the air bearings 206 (FIG. 2), the clamps 706 (FIG. 7), and/or the cylinder assembly 1502. The air jets 1602 may be directed toward the crossbar 308 of the carrier 302. In particular, a first air jet 1602a may be directed at a side of the crossbar 308 and a second air jet 1602b may be directed at an opposing side of the crossbar 308. Further, the air jets 1602 may be directed at a center of mass of the carrier 302, such that the air jets 1602 may move the carrier 302 relative to the nest device 200 without causing rotation of the carrier 302 relative to the nest device 200.

The air jets 1602 may blow air onto crossbar 308. The air blown by the air jets 1602 may apply force to the crossbar 308 that causes the carrier 302 to move relative to the nest device 200. The air blown by the air jets 1602 may cause the carrier to be translated in directions that are approximately (within 5 degrees) 45 degrees to the length of the main body 202 in the x-direction and the y-direction. In the illustrated embodiment, the first air jet 1602a may cause the carrier 302 to be translated in the first direction 1604 via blowing air on the carrier 302 and the second air jet 1602b may cause the carrier 302 to be translated in the second direction 1606 via blowing air on the carrier 302. In other embodiments, the first air jet 1602a and the second air jet 1602b may cause the carrier 302 to be translated in different directions than illustrated.

In embodiments that include the carrier 402 (FIG. 4), the air jets 1602 may operate upon the carrier 402 and may perform one of more of the same operations with the carrier 402 as with the carrier 302. In particular, the air jets 1602 may be directed at the crossbar 408 (FIG. 4) and cause the carrier to move relative to the main body 202 of the nest device 200. Further, in some embodiments, the air jets 1602 may be omitted.

Figure 17:
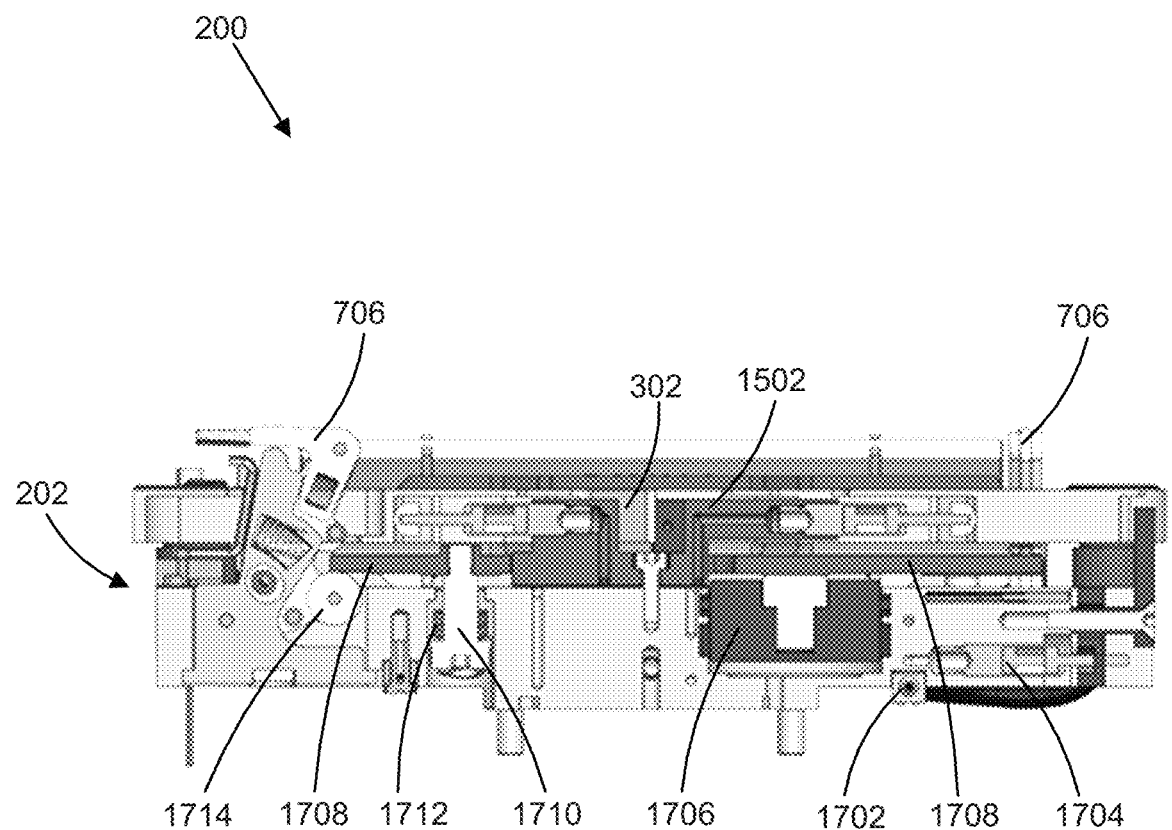
FIG. 17 illustrates a cross-sectional view of the example nest device of FIG. 2, according to various embodiments.

FIG. 17 illustrates a cross-sectional view of the example nest device 200 of FIG. 2, according to various embodiments. The main body 202 of the nest device 200 may include an air supply connection 1702. The air supply connection 1702 may couple the nest device 200 to an air supply (see the air supply 2504 (FIG. 25)) that may supply air to and/or draw air from the nest device 200. The air supply may direct air into the nest device 200 in a first state and may draw air from the nest device 200 in a second state, wherein a control system (see The control system 2508 (FIG. 25)) may control the state of the air supply. The air supply may provide the same air pressure in directing the air into the nest device 200 as the air supply provides when drawing air from the nest device 200. In some embodiments, the air supply may provide a different air pressure in directing the air into the nest device 200 than the air supply provides when drawing air from the nest device 200. Further, in some embodiments, the nest device 200 may include a plurality of air supply connections (such as the air supply connection 1702), wherein a portion of the air supply connections supply air to the nest device 200 while another portion of the air supply connections draw air from the nest device 200.

The air supply connection 1702 may be coupled to the air bearings 206 (FIG. 2) and the air supply may control the state of the air bearings 206. In particular, the air supply connection 1702 may couple to the air supply 506 (FIG. 5) of the air bearing 500 (FIG. 5), wherein the air bearings 206 may include and/or implement one or more of the features of the air bearing 500. The air supply directing air into the nest device 200 via the air supply connection 1702 may cause the air bearings 206 to be in the second state where the air bearings 206 blow air out the ends of the air bearings 206. The air supply drawing air from the nest device 200 via the air supply connection 1702 may cause the air bearings 206 to be in the first state where the air bearings 206 draw air in through the ends of the air bearings 206.

In other embodiments, the nest device 200 may include one or more control valves (not shown) coupled intermediate to the air supply connection 1702 and the air bearings 206 that may control the air flow between the air supply connection 1702 and the air bearings. In particular, each control valve may prevent air flow between the air supply connection 1702 and a corresponding air bearing(s) when the control valve is in a first state and may allow air flow between air supply connection 1702 and the corresponding air bearing(s) when the control valve is in a second state. The control valves may be controlled by the control system and/or an on-board control system.

In some embodiments, the air supply connection 1702 may further be coupled to one or more of the other features of the nest device 200, including the cylinder assembly 1502, datum actuators 1704, an embedded cylinder 1706, the air jets 1602 (FIG. 16), or some combination thereof. The air, supplied by the air supply via the air supply connection 1702, may facilitate actuation and/or operation of the cylinder assembly 1502, the datum actuators 1704, the embedded cylinder 1706, the air jets 1602, or some combination thereof. Further, the nest device 200 may include one or more control valves (not shown) coupled intermediate to the air supply connection 1702 and the cylinder assembly 1502, the datum actuators 1704, the embedded cylinder 1706, and/or the air jets 1602 that may control the air flow between the air supply connection 1702 and the other features. For example, a control valve may be coupled intermediate to the air supply connection 1702 and one or more of the air jets 1602, wherein the control valve allows air flow between the air supply connection 1702 and the air jets 1602 when the control valve is in a first state and prevents air flow between the air supply connection 1702 and the air jets 1602 when the control valve is in a second state. The control valves may be controlled by the control system and/or an on-board control system.

The nest device 200 may further include one or more datum actuators 1704. The datum actuators 1704 may control the state of the datum fingers 204 (FIG. 2). In particular, the datum actuators 1704 may transition the datum fingers 204 between the first state (where the datum fingers 204 are extended and utilized for positioning a part) and the second state (where the datum fingers 204 are retracted). The datum actuators 1704 may transition all the datum fingers 204 at a certain time or may actuate different portions of the datum actuators 1704 at different times. Actuation of the datum actuators 1704 may be controlled by the control valves, the air supply (via supplying air to and/or drawing air from the nest device 200), the control system, the on-board control system, or some combination thereof.

The nest device 200 may further include a lift plate 1708. The lift plate 1708 may be located within the main body 202 of the nest device 200 and may control the state of the clamps 706. In particular, the lift plate 1708 may apply a force to actuation members 1714 of the clamps 706 that causes the clamps 706 to be in the second state (wherein the clamps 706 avoid contact with a placement mechanism (such as the placement mechanism 102 (FIG. 1))) and may not apply the force to the actuation members 1714 that allows the clamps 706 to be in the first state (wherein the clamps 706 may contact a part (such part 104 (FIG. 1))). The actuation members 1714 may include one or more of the features of the actuation member 814 (FIG. 8). The lift plate 1708 may extend through the main body 202 and make contact with the actuation members 1714 of all the clamps 706, such that the lift plate 1708 may control the state of all of the clamps 706 and cause transition of the state of all of the clamps 706 at the same time. In other embodiments, the nest device 200 may include a plurality of lift plates (such as the lift plate 1708), wherein each of the lift plates may control the state of one or more corresponding clamps of the clamps 706.

The lift plate 1708 may transition between a lowered position and a raised position. In the lowered position, the lift plate 1708 may cause the clamps 706 to be in the second state. In particular, the lift plate 1708 may apply the force to the actuation members 1714 that cause the clamps 706 to be in the second state. When in the second state, first springs (such as the first spring 806 (FIG. 8)) of the clamps 706 may be compressed and may urge the clamps 706 toward the first state. The first springs urging the clamps 706 toward the first state may be translated to a force being applied to the lift plate 1708 via the actuation members 1714, which may urge the lift plate 1708 toward the raised position. The lift plate 1708 may be maintained in the lowered position via a shoulder bolt 1710 and a spring 1712, as described further below.

In the raised position, the lift plate 1708 may allow the clamps 706 to be in the first state. In particular, the lift plate 1708 may not apply the force to the actuation members 1714 that causes the clamps 706 to be in the second state. Based on the lift plate 1708 not applying the force to the actuation members 1714, the first springs urging the clamps 706 toward the first state may cause the clamps 706 to be in the first state. In particular, the first springs may expand and maintain the clamps 706 in the first state.

The nest device 200 may further include a shoulder bolt 1710 and a spring 1712. The shoulder bolt 1710 may be coupled to the lift plate 1708 and may cause the lift plate 1708 to be moved as the shoulder bolt 1710 is moved. The spring 1712 may contact a head of the shoulder bolt 1710 and may apply a force to the head of the shoulder bolt 1710 that urges the head of the shoulder bolt 1710 away from the main body 202. When the spring 1712 is in an expanded state, the head of the shoulder bolt 1710 may be located away from the main body 202 and the shoulder bolt 1710 may cause the lift plate 1708 to be in the lowered position. The spring 1712 may apply a force to the head of the shoulder bolt 1710 that is greater than the force applied to the lift plate 1708 via the actuation members 1714. Accordingly, the force applied by the spring 1712 may overcome the force applied to the lift plate 1708 via the actuation members 1714 and cause, via acting upon the head of the shoulder bolt 1710, the lift plate 1708 to be in the lowered position. The default position of the lift plate 1708 may be the lowered position based on the force of the spring 1710 being greater than the force applied to the lift plate 1708 via the actuation members 1714.

The nest device 200 may further include the embedded cylinder 1706. The embedded cylinder 1706 may abut the lift plate 1708. The embedded cylinder 1706 may apply a force to the lift plate 1708 when the embedded cylinder 1706 is in an actuated state, where the force applied by the embedded cylinder 1706 is in an opposite direction to the force applied to the head of the shoulder bolt 1710 via the spring 1712. The embedded cylinder 1706 may be positioned to apply the force to a point on the lift plate 1708 that is central to the forces applied to the lift plate 1708 via the actuation members 1714 and the spring 1712 (via the shoulder bolt 1710), such that the moment of force acting upon the lift plate 1708 with the embedded cylinder 1706 actuated is approximately (within 0.5 Newtons) equal to zero (i.e. the rotational forces applied to the lift plate 1708 are in equilibrium such that the lift plate 1708 is not urged to rotate). The force applied by the embedded cylinder 1706 may be greater than the difference of the force applied to the head of the shoulder bolt 1710 via the spring and the forces applied to the lift plate 1708 via the actuation members 1714. Accordingly, the force applied by the embedded cylinder 1706 may cause the lift plate 1708 to be in the raised position.

In some embodiments, the embedded cylinder 1706, the lift plate 1708, the shoulder bolt 1710, and/or the spring 1712 may be omitted. In particular, the embedded cylinder 1706, the lift plate 1708, the shoulder bolt 1710, and the spring 1712 may be omitted in embodiments where the clamps 706 are omitted.

Figure 18:
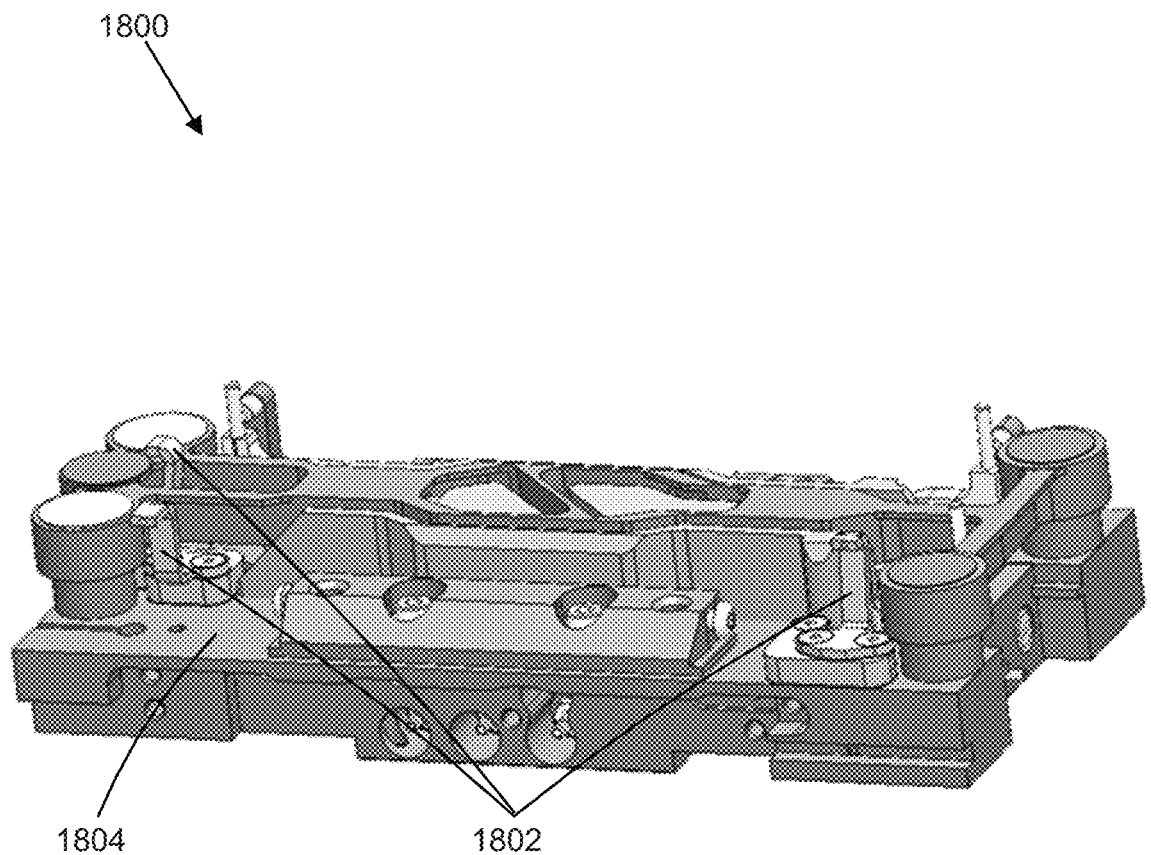
FIG. 18 illustrates another example nest device, according to various embodiments.

FIG. 18 illustrates another example nest device 1800, according to various embodiments. The nest device 1800 may include one or more of the features of the nest device 100 (FIG. 1), the nest device 200 (FIG. 2), or some combination thereof.

The nest device 1800 may include one or more air jet mechanisms 1802 (which may be referred to as 'air jets'). The air jet mechanisms 1802 may extend from a main body 1804 of the nest device 1800 and may direct air toward a part (such as the part 104 (FIG. 1)), a carrier (such as the carrier 106 (FIG. 1), the carrier 302 (FIG. 3), and/or the carrier 402 (FIG. 4)), or some combination thereof. In particular, the air jet mechanisms 1802 may be coupled to an air supply via an air supply connection (such as the air supply connection 1702 (FIG. 17)) of the nest device 1800 and may direct air supplied by the air supply toward the part, the carrier, or some combination thereof. In some embodiments, one or more control valves may be coupled intermediate to the air supply connection and the air jet mechanisms 1802 that controls air flow between the air supply connection and the air jet mechanisms 1802. In particular, each of the control valves may prevent air flow between the air supply connection and corresponding air jet mechanisms of the air jet mechanisms 1802 when the control valves are in a first state, and may allow air flow between the air supply connection and the corresponding air jet mechanisms when the control valves are in a second state. The control valves may be controlled by a control system (see the control system 2508) and/or an on-board control system.

Figure 19A:
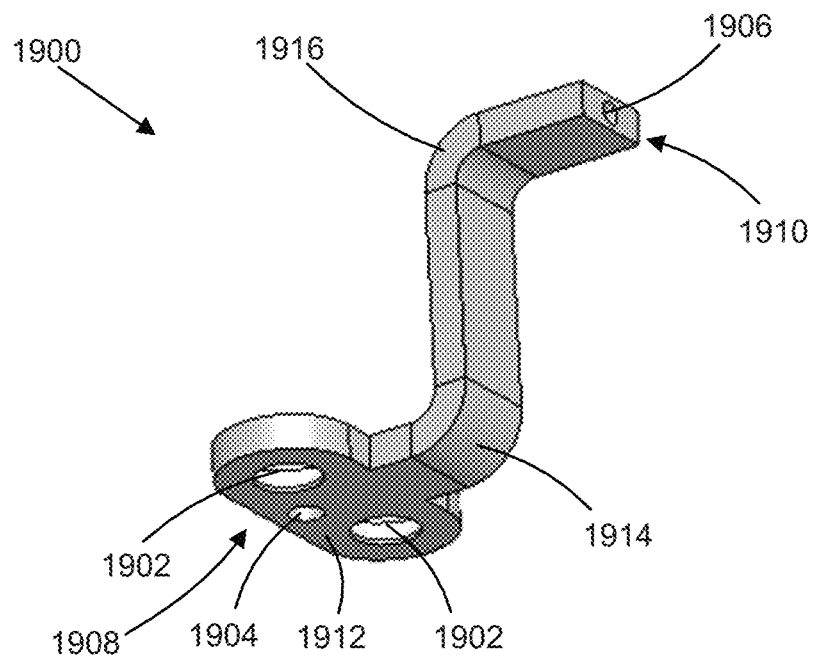
FIG. 19A illustrates an example air jet mechanism, according to various embodiments.

FIG. 19A illustrates an example air jet mechanism 1900, according to various embodiments. The air jet mechanism 1900 may include one or more of the features of the air jet mechanisms 1802 (FIG. 18). Further, the air jet mechanisms 1802 may include one or more of the features of the air jet mechanism 1900. The air jet mechanism 1900 may be formed of a rigid material, such as steel, iron, aluminum, copper, brass, zinc, tin, hard plastic, hard rubber, or some combination thereof. Further, the air jet mechanism 1900 may be shaped to direct air toward a part (such as the part 104 (FIG. 1)), a carrier (such as the carrier 106 (FIG. 1), the carrier 302 (FIG. 3), and/or the carrier 402 (FIG. 4)), or some combination thereof. In the illustrated embodiment, the air jet mechanism 1900 may be shaped with a first bend 1914 and a second bend 1916. One or more of the features of the air jet mechanism 1900 may be formed in the air jet mechanism 1900 prior to shaping (i.e. forming the first bend 1914 and the second bend 1916 in the illustrated embodiment) the air jet mechanism 1900, as is described further in relation to FIG. 20.

The air jet mechanism 1900 may have one or more mounting apertures 1902 formed in the air jet mechanism 1900. The mounting apertures 1902 may be utilized for mounting the air jet mechanism 1900 to a main body of a nest devices (such as the main body 202 (FIG. 2) and/or the main body 1804 (FIG. 18)). In particular, one or more fasteners may be positioned through the mounting apertures 1902 and may mount the air jet mechanism 1900 to the main body. In some embodiments, the air jet mechanism 1900 may be mounted to the main body by other means, including epoxy, adhesive, welding, solder, or some combination thereof.

The air jet mechanism 1900 may further have an inlet 1904 and an outlet 1906 formed in the air jet mechanism 1900. The inlet 1904 may be formed toward a first end 1908 of the air jet mechanism 1900 and the outlet 1906 may be formed toward a second end 1910 of the air jet mechanism 1900, the second end 1910 opposite to the first end 1908. The inlet 1904 may be coupled to the outlet 1906 via a tunnel (see 1952 (FIG. 19B)) formed within the air jet mechanism 1900.

A surface 1912 in which the inlet 1904 may abut the main body of the nest device when the air jet mechanism 1900 is mounted to the main body. The inlet 1904 may receive air from the nest device and may direct the air, via the tunnel, out of the outlet 1906. The air directed out of the outlet 1906 may be directed toward the part, the carrier, or some combination thereof.

Figure 19B:
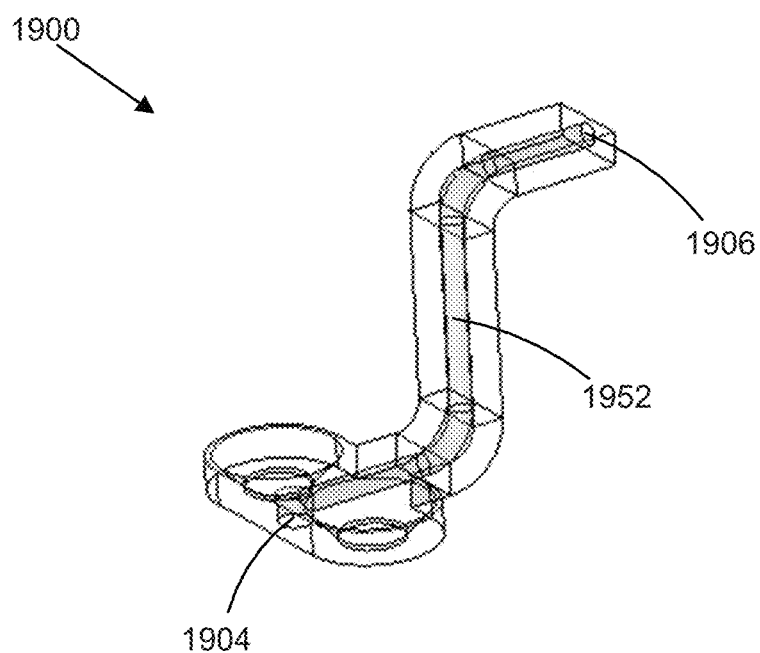
FIG. 19B illustrates a partially transparent view of the example air jet mechanism, according to various embodiments.

FIG. 19B illustrates a partially transparent view of the example air jet mechanism 1900, according to various embodiments. The air jet mechanism 1900 may have a tunnel 1952 formed within the air jet mechanism 1900. The tunnel 1952 may extend from the inlet 1904 to the outlet 1906 and may couple the inlet 1904 to the outlet 1906. In some embodiments, the tunnel 1952, the inlet 1904, and/or the outlet 1906 may be formed prior to shaping of the air jet mechanism 1900, as is described further in relation to FIG. 20.

Figure 20:
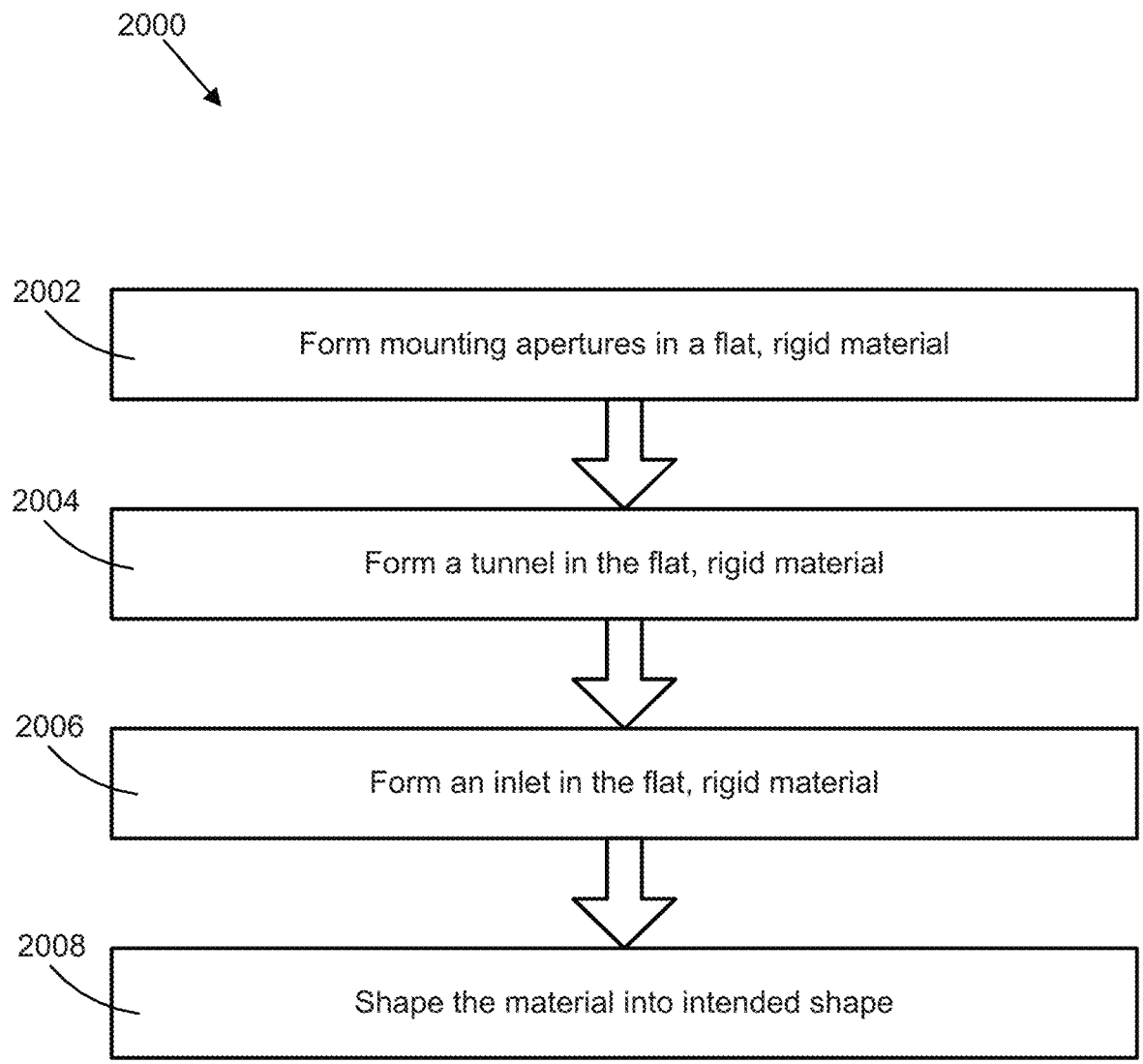
FIG. 20 illustrates an example procedure for forming the air jet mechanism of FIG. 19A and FIG. 19B, according to various embodiments.

FIG. 20 illustrates an example procedure 2000 for forming the air jet mechanism 1900 of FIG. 19A and FIG. 19B, according to various embodiments. The procedure 2000 may be performed on a flat, rigid material. In particular, the procedure 2000 may be performed on a flat piece of steel, iron, aluminum, copper, brass, zinc, tin, hard plastic, hard rubber, or some combination thereof.

In stage 2002, one or more mounting apertures (such as the mounting apertures 1902 (FIG. 19A)) may be formed in the flat, rigid material. The mounting apertures may be formed by drilling one or more apertures through the flat, rigid material. The mounting apertures may be formed toward a first end (such as the first end 1908 (FIG. 19A)) of the flat, rigid material. In some embodiments, stage 2002 may be omitted. For example, stage 2002 may be omitted when the air jet mechanism 1900 is to be mounted to a nest device via epoxy, adhesive, welding, solder, or some combination thereof, rather than via the mounting apertures.

In stage 2004, a tunnel (such as the tunnel 1952 (FIG. 19B)) may be formed in the flat, rigid material. The tunnel may be formed by drilling a recess partially through a length of the flat, rigid material. The tunnel may be formed in a second end (such as the second end 1910 (FIG. 19A)) of the flat, rigid material and may extend toward the first end without the tunnel extending out of the first end, the second end being opposite to the first end. The opening formed by forming the tunnel in the second end of the flat, rigid material may be an outlet (such as the outlet 1906 (FIG. 19A)) of the air jet mechanism 1900.

In stage 2006, an inlet (such as the inlet 1904 (FIG. 19A)) may be formed in the flat, rigid material. The inlet may be formed by drilling a recess partially through the flat, rigid material. The inlet may be formed in a surface (such as the surface 1912 (FIG. 19A)) of the flat, rigid material and may extend to the tunnel, wherein the inlet is connected to the tunnel. In some embodiments, the inlet may extend substantially perpendicular (within 5 degrees) to the tunnel.

In stage 2008, the flat, rigid material may be shaped into an intended shape. The flat, rigid material may be shaped by applying one or more forces to the flat, rigid material, or some portion thereof, to cause the flat, rigid material to bend and retain the bent shape. In some embodiments, the flat, rigid material may be heated while, or prior to, applying the forces to cause the material to pliable and may be cooled after completing bending of the material to return rigidity to the material while retaining the bent shape. For example, the first bend 1914 and the second bend 1916 illustrated in FIG. 19A may be formed in stage 2008.

It is to be understood that the procedure 2000 illustrates an example of a procedure for forming the air jet mechanism 1900. In other embodiments, the stages may be performed in different orders. In particular, in some embodiments, stage 2002 and/or stage 2006 may be performed before or after stage 2008.

Figure 21:
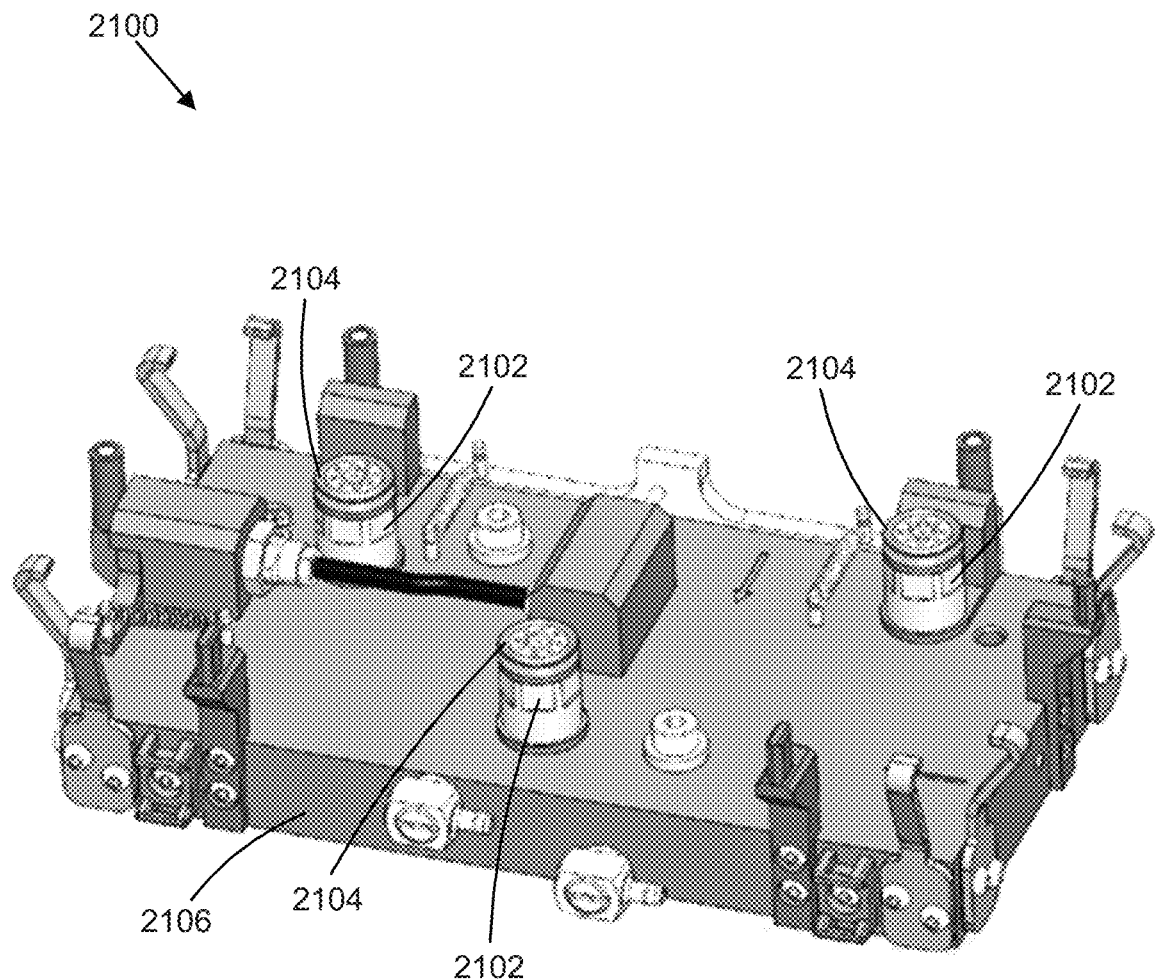
FIG. 21 illustrates another example nest device, according to various embodiments.

FIG. 21 illustrates another example nest device 2100, according to various embodiments. The nest device 2100 may include one or more of the features of the nest device 100 (FIG. 1), the nest device 200 (FIG. 2), and/or the nest device 1800 (FIG. 18). The nest device 2100 may be designed for embodiments where only a part (such as the part 104 (FIG. 1)) is included in a placement mechanism (such as the placement mechanism 102 (FIG. 1)) to be operated on by the nest device 2100. Further, in some embodiments, the nest device 2100 may omit the clamps 706 (FIG. 7) and/or the clamps 800 (FIG. 8), the cylinder assembly 1502 (FIG. 15), the embedded cylinder 1706 (FIG. 17), the shoulder bolt 1710 (FIG. 17), the spring 1712 (FIG. 17), the lift plate 1708 (FIG. 17), or some combination thereof, which may be unnecessary in the embodiments where only the part is included in the placement mechanism.

The nest device 2100 may include one or more air bearings 2102. The air bearings 2102 may include one or more of the features of the air bearings 206 (FIG. 2) and/or the air bearings 500 (FIG. 5). Each of the air bearings 2102 may include a flexible material 2104 that encircles the end of the air bearings 2102, through which the air is blown out and/or drawn in, and extends away from a main body 2106 of the nest device 2100. The flexible material 2104 may be silicone, nitrile, synthetic rubber, fluoropolymer elastomer, vinyl, urethane, neoprene, polyvinyl chloride, or some combination thereof. The flexible material 2104 may contact the part when the part is suctioned (via the air bearings 2102 drawing in air) to the ends of the air bearings 2102 and may facilitate generation of the suction of the part via the air bearings 2102. In particular, the flexible material 2104 may generate a substantially air tight seal with the part, which may facilitate suction between the part and the air bearings 2102.

Figure 22:
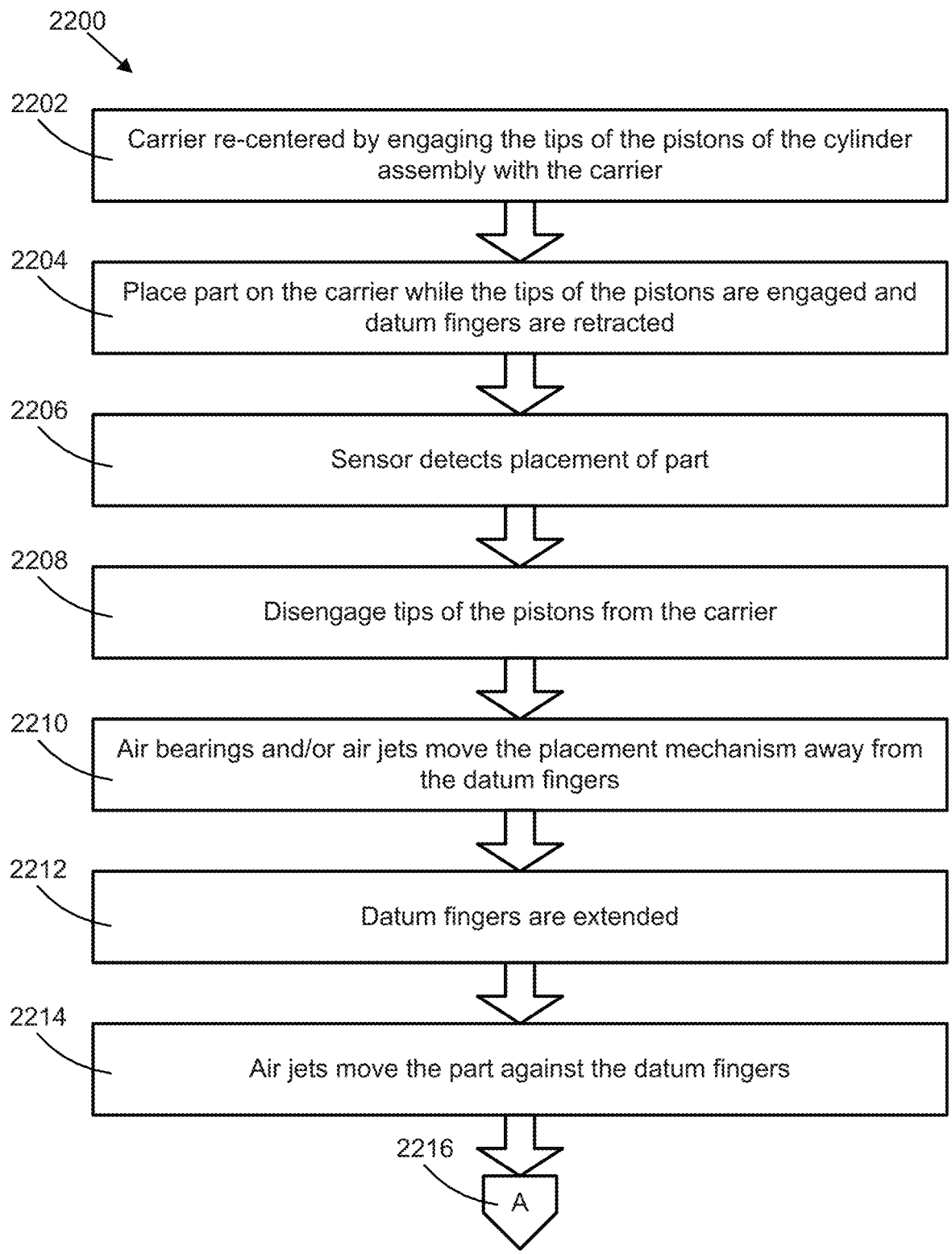
FIG. 22 illustrates a first portion of a procedure for positioning of a part relative to a main body of a nest device, according to various embodiments.

FIG. 22 illustrates a first portion of a procedure 2200 for positioning of a part (such as the part 104 (FIG. 1)) relative to a main body (such as the main body 202 (FIG. 2)) of a nest device (such as the nest device 100 (FIG. 1), the nest device 200 (FIG. 2), the nest device 1800 (FIG. 18), and/or the nest device 2100 (FIG. 21)), according to various embodiments. The procedure 2200 may be performed by embodiments that include a carrier, such as the carrier 106 (FIG. 1), the carrier 302 (FIG. 3), and/or the carrier 402 (FIG. 4).

In stage 2202, the carrier may be re-centered by engaging tips of the pistons (such as the first piston 1504 (FIG. 15) and/or the second pistons 1506 (FIG. 15)) of the cylinder assembly (such as the cylinder assembly 1502 (FIG. 15)) with the carrier. The tips of the pistons may engage with tapered cutouts (such as tapered cutout 312 (FIG. 3) and/or tapered cutout 314 (FIG. 3)) of the carrier, tapered recesses (such as the first tapered recess 452 (FIG. 4) and/or the second tapered recess 454 (FIG. 4)), or some combination thereof. Re-centering of the carrier may be performed by the same process as described in relation to FIG. 15.

In stage 2204, a part (such as the part 104 (FIG. 1)) may be placed on the carrier while the tips of the pistons are engaged with the cylinder and datum fingers (such as the datum fingers 204 (FIG. 2)) are in the retracted position. The part may be placed within 2 millimeters of an intended position of the part to be achieved by the procedure 2200. In embodiments that include clamps (such as the clamps 706 (FIG. 7) and/or the clamp 800 (FIG. 8)), the clamps may be in the second state (where the contact pads of the clamps are to avoid contact with the part) when the part is placed on the carrier.

In stage 2206, a sensor (such as the sensor 1508 (FIG. 15)) may detect placement of the part on the carrier. In some embodiments, the procedure 2200 may automatically initiate stage 2208 in response to the sensor detecting placement of the part on the carrier. In other embodiments, one or more additional triggers (such as expiration of a timer, user input, or some combination thereof) may be utilized to initiate stage 2208 in combination with, or in lieu of, the second detecting placement of the part on the carrier.

In stage 2208, the tips of the pistons may be disengaged from the carrier. Based on the tips of the pistons being disengaged from the carrier, the placement mechanism (which includes the carrier and the part) may be repositioned relative to the main body of the nest device.

In stage 2210, air bearings (such as the air bearings 200 (FIG. 2) and/or the air bearing 500 (FIG. 5)), air jets (such as the air jets 1602 (FIG. 16)), air jet mechanisms (such as the air jet mechanisms 1802 (FIG. 18) and/or the air jet mechanisms 1900 (FIG. 19)), or some combination thereof, may move the placement mechanism away from the datum fingers. In particular, the air bearings may blow air out of the ends of the air bearings to hover the placement mechanism off of the air bearings. The air jets and/or the air jet mechanisms may translate the placement mechanism away from the datum fingers while the placement mechanism is hovered off of the air bearings. The air jets and/or the air jet mechanisms may translate the placement mechanism via blowing air toward the carrier and/or the part, wherein the air applies force to the placement mechanism. The air jets and/or the air jet mechanisms may blow the air for a predetermined period of time, until the placement mechanism is in a certain position away from the datum fingers, or some combination thereof, at which point the air jets and/or the air jet mechanisms may stop blowing air.

In stage 2212, the datum fingers may be transitioned to the extended positions. Based on the placement mechanism being moved away from the datum fingers in stage 2210, the datum fingers may avoid contact with the placement mechanism while being transitioned to the extended positions.

In stage 2214, the air jets and/or air jet mechanisms may move the part against the datum fingers. The air jets and/or the air jet mechanisms that move the part against the datum fingers may be the same air jets and/or air jet mechanisms that move the part away from the datum fingers, or may be different air jets and/or air jet mechanisms from the air jets and/or air jet mechanisms that move the part away from the datum fingers. The air jets and/or the air jet mechanisms may blow air toward the placement mechanism, wherein the air applies force to the placement mechanism that causes the placement mechanism to be moved toward the datum fingers. The air jets and/or the air jet mechanisms may blow the air toward the placement mechanism while the placement mechanism is hovered off of the air bearings via the air bearings blowing air out of the ends of the air bearings. The air jets and/or the air jet mechanisms may blow the air for a predetermined period of time, until contact of the part with the datum fingers is sensed, or some combination thereof, at which point the air jets and/or the air jet mechanisms may stop blowing air. When the part is in contact with the datum fingers, the part may be located within 10 micrometers of the intended position of the part at the end of the procedure 2200. The procedure 2200 may continue to stage 2218 (as indicated via off-page link 2216) illustrated in FIG. 23.

Figure 23:
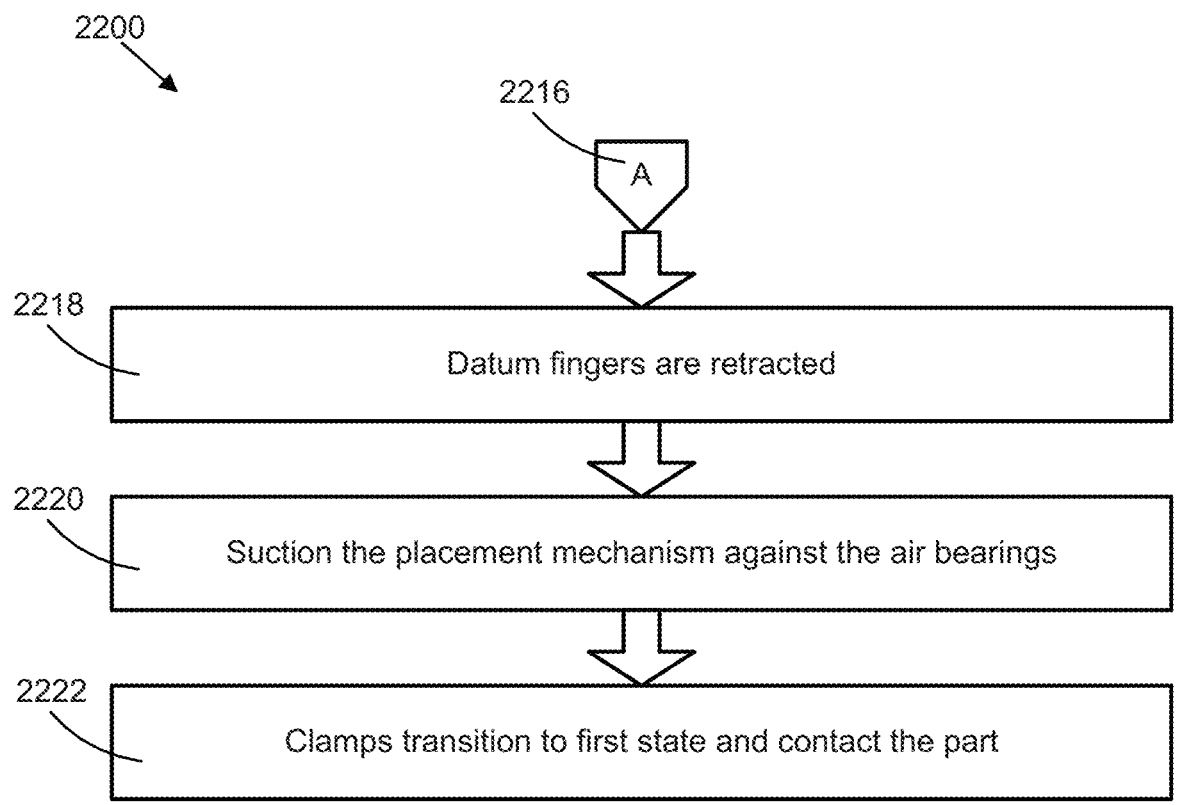
FIG. 23 illustrates a second portion of the procedure for positioning of the part relative to the main body of the nest device, according to various embodiments.

FIG. 23 illustrates a second portion of the procedure 2200 for positioning of the part relative to the main body of the nest device, according to various embodiments. In stage 2218, the datum fingers may be retracted. Retraction of the datum fingers may move the datum fingers out of contact with the part without applying a force to the placement mechanism that may cause the placement mechanism to be moved from the position of the placement mechanism at the conclusion of stage 2214.

In stage 2220, the placement mechanism may be suctioned against the air bearings. The air bearings may draw in air through the ends of the air bearings that cause the carrier to be suctioned against the air bearings. Suctioning the placement mechanism against the air bearings may maintain a position of the carrier and/or the part relative to the main body of the nest device.

In stage 2222, the clamps may transition to the first state (where the contact pads of the clamps contact the part) and may maintain the position of the part relative to the carrier and/or the main body of the nest device. When in the first state, the clamps may contact the part and apply a substantially (within 15 degrees) vertical, downward force of less than less than 0.2 pounds (90.7185 grams) to the part. The force may maintain the position of the part relative to the carrier and/or the main body of the nest device.

Figure 24:
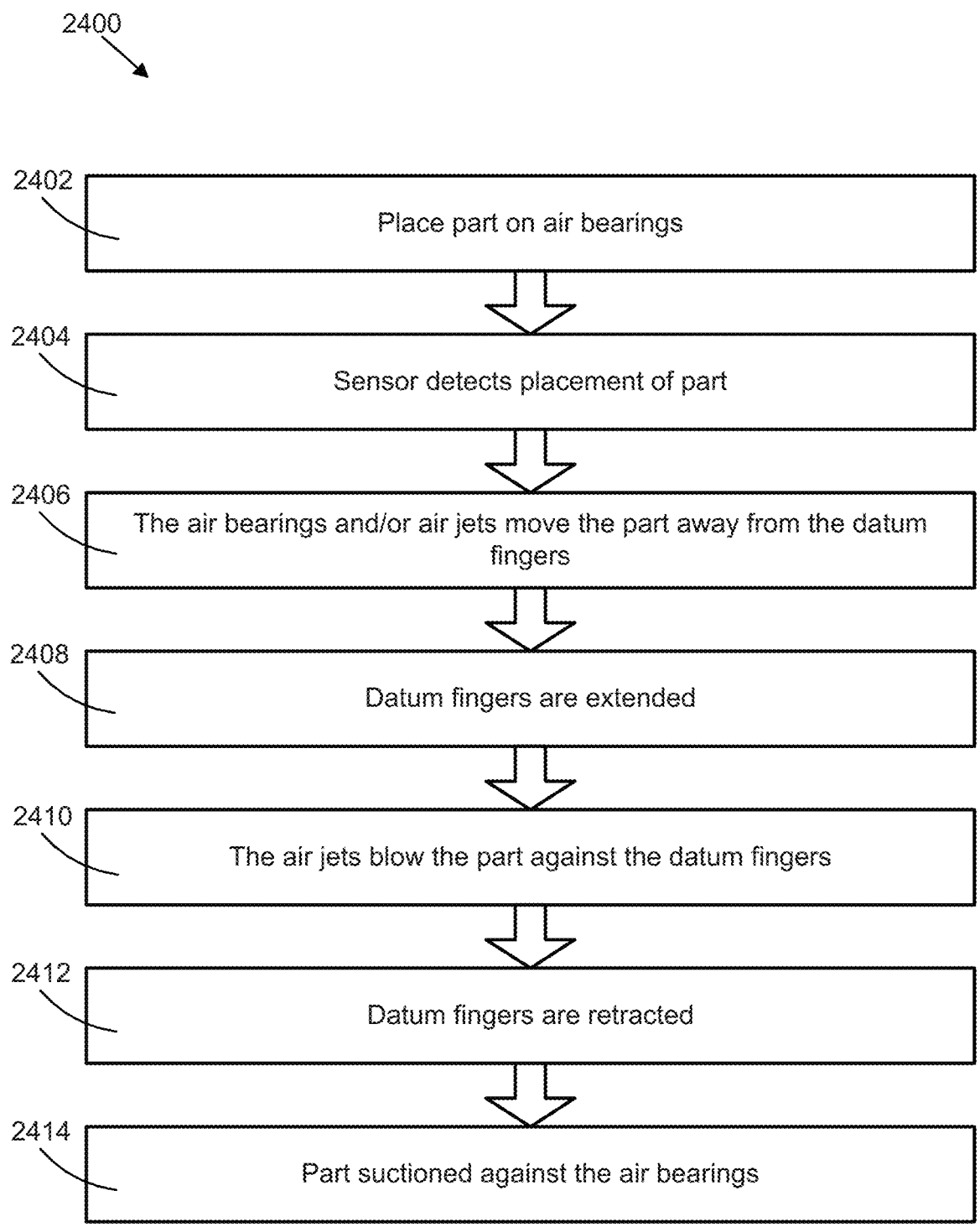
FIG. 24 illustrates another procedure for positioning of a part relative to a main body of a nest device, according to various embodiments.

FIG. 24 illustrates another procedure 2400 for positioning of a part (such as the part 104 (FIG. 1)) relative to a main body (such as the main body 202 (FIG. 2)) of a nest device (such as the nest device 100 (FIG. 1), the nest device 200 (FIG. 2), the nest device 1800 (FIG. 18), and/or the nest device 2100 (FIG. 21)), according to various embodiments. The procedure 2400 may be performed by embodiments in which a carrier is absent, such that the placement mechanism includes only the part.

In stage 2402, a part (such as the part 104 (FIG. 1)) may be placed on the on air bearings (such as the air bearings 206 (FIG. 2) and/or the air bearing 500 (FIG. 5)) and datum fingers (such as the datum fingers 204 (FIG. 2)) are in the retracted position. The part may be placed within 2 millimeters of an intended position of the part to be achieved by the procedure 2400.

In stage 2404, a sensor (such as the sensor 1508 (FIG. 15)) may detect placement of the part on the air bearings. In some embodiments, the procedure 2400 may automatically initiate stage 2406 in response to the sensor detecting placement of the part on the air bearings. In other embodiments, one or more additional triggers (such as expiration of a timer, user input, or some combination thereof) may be utilized to initiate stage 2406 in combination with, or in lieu of, the sensor detecting placement of the part on the air bearings.

In stage 2406, the air bearings, air jets (such as the air jets 1602 (FIG. 16)), air jet mechanisms (such as the air jet mechanisms 1802 (FIG. 18) and/or the air jet mechanisms 1900 (FIG. 19)), or some combination thereof, may move the part away from the datum fingers. In particular, the air bearings may blow air out of the ends of the air bearings to hover the part off of the air bearings. The air jets and/or the air jet mechanisms may translate the part away from the datum fingers while the part is hovered off of the air bearings. The air jets and/or the air jet mechanisms may translate the part via blowing air toward the part, wherein the air applies force to the part. The air jets and/or the air jet mechanisms may blow the air for a predetermined period of time, until the part is in a certain position away from the datum fingers, or some combination thereof, at which point the air jets and/or the air jet mechanisms may stop blowing air.

In stage 2408, the datum fingers may be transitioned to the extended positions. Based on the part being moved away from the datum fingers in stage 2210, the datum fingers may avoid contact with the part while being transitioned to the extended positions.

In stage 2410, the air jets and/or air jet mechanisms may move the part against the datum fingers. The air jets and/or the air jet mechanisms that move the part against the datum fingers may be the same air jets and/or air jet mechanisms that move the part away from the datum fingers, or may be different air jets and/or air jet mechanisms from the air jets and/or air jet mechanisms that move the part away from the datum fingers. The air jets and/or the air jet mechanisms may blow air toward the part, wherein the air applies force to the part that causes the part to be moved toward the datum fingers. The air jets and/or the air jet mechanisms may blow the air toward the part while the part is hovered off of the air bearings via the air bearings blowing air out of the ends of the air bearings. The air jets and/or the air jet mechanisms may blow the air for a predetermined period of time, until contact of the part with the datum fingers is sensed, or some combination thereof, at which point the air jets and/or the air jet mechanisms may stop blowing air. When the part is in contact with the datum fingers, the part may be located within 10 micrometers of the intended position of the part at the end of the procedure 2400.

In stage 2412, the datum fingers may be retracted. Retraction of the datum fingers may move the datum fingers out of contact with the part without applying a force to the part that may cause the part to be moved from the position of the part at the conclusion of stage 2410.

In stage 2414, the part may be suctioned against the air bearings. The air bearings may draw in air through the ends of the air bearings that cause the carrier to be suctioned against the air bearings. Suctioning the part against the air bearings may maintain a position of the part relative to the main body of the nest device.

Figure 25:
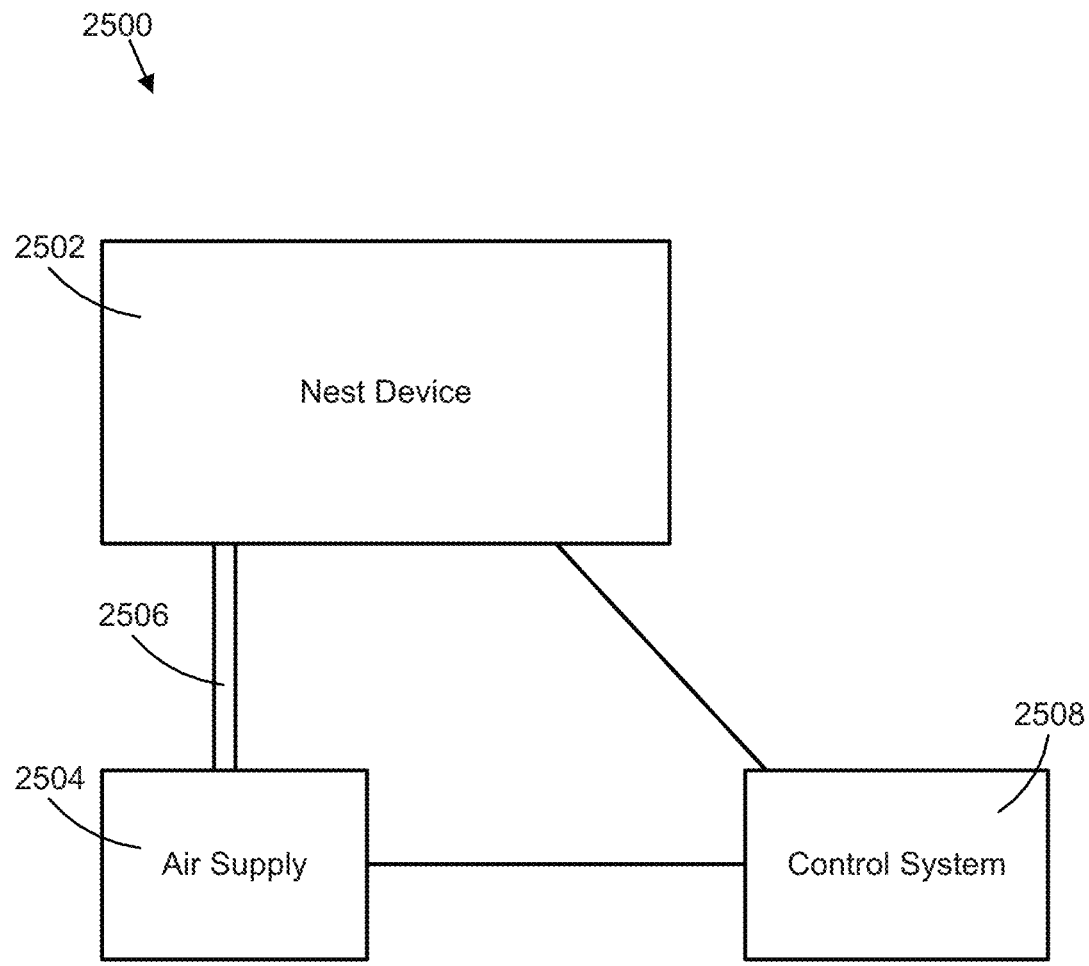
FIG. 25 an example nest system, according to various embodiments.

FIG. 25 an example nest system 2500, according to various embodiments. The nest system 2500 may include a nest device 2502. The nest device 2502 may include one or more of the features of the nest device 100 (FIG. 1), the nest device 200 (FIG. 2), the nest device 1800 (FIG. 18), the nest device 2100 (FIG. 21), or some combination thereof.

The nest system 2500 may further include an air supply 2504. The air supply 2504 may be coupled to the nest device 2502 via air tube 2506. The air supply 2504 may supply air to, and/or draw air from, the nest device 2502. The air supply 2504 may alternate between supplying air to the nest device 2502 and drawing air from the nest device 2502 at different times. In some embodiments, the air supply 2504 may be coupled to the nest device 2502 via two or more air tubes (such as the air tube 2506), wherein a portion of the air tubes supply air to the nest device 2502 and another portion of the air tubes draw air from the nest device 2502.

The nest system 2500 may further include a control system 2508. The control system 2508 may include circuitry, one or more processors, computer-readable media that includes instructions that when executed by one or more processors cause the processors to perform certain operations, or some combination thereof. The control system 2508 may be communicatively coupled to the nest device 2502, the air supply 2504, or some combination thereof. The control system 2508 may control the flow of air from the air supply 2504 to the nest device 2502, the actuation of one or more features of the nest device 2502 (such as actuation of the datum fingers 204 (FIG. 2), the air bearings 206 (FIG. 2), the air bearing 500 (FIG. 5), the clamps 706 (FIG. 7), the clamp 800 (FIG. 8), the cylinder assembly 1502 (FIG. 15), the air jets 1602 (FIG. 16), the embedded cylinder 1706 (FIG. 17), the datum actuator 1704 (FIG. 17), the air jet mechanism 1802 (FIG. 18), the air bearings 2102 (FIG. 21), valves of the nest device 2502, or some combination thereof). Further, the control system 2508 may cause the nest device 2502 to perform the procedure 2200 (FIG. 22), the procedure 2400 (FIG. 24), or some combination thereof. In some embodiments, the control system 2508 may be implemented as two separate control systems (one for the air supply and one for the nest device), may be included in the nest device 2502 (which may be referred to as an on-board control system), may be included in the air supply 2504, or some combination thereof.

Below are some non-limiting examples illustrating what the inventors and/or the applicant consider to be prospective patentable subject matter. Accordingly, the inventors and/or the applicant may pursue the subject matter illustrated in the following examples in the current application, continuing applications, and/or divisional applications. Further, it is to be understood that the subject matter that may be pursued in the current application, continuing applications, and/or divisional applications is not to be limited to features included in the examples below, but may include the features of any of the related embodiments described herein. For example, the examples directed to a clamp may include one or more of the features related to the clamps 706 (FIG. 7), the clamp 800 (FIG. 8), or some combination thereof. Further, it is to be understood that the inventors and/or the applicant consider any example type related to the subject matter in the examples below to be prospective subject matter. For example, while only apparatus-type examples may be listed below directed to a feature, the inventors and/or the applicant may consider method-type examples, means-for-type examples, system-type examples, and/or computer-readable media-type examples directed to the feature to be prospective patentable subject matter.

Example 1 may include a nest device for positioning a part, comprising a main body, one or more air bearings that extend from a side of the main body, wherein a placement mechanism is to be positioned on ends of the one or more air bearings, the ends of the one or more air bearings opposite to the main body, wherein the placement mechanism includes the part, and wherein the one or more air bearings are to: blow air out of the ends of the one or more air bearings against the placement mechanism when the air bearings are in a first state, wherein the air blown by the air bearings causes placement mechanism to hover off of the air bearings; and draw air in through the ends of the one or more air bearings when the air bearings are in a second state, wherein the air drawn in generates suction with the placement mechanism to maintain a position of the placement mechanism, and one or more air jets that extend from the side of the main body and are directed toward the placement mechanism, wherein the one or more air jets are to blow air against the placement mechanism, and wherein the air blown by the one or more air jets causes the placement mechanism to be translated relative to the main body.

Example 2 may include the nest device of example 1 or some other example herein, wherein the one or more air jets are to blow air against the placement mechanism while the air bearings are in the first state, and cease blowing air while the air bearings are in the second state.

Example 3 may include the nest device of example 1 or some other example herein, wherein the placement mechanism further includes a carrier, wherein the carrier is positioned on the ends of the one or more bearings, wherein the one or more air bearings blow air against the carrier in the first state and the air drawn in via the one or more air bearings generates suction with the carrier when the air bearings are in the second state.

Example 4 may include the nest device of example 3 or some other example herein, wherein the part is to be placed on the carrier opposite from the main body of the nest device.

Example 5 may include the nest device of example 3 or some other example herein, wherein the one or more air jets are directed toward the carrier and blow air against the carrier.

Example 6 may include the nest device of example 5 or some other example herein, wherein the carrier includes a crossbar, wherein the one or more air jets includes a first air jet directed at the crossbar in a first direction and a second air jet directed at the crossbar in a second direction, the second direction opposite to the first direction, and wherein the first air jet is to blow air against the crossbar to cause the carrier to be translated in the first direction and the second jet is to blow air against the crossbar to cause the carrier to be translated in the second direction.

Example 7 may include the nest device of example 1 or some other example herein, wherein air blown out of the ends of the one or more air bearings is blown at a first velocity, and wherein air drawn in through the ends of the one or more air bearings is drawn in at a second velocity, the second velocity greater than the first velocity.

Example 8 may include the nest device of example 1 or some other example herein, further comprising one or more datum fingers that extend from the side of the main body, wherein the one or more datum fingers are to transition between extended positions and retracted positions, the retracted positions different from the extended positions.

Example 9 may include the nest device of example 8 or some other example herein, wherein the one or more air jets are to blow air against the placement mechanism when the one or more datum fingers are in the extended positions, wherein the air blown by the one or more air jets causes the part to be translated against the one or more datum fingers to position the part in an intended position.

Example 10 may include the nest device of example 8 or some other example herein, wherein the one or more datum fingers are to be in the retracted positions while the air bearings are in the second state, and wherein the one or more datum fingers avoid contact with the placement mechanism while in the retraced positions.

Example 11 may include a method of positioning a part on a nest device, comprising blowing, via one or more air bearings of the nest device, air out of ends of the one or more air bearings against a placement mechanism positioned on the one on more air bearings, wherein the air blown out of the ends of the one or more bearings causes the placement mechanism to hover off of the air bearings, and wherein the placement mechanism includes the part, blowing, via one or more air jets of the nest device, air against the placement mechanism while the placement mechanism is hovered off of the air bearings, wherein the air blown via the one or more air jets causes the placement mechanism to be translated away from one or more datum fingers of the nest device, blowing, via the one or more air jets after the placement mechanism has been translated away from the one or more datum fingers, air against the placement mechanism while the placement mechanism is hovered off of the air bearings, wherein the air blown via the one or more air jets after the placement mechanism has been translated away from the one or more datum fingers causes the part to be translated against the one or more datum fingers, and drawing in, via the one or more air bearings after the part has been translated against the one or more datum fingers, air through the ends of the one or more air bearings, wherein the air drawn in through the ends of the one or more air bearings generates suction with the placement mechanism, and wherein the suction maintains a position of the placement mechanism.

Example 12 may include the method of example 11 or some other example herein, further comprising transitioning, via the one or more datum fingers, from retracted positions to extended positions after the placement mechanism has been translated away from the one or more datum fingers and prior to the part being translated against the one or more datum fingers, and transitioning, via the one or more datum fingers, from the extended positions to the retracted positions after the part has been translated against the one or more datum fingers and prior to the one or more air bearings drawing air in through the ends of the one or more air bearings.

Example 13 may include the method of example 11 or some other example herein, further comprising transitioning, via one or more clamps of the nest device, from a first state to a second state after the air drawn in through the ends of the one or more air bearings generate the suction with the placement mechanism, wherein the one or more clamps are to contact the part and maintain a position of the part while in the second state.

Example 14 may include the method of example 11 or some other example herein, wherein the air blown, via the one or more air bearings, out of the one or more air jets is blown at a first velocity, and wherein the air drawn in, via the one or more air bearings, through the ends of the air jets is drawn in at a second velocity, the second velocity greater than the first velocity.

Example 15 may include the method of example 11 or some other example herein, further comprising detecting, via a sensor of the nest device, placement of the part on the nest device, wherein the blowing, via the one or more bearings, of the air out of the ends of the one or more air bearings is initiated in response to the sensor detecting the part being placed on the nest device.

Example 16 may include the method of example 11 or some other example herein, wherein a first portion of the one or more air jets blow the air that causes the placement mechanism to be translated away from the one or more datum fingers, wherein a second portion of the one or more air jets blow the air that causes the parts to be translated against the one or more datum fingers, and wherein the second portion is different from the first portion.

Example 17 may include the method of example 11 or some other example herein, wherein the placement mechanism further includes a carrier and the part is placed on the carrier, and wherein the method further comprises centering, via a cylinder assembly of the nest device prior to the one or more air bearings blowing the air out of the ends of the one or more air bearings, the carrier prior to part being placed on the carrier, wherein centering the carrier includes engaging one or more pistons of the cylinder assembly with the carrier, and wherein engaging the one or more pistons with the carrier cause the carrier to be translated to an initial position, and disengaging the one or more pistons from the carrier prior to the one or more air bearings blowing the air out of the ends of the one or more air bearings.

Example 18 may include the method of example 11 or some other example herein, wherein the blowing of the air against the placement mechanism that causes the placement mechanism to be translated away from the one or more datum fingers occurs for a first time duration, wherein the blowing of the air against the placement mechanism that causes the part to be translated against the one or more datum fingers occurs for a second time duration, and wherein the second time duration is longer than the first time duration.

Example 19 may include a clamp to be mounted to a nest device, comprising a mount to affix the clamp to the nest device, an intermediate member coupled to the mount via a first fastener, wherein the intermediate member is to rotate about the first fastener as the clamp is transitioned between a first state and a second state, wherein the clamp is to contact a part placed on the nest device when in the first state, and wherein the clamp is to be out of contact with the part when in the second state, a contact member coupled to the intermediate member via a second fastener, wherein the contact member is coupled to the intermediate member at an opposite end of the intermediate member from an end of the intermediate member coupled to the mount, and wherein the contact member is to rotate about the second fastener as the clamp is transitioned between the first state and the second state, and a contact pad coupled to the contact member at an end of the contact member, the contact pad to contact the part when the clamp is in the first state, wherein the contact pad is to travel along a travel path as the clamp is transitioned between the first state and the second state, wherein a first portion of the travel path is substantially horizontal and a second portion of the travel path is substantially vertical.

Example 20 may include the clamp of example 19 or some other example, wherein the second portion of the travel path that is substantially vertical is within fifteen degrees of vertical travel.

Example 21 may include an air bearing for a nest device, comprising a body, a cavity formed within the body, a tunnel that connects to the cavity and extends to an end of the body, a regulator located within the cavity, the regulator formed of a porous material, and an air supply directed into the cavity, wherein the air supply blows air into the cavity in a first state and draws air out of the cavity in a second state, wherein the regulator blocks the tunnel during the first state and limits air passing out of the tunnel from the cavity to a first velocity, and wherein the tunnel is unblocked during the second state and air being drawn in through the tunnel is drawn in at a second velocity greater than the first velocity.

Example 22 may include the air bearing of example 21 or some other example herein, wherein the porous material that forms the regulator has a pore size of between 50 microns and 90 microns.

Example 23 may include the air bearing of example 21 or some other example herein, wherein the porous material that forms the regulator is a porous polyethylene material.

Example 24 may include a mirror mount for a mirror assembly of a nest device, the mirror mount comprising a rigid portion that encircles a mirror cutout formed in the mirror mount on a first side and a second side, a flexible portion coupled to the rigid portion and that encircles the mirror cutout on a third side, and a tab coupled to the flexible portion and that partially encircles the mirror cutout on a fourth side, wherein a mirror is to be maintained within the mirror cutout absent force being applied to the flexible portion, and wherein the flexible portion flexes in response to a force being applied to the flexible portion and allows the mirror to be interchanged from the mirror cutout.

Example 25 may include the mirror mount of example 24 or some other example herein, wherein the flexible portion extends into the rigid portion and couples to the rigid portion at a coupling area within the rigid portion.

Example 26 may include a mirror assembly to mount to a nest device, the mirror assembly comprising an assembly mount that is to mount the mirror assembly to the nest device, a first mirror mount coupled to the assembly mount toward a first end of the assembly mount, wherein the first mirror mount has a mirror cutout formed in the first mirror mount to receive a mirror, and wherein the first mirror mount includes a rectangular extension that extends toward the mirror cutout of the first mirror mount from a side of the mirror cutout, the rectangular extension located at substantially a middle point of the side of the mirror cutout of the first mirror mount, and a second mirror mount coupled to the assembly mount toward a second end of the assembly mount, wherein the second mirror mount has a mirror cutout formed in the first mirror mount to receive the mirror, wherein the second mirror mount includes a first rectangular extension that extends toward the mirror cutout of the second mirror mount from a side of the mirror cutout and a second rectangular extension that extends toward the mirror cutout of the second mirror mount from the side of the mirror cutout, and wherein the rectangular extension of the first mirror mount, the first rectangular extension of the second mirror mount, and the second rectangular extension of the second mirror mount define a plane utilized to align the mirror when the mirror is installed within the first mirror mount and the second mirror mount.

Example 27 may include the mirror assembly of example 26 or some other example herein, wherein the first mirror mount further includes a curved extension that extends toward the mirror cutout of the first mirror mount from a second side of the mirror cutout, the second side opposite to the side, wherein the second mirror mount further includes a curved extension that extends toward the mirror cutout of the second mirror mount from a second side of the mirror cutout, the second side opposite to the side, and wherein the curved extension of the first mirror mount and the curved extension of the second mirror mount apply force to the mirror when the mirror is installed within the first mirror mount and the second mirror mount to facilitate alignment of the mirror.

Example 28 may include a mirror assembly to mount to a nest device, the mirror assembly comprising an assembly mount to abut a main body of the nest device when the mirror assembly is mounted to the nest device, wherein a first recess is formed in the assembly mount toward a first end of the assembly mount and a second recess is formed in the assembly mount toward a second end of the assembly mount, a first adjustment fastener that extends through the assembly mount into the main body of the nest device, wherein a head of the first adjustment fastener is off-centered and located within the first recess, and wherein the head contacts walls of the first recess and causes a position of the first end of the assembly mount to be adjusted relative to the nest device as the first adjustment fastener is rotated, and a second adjustment fastener that extends through the assembly mount in to the main body of the nest device, wherein a head of the second adjustment fastener is off-centered and located within the second recess, and wherein the head contact walls of the second recess and causes a position of the second end of the assembly mount to be adjusted relative to the nest device as the second adjustment fastener is rotated.

Example 29 may include the mirror assembly of example 28 or some other example herein, wherein the mirror assembly further includes a first affixment fastener and a second affixment fastener, wherein the first affixment fastener is located toward the first end of the assembly mount and the second affixment fastener is located toward the second end of the assembly mount, wherein the first affixment fastener and the second affixment fastener extend through the assembly mount into the main body, wherein the position of the assembly mount relative to the nest device is allowed to be adjusted via the first adjustment fastener and the second adjustment fastener when the first affixment fastener and the second affixment fastener are loosened, and wherein the position of the assembly mount relative to the nest device is maintained when the first affixment fastener and the second affixment fastener are tightened.

Example 30 may include a nest device, comprising a main body and a cylinder assembly coupled to the main body, wherein the cylinder assembly includes a first piston and a second piston, wherein the first piston is to engage with a first portion of a carrier positioned on the nest device and the second piston is to engage with a second portion of the carrier when the cylinder assembly is in a first state, wherein the cylinder assembly centers the carrier and maintains a position of the carrier when the first piston is engaged with the first portion of the carrier and the second piston is engaged with the second portion of the carrier, wherein the first piston is to disengage with the first portion of the carrier and the second piston is to disengage with the second portion of the carrier when the cylinder assembly is in a second state, and wherein the position of the carrier is translatable when the first piston is disengaged from the first portion of the carrier and the second piston is disengaged from the second portion of the carrier.

Example 31 may include the nest device of example 30 or some other example herein, wherein the first portion of the carrier includes a first tapered recess and the second portion of the carrier includes a second tapered recess, and wherein the first piston includes a pointed tip that is to engage with the first tapered recess and the second piston includes a pointed tip that is to engage with the second tapered recess.

Example 32 may include a method of forming an air jet mechanism comprising forming a tunnel in a flat, rigid material, the tunnel extending from an end of the flat, rigid partially through the flat, rigid material, forming an inlet in the, wherein the inlet extends from a side of the material and couples to the tunnel, and shaping the material into an intended shape.

Example 33 may include the method of example 32 or some other example herein, wherein shaping the material into the intended includes forming at least one bend in the material.

Example 34 may include the method of example 32, further comprising heating the material while shaping the material into the intended shape, and cooling the mater after the material is shaped into the intended shape.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A nest device for positioning a part, comprising:
    a main body;
    one or more air bearings that extend from a side of the main body, wherein a placement mechanism is to be positioned on ends of the one or more air bearings, the ends of the one or more air bearings opposite to the main body, wherein the placement mechanism includes the part, and wherein the one or more air bearings are to:
        blow air out of the ends of the one or more air bearings against the placement mechanism when the air bearings are in a first state, wherein the air blown by the air bearings causes placement mechanism to hover off of the air bearings; and
        draw air in through the ends of the one or more air bearings when the air bearings are in a second state, wherein the air drawn in generates suction with the placement mechanism to maintain a position of the placement mechanism; and
    one or more air jets that extend from the side of the main body and are directed toward the placement mechanism, wherein the one or more air jets are to blow air against the placement mechanism, and wherein the air blown by the one or more air jets causes the placement mechanism to be translated relative to the main body.

2. The nest device of claim 1, wherein the one or more air jets are to:
    blow air against the placement mechanism while the air bearings are in the first state; and
    cease blowing air while the air bearings are in the second state.

3. The nest device of claim 1, wherein the placement mechanism further includes a carrier, wherein the carrier is positioned on the ends of the one or more bearings, wherein the one or more air bearings blow air against the carrier in the first state and the air drawn in via the one or more air bearings generates suction with the carrier when the air bearings are in the second state.

4. The nest device of claim 3, wherein the part is to be placed on the carrier opposite from the main body of the nest device.

5. The nest device of claim 3, wherein the one or more air jets are directed toward the carrier and blow air against the carrier.

6. The nest device of claim 5, wherein the carrier includes a crossbar, wherein the one or more air jets includes a first air jet directed at the crossbar in a first direction and a second air jet directed at the crossbar in a second direction, the second direction opposite to the first direction, and wherein the first air jet is to blow air against the crossbar to cause the carrier to be translated in the first direction and the second jet is to blow air against the crossbar to cause the carrier to be translated in the second direction.

7. The nest device of claim 1, wherein air blown out of the ends of the one or more air bearings is blown at a first velocity, and wherein air drawn in through the ends of the one or more air bearings is drawn in at a second velocity, the second velocity greater than the first velocity.

8. The nest device of claim 1, further comprising one or more datum fingers that extend from the side of the main body, wherein the one or more datum fingers are to transition between extended positions and retracted positions, the retracted positions different from the extended positions.

9. The nest device of claim 8, wherein the one or more air jets are to blow air against the placement mechanism when the one or more datum fingers are in the extended positions, wherein the air blown by the one or more air jets causes the part to be translated against the one or more datum fingers to position the part in an intended position.

10. The nest device of claim 8, wherein the one or more datum fingers are to be in the retracted positions while the air bearings are in the second state, and wherein the one or more datum fingers avoid contact with the placement mechanism while in the retraced positions.

* * * * *